US008976209B2

(12) United States Patent
Tsubata

(10) Patent No.: US 8,976,209 B2
(45) Date of Patent: Mar. 10, 2015

(54) ACTIVE MATRIX SUBSTRATE, METHOD FOR PRODUCING ACTIVE MATRIX SUBSTRATE, LIQUID CRYSTAL PANEL, METHOD FOR PRODUCING LIQUID CRYSTAL PANEL, LIQUID CRYSTAL DISPLAY DEVICE, LIQUID CRYSTAL DISPLAY UNIT, AND TELEVISION RECEIVER

(75) Inventor: Toshihide Tsubata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 725 days.

(21) Appl. No.: 13/254,791

(22) PCT Filed: Oct. 30, 2009

(86) PCT No.: PCT/JP2009/068714
§ 371 (c)(1),
(2), (4) Date: Sep. 2, 2011

(87) PCT Pub. No.: WO2010/100789
PCT Pub. Date: Sep. 10, 2010

(65) Prior Publication Data
US 2012/0001838 A1 Jan. 5, 2012

(30) Foreign Application Priority Data
Mar. 5, 2009 (JP) .................................. 2009-052595

(51) Int. Cl.
*G09G 5/02* (2006.01)
*G02F 1/1362* (2006.01)
(Continued)

(52) U.S. Cl.
CPC ........ *G02F 1/136213* (2013.01); *G09G 3/3648* (2013.01); *G09G 2300/0404* (2013.01);
(Continued)

(58) Field of Classification Search
CPC .............. G09G 3/2074; G09G 3/3648; G09G 2300/04; G09G 2300/0404; G09G 2300/0421; G09G 2300/0439; G09G 2300/08; G09G 2300/0809; G09G 2300/0876
USPC .............................. 345/694, 695, 698, 87, 93
See application file for complete search history.

(56) References Cited

U.S. PATENT DOCUMENTS 5,042,916 A 8/1991 Ukai et al.
5,132,819 A 7/1992 Noriyama et al.
(Continued)

FOREIGN PATENT DOCUMENTS

JP 2-79026 A 3/1990
JP 2-275927 A 11/1990
(Continued)

OTHER PUBLICATIONS

International Search Report (ISR) issued in PCT/JP2009/068714 (International application) mailed in Dec. 2009 for Examiner consideration.
(Continued)

*Primary Examiner* — Jason Mandeville
(74) *Attorney, Agent, or Firm* — Chen Yoshimura LLP

(57) ABSTRACT

Disclosed is a liquid crystal panel including a scan signal line (16*x*), a data signal line (15*x*), and a transistor (12*a*) that is connected to the scan signal line (16*x*) and the data signal line (15*x*). A pixel (101) is provided with pixel electrodes (17*a* and 17*b*). The pixel electrode (17*a*) is connected to the data signal line (15*x*) through the transistor (12*a*). The liquid crystal panel further includes capacitance electrodes (37*a* and 38*a*) that are formed in the same layer as the scan signal line (16*x*). The capacitance electrodes (37*a* and 38*a*) are electrically connected to the pixel electrode (17*a*), and form a capacitance with the pixel electrode (17*b*). Consequently, the yield of a capacitance coupling type pixel division system active matrix substrate can be improved.

12 Claims, 41 Drawing Sheets

(51) Int. Cl.
  *G09G 3/36* (2006.01)
  *G02F 1/1343* (2006.01)

(52) U.S. Cl.
  CPC .............. *G09G2300/0421* (2013.01); *G09G 2300/0439* (2013.01); *G09G 2300/08* (2013.01); *G02F 1/134336* (2013.01); *G02F 1/136227* (2013.01); *G02F 2001/134345* (2013.01); *G02F 2001/134354* (2013.01)
  USPC ........................................ 345/694; 345/695

(56) References Cited

U.S. PATENT DOCUMENTS

| | | | |
|---|---|---|---|
| 5,245,450 | A | 9/1993 | Ukai et al. |
| 5,319,480 | A | 6/1994 | McCartney |
| 5,337,173 | A | 8/1994 | Atsumi et al. |
| 5,343,216 | A | 8/1994 | Katayama et al. |
| 5,777,700 | A | 7/1998 | Kaneko et al. |
| 6,091,464 | A | 7/2000 | Song |
| 6,839,099 | B2 * | 1/2005 | Fukunishi ............... 349/54 |
| 7,710,523 | B2 | 5/2010 | Nakanishi et al. |
| 8,441,590 | B2 | 5/2013 | Tsubata |
| 2004/0169991 | A1 | 9/2004 | Nagata et al. |
| 2005/0219186 | A1 | 10/2005 | Kamada et al. |
| 2005/0253979 | A1 | 11/2005 | Hong et al. |
| 2006/0023137 | A1 | 2/2006 | Kamada et al. |
| 2006/0028590 | A1 | 2/2006 | Shin et al. |
| 2006/0055852 | A1 | 3/2006 | Yoshida et al. |
| 2006/0087598 | A1 | 4/2006 | Lee et al. |
| 2006/0187368 | A1 | 8/2006 | Kim et al. |
| 2008/0002076 | A1 * | 1/2008 | Yagi et al. ............ 349/39 |
| 2009/0065778 | A1 * | 3/2009 | Tsubata et al. ........... 257/59 |
| 2009/0268116 | A1 | 10/2009 | Yagi et al. |
| 2010/0025689 | A1 | 2/2010 | Lee et al. |
| 2010/0097359 | A1 | 4/2010 | Yamada et al. |
| 2011/0279734 | A1 | 11/2011 | Tsubata |
| 2011/0279735 | A1 | 11/2011 | Tsubata |
| 2012/0001839 | A1 | 1/2012 | Tsubata |

FOREIGN PATENT DOCUMENTS

| | | |
|---|---|---|
| JP | 7-28091 A | 1/1995 |
| JP | 9-54341 A | 2/1997 |
| JP | 9-269509 A | 10/1997 |
| JP | 10-123572 A | 5/1998 |
| JP | 10-339885 A | 12/1998 |
| JP | 2005-292397 A | 10/2005 |
| JP | 2005-301226 A | 10/2005 |
| JP | 2006-39290 A | 2/2006 |
| JP | 2006-39567 A | 2/2006 |
| JP | 2006-78890 A | 3/2006 |
| JP | 2006-126837 A | 5/2006 |
| JP | 2006-276582 A | 10/2006 |
| WO | 2007/108181 A1 | 9/2007 |
| WO | WO 2007108181 A1 * | 9/2007 |
| WO | 2008/146512 A1 | 12/2008 |

OTHER PUBLICATIONS

Applicant brings the attention of the Examiner to the following pending U.S. Appl. No. 13/254,788, filed Sep. 2, 2011, which is a national stage of PCT application No. PCT/JP2009/068713 published as WO2010/100788, and U.S. Appl. No. 13/254,789, filed Sep. 2, 2011, which is a national stage of PCT application No. PCT/JP2009/068716 published as WO2010/100790.

* cited by examiner

ACTIVE MATRIX SUBSTRATE, METHOD FOR PRODUCING ACTIVE MATRIX SUBSTRATE, LIQUID CRYSTAL PANEL, METHOD FOR PRODUCING LIQUID CRYSTAL PANEL, LIQUID CRYSTAL DISPLAY DEVICE, LIQUID CRYSTAL DISPLAY UNIT, AND TELEVISION RECEIVER

TECHNICAL FIELD

The present invention relates to an active matrix substrate including a plurality of pixel electrodes in a single pixel region, and to a liquid crystal display device (pixel division system) using such an active matrix substrate.

BACKGROUND ART

In order to improve the dependence of view angle of γ (gamma) characteristics of a liquid crystal display device (to suppress the display whitening problem or the like, for example), a liquid crystal display device in which a plurality of sub-pixels provided in a single pixel are controlled for different luminance levels to display halftones by area gradation of the sub-pixels (pixel division system; see Patent Document 1, for example) is being proposed.

As shown in FIG. 42, in an active matrix substrate according to Patent Document 1, in a single pixel region, three pixel electrodes 121a to 121c are arranged along a data signal line 115, and a source electrode 116s of a transistor 116 is connected to a contact electrode 117a. The contact electrode 117a and a control electrode 118 are connected to each other through a lead-out wiring 119, and the contact electrode 118 and a contact electrode 117b are connected to each other through a lead-out wiring 126. The contact electrode 117a and the pixel electrode 121a are connected to each other through a contact hole 120a, and the contact electrode 117b and the pixel electrode 121c are connected to each other through a contact hole 120b. The pixel electrode 121b, which is electrically floating, overlaps with the control electrode 118 through an insulating layer, and the pixel electrode 121b is capacitively coupled to the pixel electrodes 121a and 121c, respectively (capacitance coupling type pixel division system). A storage capacitance is formed at the location where the control electrode 118 and a capacitance wiring 113 overlap with each other. In a liquid crystal display device utilizing this active matrix substrate, sub-pixels that correspond to the pixel electrodes 121a and 121c are bright sub-pixels, and a sub-pixel that corresponds to the pixel electrode 121b is a dark sub-pixel. Halftones can be displayed by area gradation of bright sub-pixels (two sub-pixels) and a dark sub-pixel (one sub-pixel).

RELATED ART DOCUMENTS

Patent Documents

Patent Document 1: Japanese Patent Application Laid-Open Publication No. 2006-39290 (publication date: Feb. 9, 2006)

SUMMARY OF THE INVENTION

Problems to be Solved by the Invention

However, in the active matrix substrate in FIG. 42, when a short-circuit occurs between the control electrode 118 and the pixel electrode 121b, for example, even though writing of signal potentials from the data signal line to the pixel electrode 121b can be avoided by cutting the lead-out wiring 119, the pixel electrode 121b becomes no longer capacitively coupled to the pixel electrode 121a.

As described, in a conventional active matrix substrate, the sub-pixel (dark sub-pixel) corresponding to the pixel electrode 121b becomes susceptible to a defect, thereby causing a risk of decreasing the yield.

In order to address the aforementioned problem, the present invention provides a configuration in which the yield can be improved in an active matrix substrate of the capacitance coupling type pixel division system.

Means for Solving the Problems

The present active matrix substrate is an active matrix substrate that includes the following: a scan signal line; a data signal line; a transistor connected to the scan signal line and to the data signal line; first and second pixel electrodes provided in a single pixel region, the first pixel electrode being connected to the data signal line through the transistor; and first and second capacitance electrodes formed in the same layer as the scan signal line, wherein the first capacitance electrode is electrically connected to one of the first and second pixel electrodes, and forms a capacitance with the other of the first and second pixel electrodes, and wherein the second capacitance electrode is connected to one of the first and second pixel electrodes, and forms a capacitance with the other of the first and second pixel electrodes.

Effects of the Invention

The active matrix substrate of the present invention is a capacitance coupling type pixel division system active matrix substrate in which the first and second pixel electrodes provided in a single pixel region are connected to each other through two capacitances (coupling capacitances) formed in the same layer as the scan signal line. This way, production yield of the present active matrix substrate can be increased because, even if one of the capacitances becomes defective in the manufacturing process or the like, capacitance coupling of the first and second pixel electrodes can be maintained by the other capacitance.

BRIEF DESCRIPTION OF THE DRAWINGS

FIG. 37(a) shows a configuration of the present liquid crystal display unit, and FIG. 37(b) shows a configuration of the present liquid crystal display device.

DETAILED DESCRIPTION OF EMBODIMENTS

Examples of embodiments of the present invention are described below with reference to FIGS. 1 to 41. In the description below, it is assumed that the direction in which scan signal lines extend is the row direction, for convenience. Needless to say, however, when a liquid crystal display device equipped with a present liquid crystal panel (or an active matrix substrate for use in the liquid crystal panel) is in use (when viewed), the scan signal line can extend either in the horizontal or vertical direction. Alignment control structures formed on the liquid crystal panel are briefly described as necessary.

Embodiment 1

Figure 1:
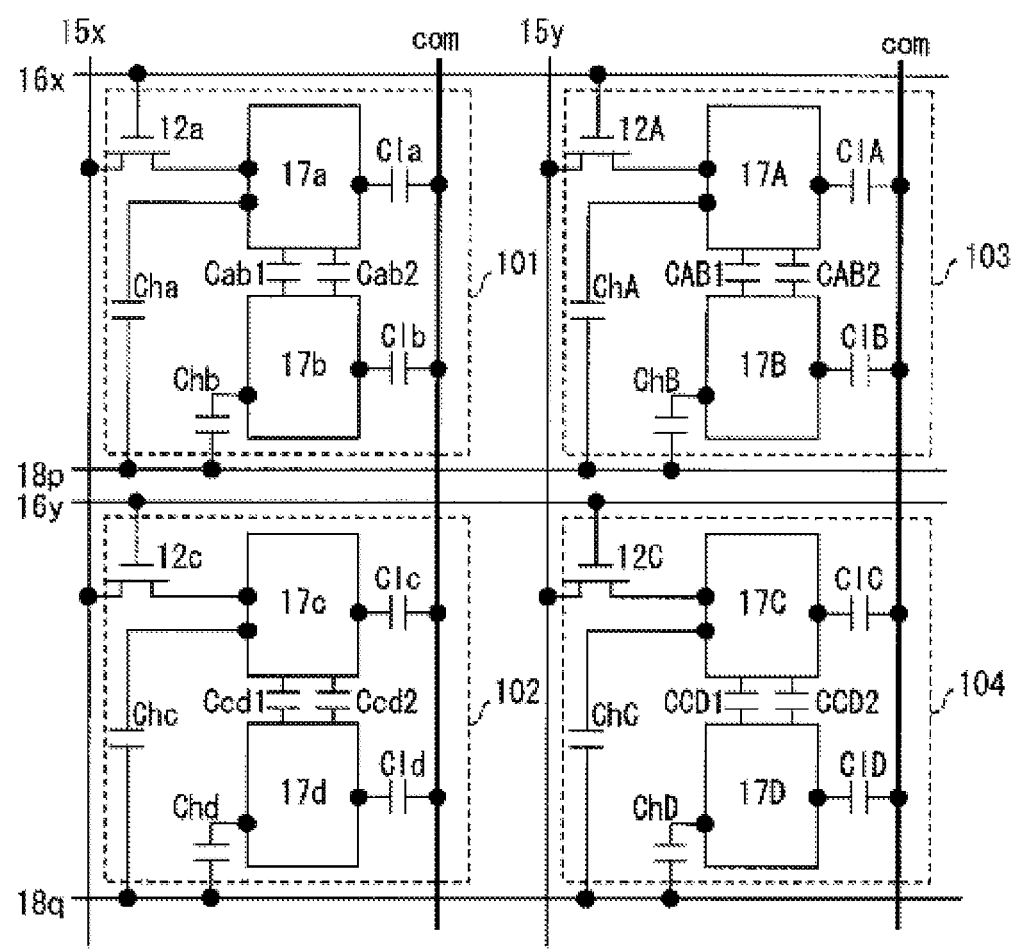
FIG. 1 is a circuit diagram showing a configuration of a liquid crystal panel according to Embodiment 1.

FIG. 1 is an equivalent circuit diagram showing a part of the liquid crystal panel according to Embodiment 1. As shown in FIG. 1, the present liquid crystal panel includes data signal lines ($15x$ and $15y$) extending in the column direction (up/down direction in the figure), scan signal lines ($16x$ and $16y$) extending in the row direction (right/left direction in the figure), pixels (101 to 104) arranged in the row and column directions, storage capacitance wirings ($18p$ and $18q$), and a common electrode (opposite electrode) com. All pixels have the same structure. The pixel column that includes pixels 101 and 102 and the pixel column that includes pixels 103 and 104 are adjacent to each other, and the pixel row that includes pixels 101 and 103 and the pixel row that includes pixels 102 and 104 are adjacent to each other.

For the present liquid crystal panel, one data signal line and one scan signal line are provided for each of the pixels. Two pixel electrodes are arranged in the column direction in a single pixel. Two pixel electrodes 17a and 17b provided in pixel 101 and two pixel electrodes 17c and 17d provided in pixel 102 are arranged in one column. Two pixel electrodes 17A and 17B provided in pixel 103 and two pixel electrodes 17C and 17D provided in the pixel 104 are arranged in one column. Pixel electrodes 17a and 17A, the pixel electrodes 17b and 17B, pixel electrodes 17c and 17C, and pixel electrodes 17d and 17D are adjacent to each other in the row direction. The storage capacitance wiring 18p extends across the pixels 101 and 103, and the storage capacitance wiring 18q extends across the pixels 102 and 104.

In pixel 101, pixel electrodes 17a and 17b are connected together through coupling capacitances Cab1 and Cab2 arranged side by side. The pixel electrode 17a is connected to the data signal line 15x through a transistor 12a connected to the scan signal line 16x. A storage capacitance Cha is formed between the pixel electrode 17a and the storage capacitance wiring 18p. A storage capacitance Chb is formed between the pixel electrode 17b and the storage capacitance wiring 18p. A liquid crystal capacitance Cla is formed between the pixel electrode 17a and the common electrode com, and a liquid crystal capacitance Clb is formed between the pixel electrode 17b and the common electrode com.

In the pixel 102, which is adjacent to the pixel 101 in the column direction, the pixel electrodes 17c and 17d are connected together through coupling capacitances Ccd1 and Ccd2 arranged side by side. The pixel electrode 17c is connected to the data signal line 15x through a transistor 12c connected to the scan signal line 16y. A storage capacitance Chc is formed between the pixel electrode 17c and the storage capacitance wiring 18q. A storage capacitance Chd is formed between the pixel electrode 17d and the storage capacitance wiring 18q. A liquid crystal capacitance Clc is formed between the pixel electrode 17c and the common electrode com, and a liquid crystal capacitance Cld is formed between the pixel electrode 17d and the common electrode com.

In the pixel 103, which is adjacent to the pixel 101 in the row direction, the pixel electrodes 17A and 17B are connected to each other through coupling capacitances CAB1 and CAB2 arranged side by side. The pixel electrode 17A is connected to the data signal line 15y through a transistor 12A connected to the scan signal line 16x. A storage capacitance ChA is formed between the pixel electrode 17A and the storage capacitance wiring 18p. A storage capacitance ChB is formed between the pixel electrode 17B and the storage capacitance wiring 18p. A liquid crystal capacitance ClA is formed between the pixel electrode 17A and the common electrode com, and a liquid crystal capacitance ClB is formed between the pixel electrode 17B and the common electrode com.

In a liquid crystal display device equipped with the present liquid crystal panel, scan is performed sequentially, and scan signal lines 16x and 16y are selected sequentially. When the scan signal line 16x is selected, for example, because the pixel electrode 17a is connected to the data signal line 15x (through the transistor 12a) and the pixel electrodes 17a and 17b are capacitively coupled to each other through the coupling capacitances Cab1 and Cab2, the following equation is satisfied: $Vb=Vax((C1+C2)/(C1+Ch+C1+C2))$, where the capacitance value of Cla=the capacitance value of Clb=Cl; the capacitance value of Cha=the capacitance value of Chb=Ch; the capacitance value of Cab1=C1; the capacitance value of Cab2=C2; the potential of the pixel electrode 17a after the transistor 12a is turned off is Va; and the potential of the pixel electrode 17b after the transistor 12a is turned off is Vb. That is, $|Va| \geq |Vb|$ (where |Va|, for example, is the difference in potential between Va and the com potential (=Vcom)) is satisfied, and the halftone display is conducted by area gradation of bright and dark sub-pixels, where a sub-pixel including the pixel electrode 17a is the bright sub-pixel, and a sub-pixel including the pixel electrode 17b is the dark sub-pixel. With this configuration, the view angle characteristics of the liquid crystal display device can be improved.

Figure 2:
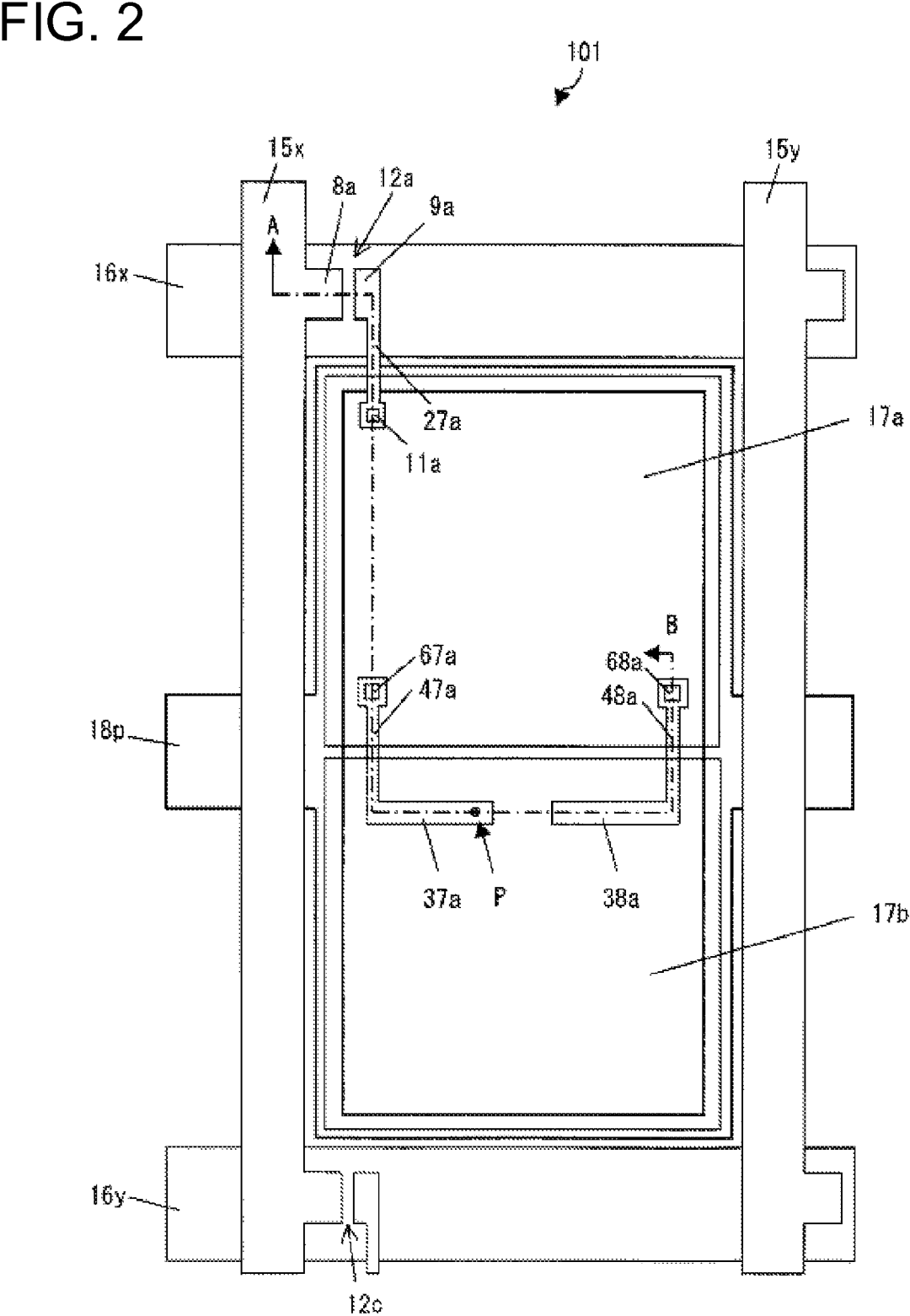
FIG. 2 is a plan view showing a specific example of the liquid crystal panel of FIG. 1.

A specific example of pixel 101 of FIG. 1 is shown in FIG. 2. As shown in the figure, a transistor 12a is disposed in the proximity of the intersection of the data signal line 15x and the scan signal line 16x. In the pixel region defined by the signal lines (15x and 16x), a rectangular-shaped pixel electrode 17a and a rectangular-shaped pixel electrode 17b are arranged in the column direction, and one of the four sides constituting the perimeter of the first pixel electrode and one of the four sides constituting the perimeter of the second pixel electrode are adjacent to each other. The storage capacitance wiring 18p has a storage capacitance wiring extension that branches off from the storage capacitance wiring 18p, and is disposed such that it extends to overlap with portions of the edges of the pixel electrodes 17a and 17b when observed in a plan view. Capacitance electrodes 37a and 38a are respectively disposed such that they overlap with the pixel electrode 17b.

More specifically, the capacitance electrode 37a extends in the same direction as the extending direction of the scan signal line 16x, and overlaps with the pixel electrode 17b. The capacitance electrode 38a is disposed side by side with the capacitance electrode 37a in the row direction (the aforementioned extending direction), and extends in the same direction as the extending direction of the scan signal line 16x to overlap with the pixel electrode 17b. The capacitance electrodes 37a and 38a are respectively formed in the same layer as the scan signal line 16x. The storage capacitance wiring extension of the storage capacitance wiring 18p extends around the pixel region, along the data signal lines 15x and 15y, and along the scan signal lines 16x and 16y. Further, the storage capacitance wiring extension is disposed to overlap with the three sides of the pixel electrode 17a and of the pixel electrode 17b, which are not the sides that form the gap between the pixel electrodes 17a and 17b. Because of the shape of the storage capacitance wiring 18p, jumping of electric charge from the data signal lines 15x and 15y and from the scan signal lines 16x and 16y can be suppressed, which provides an improved effect against the burn-in of the floating pixel. Also, because of the branching structure, redundancy is provided to the storage capacitance wiring 18p, and the production yield can be improved. Such a structure of the storage capacitance wiring 18p is applicable to embodiments of the liquid crystal panel described below, and the similar advantages can be obtained.

Over the scan signal line 16x, a source electrode 8a and a drain electrode 9a of the transistor 12a are formed, and the source electrode 8a is connected to the data signal line 15x. The drain electrode 9a is connected to a drain lead-out wiring 27a, and the drain lead-out wiring 27a is connected to the pixel electrode 17a through a contact hole 11a. The capacitance electrode 37a overlaps with the pixel electrode 17b through a gate insulating film and an interlayer insulating film, and a lead-out wiring 47a connected to the capacitance electrode 37a is connected to the pixel electrode 17a through a contact hole 67a. As a result, the coupling capacitance Cab1 (see FIG. 1) between the pixel electrodes 17a and 17b is formed at the location where the capacitance electrode 37a and the pixel electrode 17b overlap with each other. Similarly, the capacitance electrode 38a overlaps with the pixel electrode 17b through the gate insulating film and the interlayer insulating film, and a lead-out wiring 48a connected to the capacitance electrode 38a is connected to the pixel electrode 17a through a contact hole 68a. As a result, the coupling capacitance Cab2 (see FIG. 1) between the pixel electrodes 17a and 17b is formed at the location where the capacitance electrode 38a and the pixel electrode 17b overlap with each other.

The pixel electrode 17a and the storage capacitance wiring 18p overlap with each other through the interlayer insulating film and the gate insulating film, and the storage capacitance Cha (see FIG. 1) is formed at the location of the overlap. The pixel electrode 17b and the storage capacitance wiring 18p overlap with each other through the interlayer insulating film and the gate insulating film, and the storage capacitance Chb (see FIG. 1) is formed at the location of the overlap. Configuration (the shapes and locations of the respective members and the relation of connection among them) of other pixels is the same as that of the pixel 101.

According to this configuration, the sub-pixel that includes the pixel electrode 17a becomes the bright sub-pixel (hereinafter "BR"), and the sub-pixel that includes the pixel electrode 17b becomes the dark sub-pixel (hereinafter "DA").

Figure 3:
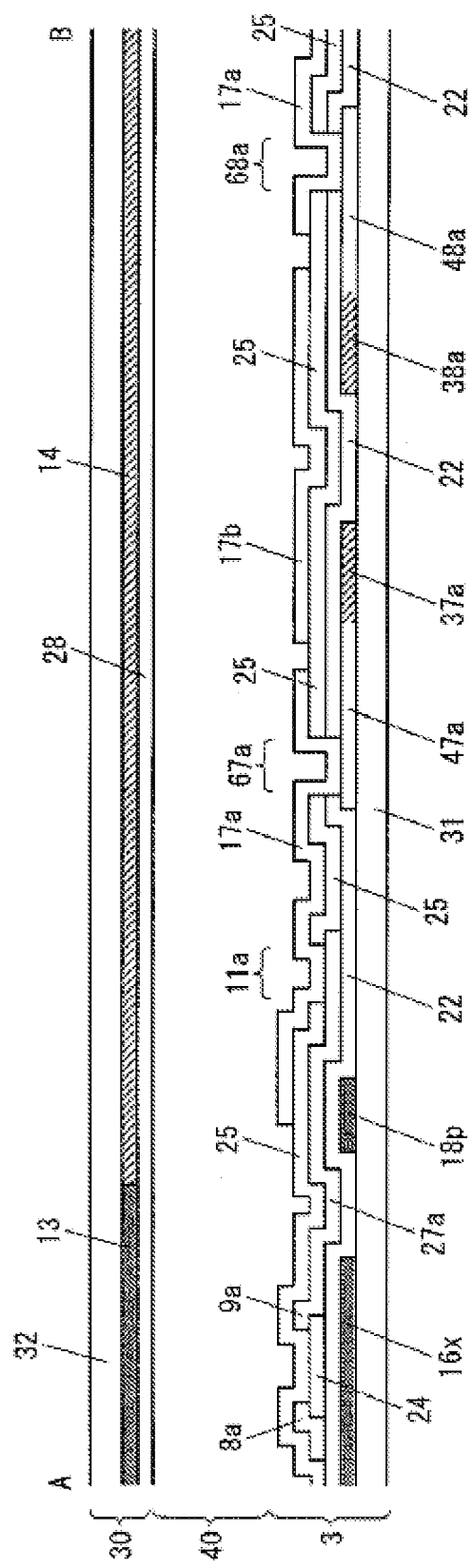
FIG. 3 is a cross-sectional arrow view taken along the line A-B of FIG. 2.

FIG. 3 is a cross-sectional arrow view taken along the line A-B of FIG. 2. As shown in the figure, the present liquid crystal panel includes an active matrix substrate 3, a color filter substrate 30 facing the active matrix substrate 3, and a liquid crystal layer 40 interposed between the substrates (3 and 30).

In the active matrix substrate 3, the scan signal line 16x, the storage capacitance wiring 18p, the capacitance electrodes 37a and 38a, and the lead-out wirings 47a and 48a are formed on a glass substrate 31, and an inorganic gate insulating film 22 is formed to cover them. Over the inorganic gate insulating film 22, a semiconductor layer 24 (i layer and n+ layer), the source electrode 8a and the drain electrode 9a in contact with the n+ layer, and the drain lead-out wiring 27a are formed, and an inorganic interlayer insulating film 25 is formed to cover them. On the inorganic interlayer insulating film 25, the pixel electrodes 17a and 17b are formed, and further, an alignment film (not shown) is formed to cover the pixel electrodes 17a and 17b.

Here, in the contact hole 11a, the inorganic interlayer insulating film 25 is removed; therefore, the pixel electrode 17a and the drain lead-out wiring 27a are connected to each other. Also, in the contact hole 67a, the inorganic interlayer insulating film 25 and the inorganic gate insulating film 22 are removed. As a result, the pixel electrode 17a and the lead-out wiring 47a are connected to each other. Therefore, the pixel electrodes 17a and the capacitance electrode 37a become electrically connected to each other. Additionally, the capacitance electrode 37a and the pixel electrode 17b overlap with each other through the inorganic gate insulating film 22 and the inorganic interlayer insulating film 25. As a result, the coupling capacitance Cab1 (see FIG. 1) is formed. Similarly, in the contact hole 68a, the inorganic interlayer insulating film 25 and the inorganic gate insulating film 22 are removed. Consequently, the pixel electrode 17a and the lead-out wiring 48a are connected to each other. Therefore, the pixel electrode 17a and the capacitance electrode 38a are electrically connected to each other. Additionally, the capacitance electrode 38a and the pixel electrode 17b overlap with each other through the inorganic gate insulating film 22 and the inorganic interlayer insulating film 25. As a result, the coupling capacitance Cab2 (see FIG. 1) is formed.

On the other hand, in the color filter substrate 30, a colored layer 14 is formed on a glass substrate 32. On the colored layer 14, a common electrode (com) 28 is formed, and further, an alignment film (not shown) is formed to cover the common electrode (com) 28.

Figure 5:
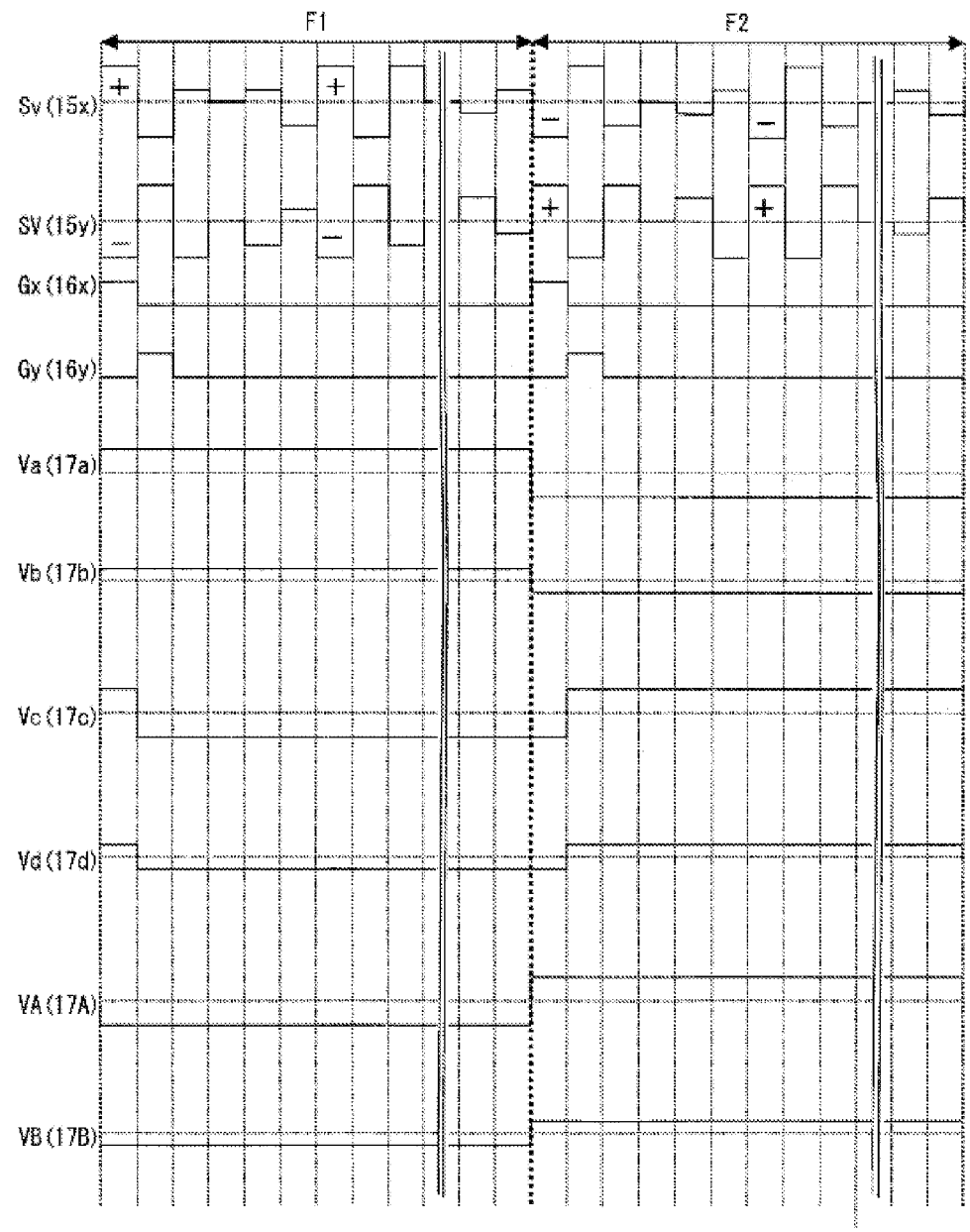
FIG. 5 is a timing chart showing a driving method of the liquid crystal display device equipped with a liquid crystal panel of FIG. 1.
Figure 6:
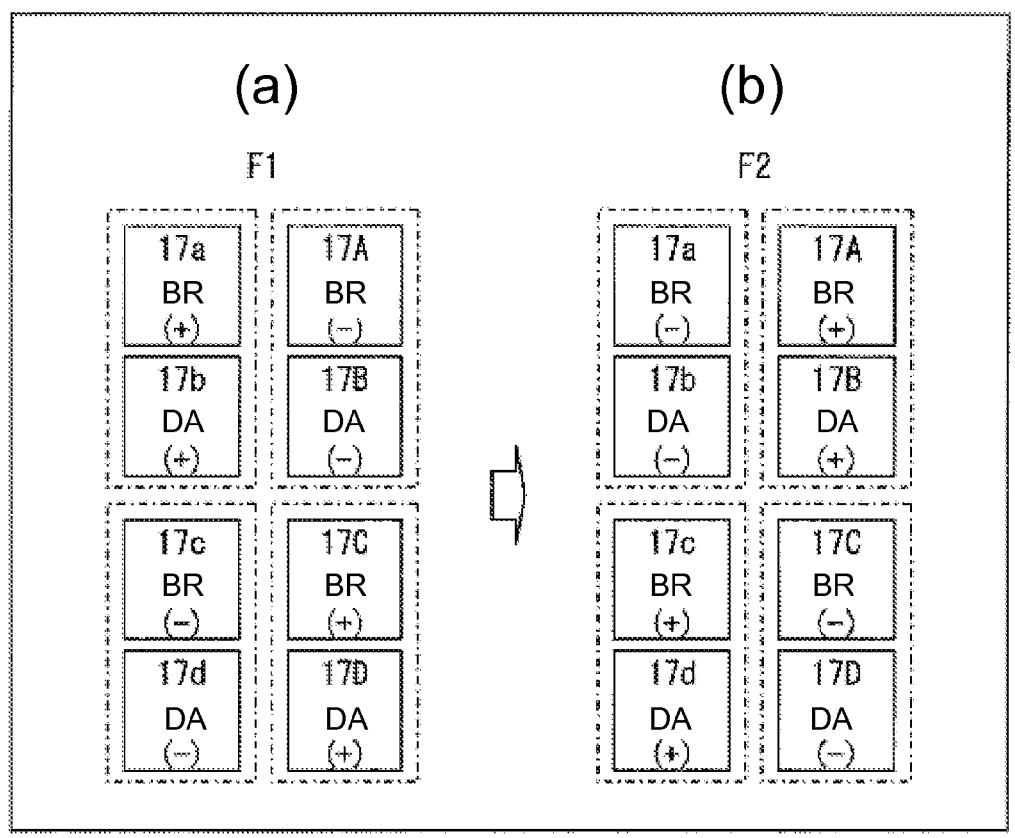
FIG. 6 is a schematic view showing the display state of respective frames when the driving method of FIG. 5 is used.

FIG. 5 is a timing chart showing the driving method of a present liquid crystal display device (liquid crystal display device operating in the normally black mode) equipped with the liquid crystal panel shown in FIGS. 1 and 2. "Sv" and "SV" respectively denote the signal potentials supplied to the respective two data signal lines (15x and 15y, for example) adjacent to each other, "Gx" and "Gy" respectively denote gate-on pulse signals supplied to the scan signal lines 16x and 16y, and "Va" and "Vb," "VA," "VB", "Vc," and "Vd" respectively denote potentials of the pixel electrodes 17a, 17b, 17A, 17B, 17c, and 17d.

In this driving method, as shown in FIG. 5, scan signal lines are selected sequentially, and the polarity of the signal potential supplied to the data signal lines is reversed in every one horizontal scan period (1H). The polarity of the signal potential supplied during the same horizontal scan period in each frame is reversed for each frame, and during the same horizontal scan period, signal potentials of opposite polarities are supplied to two adjacent data signal lines.

More specifically, in F1 of consecutive frames F1 and F2, scan signal lines are sequentially selected (scan signal lines 16x and 16y, for example, are selected in this order), and to one of the two neighboring data signal lines (data signal line 15x, for example), a signal potential of positive polarity is supplied during the first horizontal scan period (including the writing period of the pixel electrode 17a, for example), and a signal potential of negative polarity is supplied during the second horizontal scan period (including the writing period of the pixel electrode 17c, for example). To the other of the two neighboring data signal lines (data signal line 15y, for example), a signal potential of negative polarity is supplied during the first horizontal scan period (including the writing period of the pixel electrode 17A, for example), and a signal potential of positive polarity is supplied during the second horizontal scan period (including the writing period of the pixel electrode 17C, for example). As a result, as shown in FIG. 5, relations of |Va|≥|Vb|, |Vc|≥|Vd|, and |VA|≥|VB| are satisfied. The sub-pixel that includes the pixel electrode 17a (positive polarity) becomes "BR," and the sub-pixel that includes the pixel electrode 17b (positive polarity) becomes "DA." The sub-pixel that includes the pixel electrode 17c (negative polarity) becomes "BR," and the sub-pixel that includes the pixel electrode 17d (negative polarity) becomes "DA." The sub-pixel that includes the pixel electrode 17A (negative polarity) becomes "BR," and the sub-pixel that includes the pixel electrode 17B (negative polarity) becomes "DA." FIG. 6(a) shows the overall picture.

In F2, scan signal lines are sequentially selected (the scan signal lines 16x and 16y, for example, are selected in this order), and to one of the two neighboring data signal lines (data signal line 15x, for example), a signal potential of negative polarity is supplied during the first horizontal scan period (including the writing period of the pixel electrode 17a, for example), and a signal potential of positive polarity is supplied during the second horizontal scan period (including the writing period of the pixel electrode 17c, for example). To the other of the two data signal lines (data signal line 15y, for example), a signal potential of positive polarity is supplied during the first horizontal scan period (including the writing period of the pixel electrode 17A, for example), and a signal potential of negative polarity is supplied during the second horizontal scan period (including the writing period of the pixel electrode 17C, for example). As a result, as shown in FIG. 5, relations of |Va|≥|Vb|, |Vc|≥|Vd|, and |VA|≥|VB| are satisfied. The sub-pixel that includes the pixel electrode 17a (negative polarity) becomes "BR," and the sub-pixel that includes the pixel electrode 17b (negative polarity) becomes "DA." The sub-pixel that includes the pixel electrode 17c (positive polarity) becomes "BR," and the sub-pixel that includes the pixel electrode 17d (positive polarity) becomes "DA." The sub-pixel that includes the pixel electrode 17A (positive polarity) becomes "BR," and the sub-pixel that includes the pixel electrode 17B (positive polarity) becomes "DA." FIG. 6(b) shows the overall picture.

Figure 7:
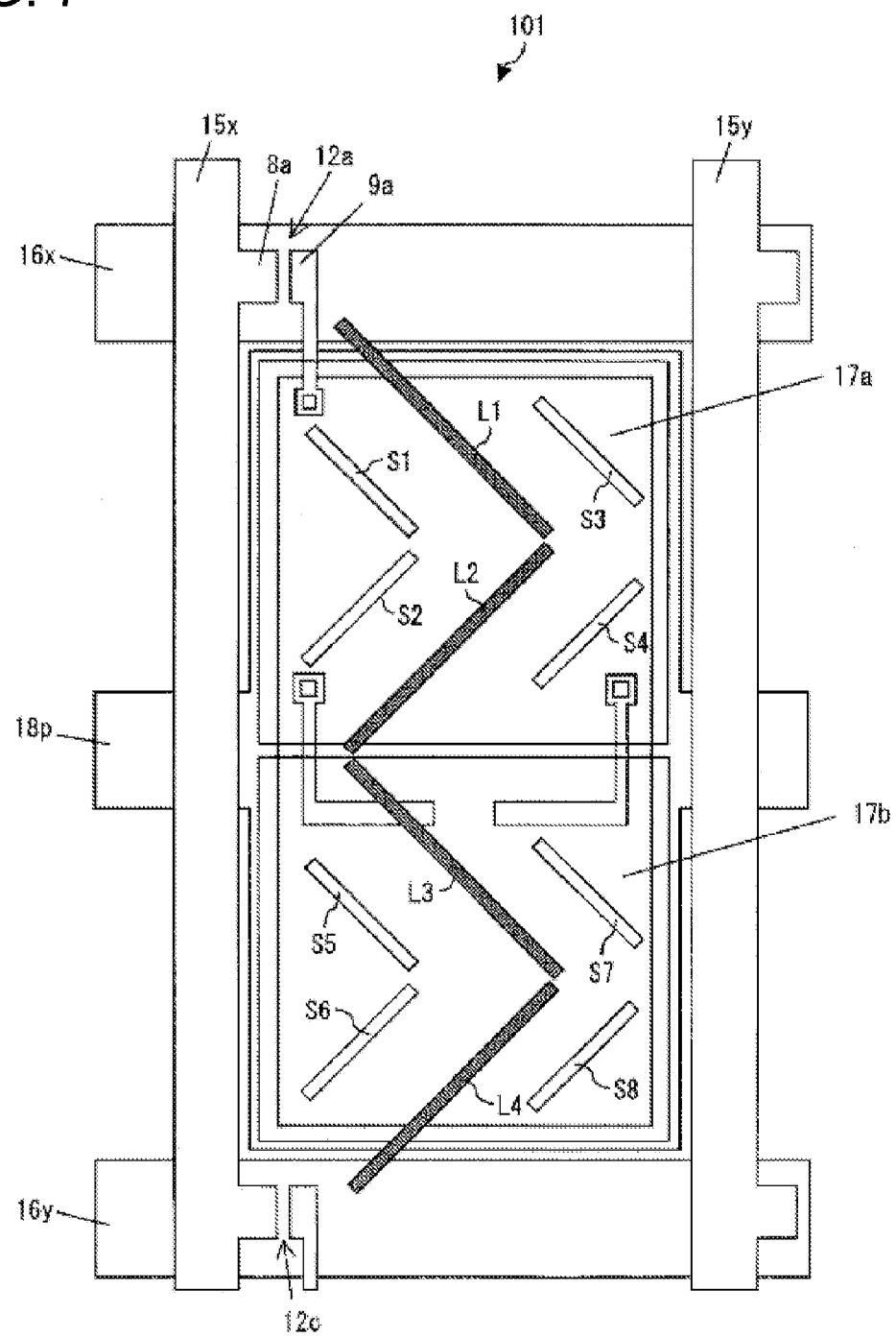
FIG. 7 is a plan view showing another specific example of the liquid crystal panel shown in FIG. 1.

The alignment control structure is omitted in FIG. 2. However, for a liquid crystal panel of MVA (Multi-domain Vertical Alignment) system, for example, as shown in FIG. 7, for example, alignment control slits Si to S4 are provided for the pixel electrode 17a, and alignment control ribs L1 and L2 are provided on the color filter substrate at locations corresponding to the pixel electrode 17a. Alignment control slits S5 to S8 are provided for the pixel electrode 17b, and alignment control ribs L3 and L4 are provided on the color filter substrate at locations corresponding to the pixel electrode 17b. Here, instead of providing the aforementioned alignment control ribs, alignment control slits may be provided for the common electrode of the color filter substrate.

Figure 8:
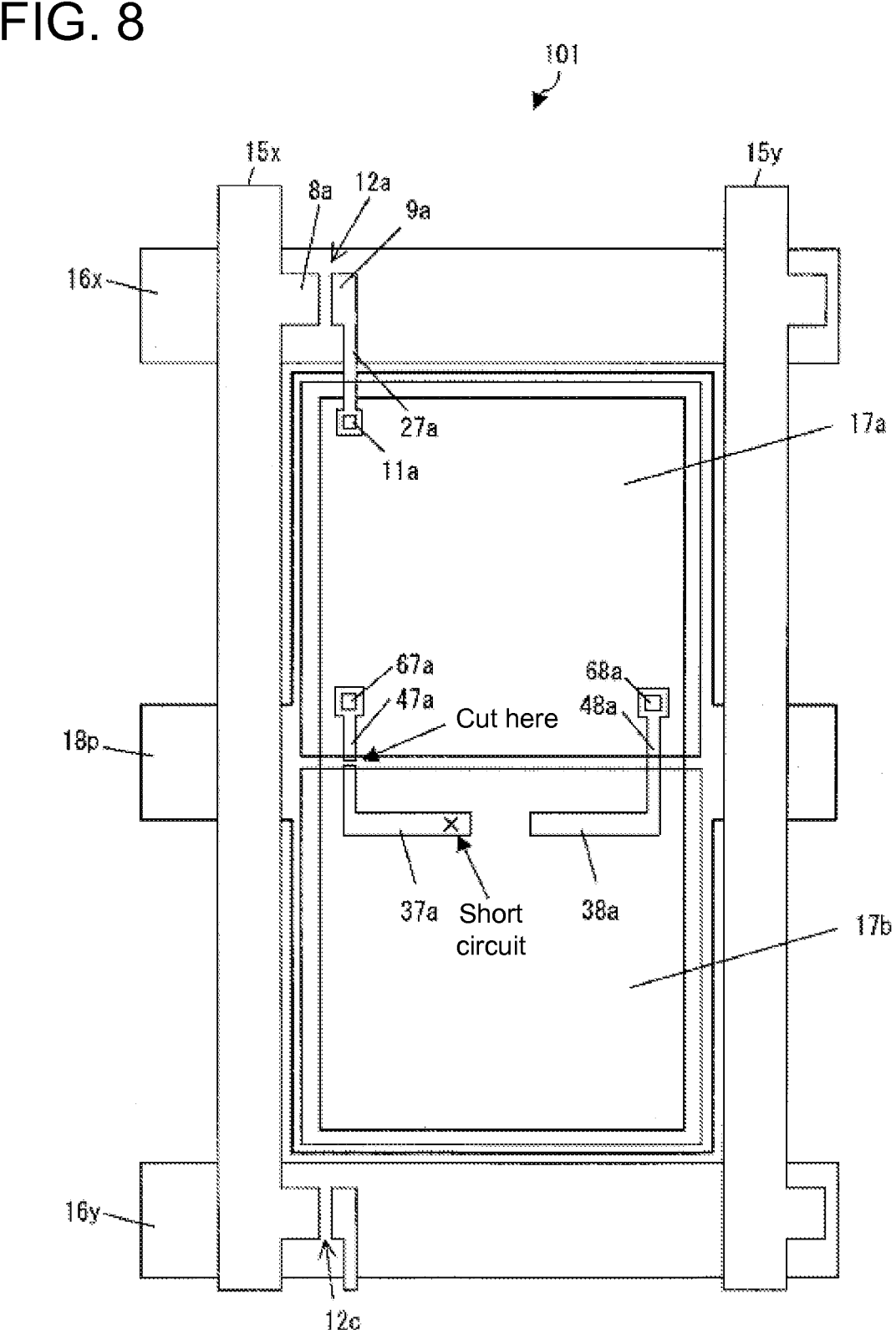
FIG. 8 is a plan view showing a repair method of the liquid crystal panel of FIG. 2.
Figure 9:
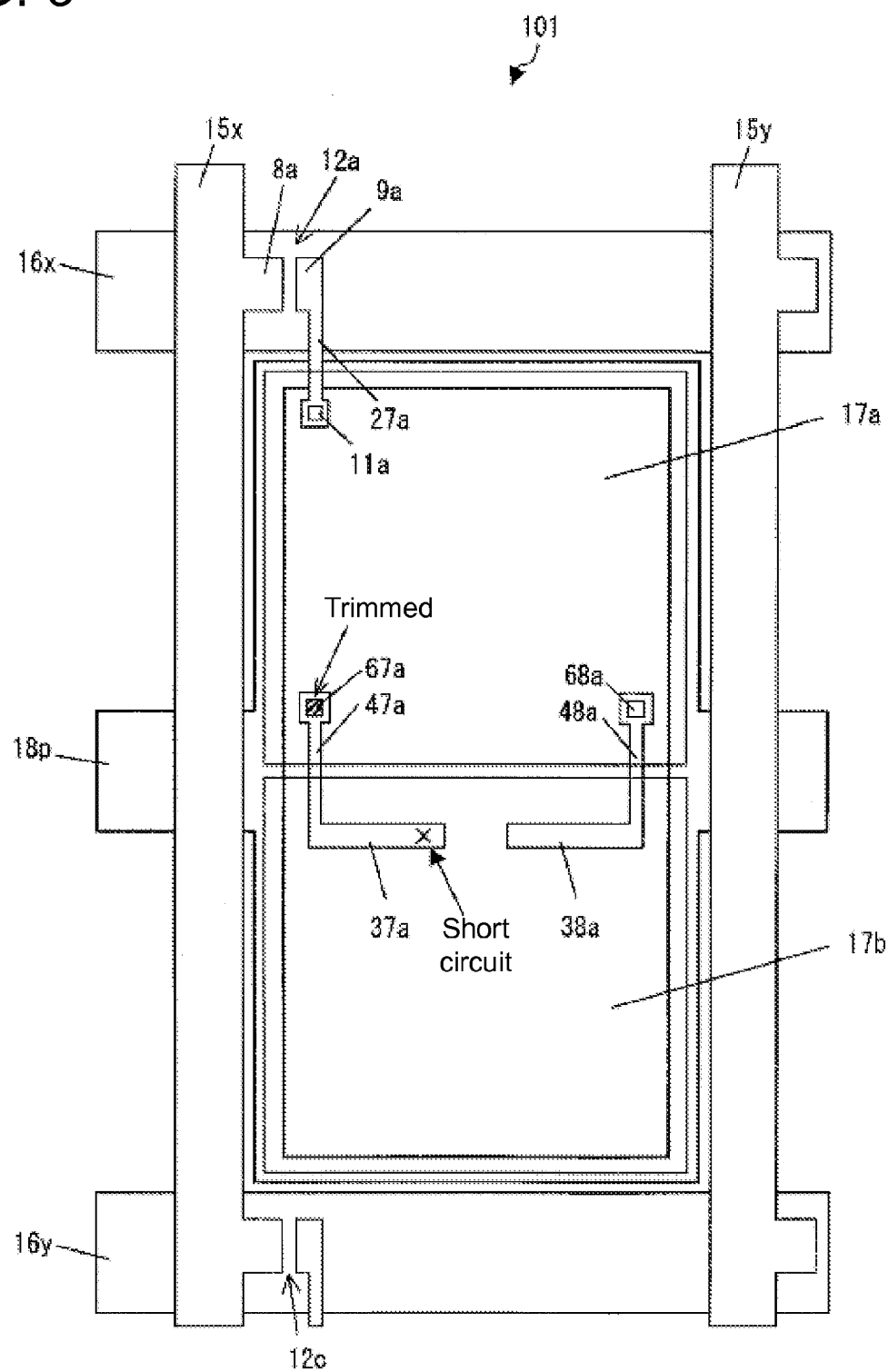
FIG. 9 is a plan view showing another repair method of the liquid crystal panel of FIG. 2.

In the liquid crystal panel of FIG. 2, the pixel electrode 17a and the pixel electrode 17b are connected (capacitively coupled) to each other through two coupling capacitances (Cab1 and Cab2) arranged side by side. Therefore, even when the lead-out wiring 47a, for example, is disconnected (during the manufacturing process or the like), capacitance coupling between the pixel electrodes 17a and 17b can be maintained by the capacitance electrode 38a. When a short-circuit occurs between the capacitance electrode 37a and the pixel electrode 17b (during the manufacturing process or the like) at P in FIG. 2, capacitance coupling between the pixel electrodes 17a and 17b can be maintained through the coupling capacitance formed at the location where the pixel electrode 17b and the capacitance electrode 38a overlap with each other by performing a repair process either by cutting the lead-out wiring 47a, as shown in FIG. 8, or by cutting the capacitance electrode 37a by laser between the location connected to the pixel electrode 17a and the short-circuit site. Alternatively, capacitance coupling between the pixel electrodes 17a and 17b can be maintained through the coupling capacitance formed at the location where the pixel electrode 17b and the capacitance electrode 38a overlap with each other by removing (trimming) a portion of the pixel electrode 17a inside the contact hole 67a using a laser or like, as shown in FIG. 9, to electrically disconnect the pixel electrode 17a from the capacitance electrode 37a. When a short-circuit occurs between the capacitance electrode 38a and the pixel electrode 17b, either the capacitance electrode 38a or the lead-out wiring 48a can be cut by laser between the contact hole 68a and the short-circuit site. Alternatively, a portion of the pixel electrode 17a inside the contact hole 68a can be removed (trimmed) using a laser or like.

If the aforementioned repair process is performed in the state of the active matrix substrate, the lead-out wiring 47a is cut by laser irradiation from the back side (glass substrate side) of the active matrix substrate. Alternatively, the lead-out wiring 47a is cut by laser irradiation from the front side (opposite side from the glass substrate) of the active matrix substrate through the gap between the pixel electrodes 17a and 17b (see FIG. 8). If the aforementioned repair process is performed in the state of the liquid crystal panel, the lead-out wiring 47a is cut by laser irradiation from the back side (glass substrate side of the active matrix substrate) of the liquid crystal panel.

According to the present embodiment, the production yield of liquid crystal panels and active matrix substrates to be used in the liquid crystal panels can be increased. Furthermore, two layers of insulating layers (gate insulating film and interlayer insulating film) are interposed between the capacitance electrodes (37a and 38a) and the pixel electrode (17b). Therefore, compared to a conventional configuration having only one layer (interlayer insulating film) interposed, the present embodiment can suppress short-circuit formation between the capacitance electrodes and the pixel electrode more.

Furthermore, in the present embodiment, the capacitance electrodes 37a and 38a are formed in the same layer as the scan signal lines, and are covered by the gate insulating film. Typically, the gate insulating film is formed at a higher temperature than the interlayer insulating film, which covers transistors. Therefore, the gate insulating film tends to be a denser film than the interlayer insulating film. Therefore, a greater advantage can be obtained in terms of preventing short-circuit formation between the capacitance electrodes and the pixel electrode.

Next, a method for manufacturing the present liquid crystal panel is described. The method for manufacturing the liquid crystal panel includes the steps of: manufacturing the active matrix substrate; manufacturing the color filter substrate; and assembling the substrates in which the substrates are bonded together and the liquid crystal is filled. Also, if any defective pixel (sub-pixel) is found in the inspection conducted at least during or after the manufacturing process or the assembly process of the active matrix substrate, a repair process to correct the defect is added to the entire process.

Below, the process of manufacturing an active matrix substrate is described.

First, over a substrate made of glass, plastic, or the like, a metal film of titanium, chrome, aluminum, molybdenum, tantalum, tungsten, copper, or the like, an alloy film of such metals, or a layered film (thickness: 1000 Å to 3000 Å) of such metals is deposited by sputtering. Then, patterning is conducted by a photolithographic technology (Photo Engraving Process; hereinafter referred to as the "PEP technique") to form scan signal lines, gate electrodes of transistors, (in some cases, the scan signal lines also function as gate electrodes), gate metal layer (capacitance electrodes 37a and 38a), and storage capacitance wirings.

Next, over the overall substrate having the scan signal lines and the like formed thereon, an inorganic insulating film (thickness: approx. 3000 Å to 5000 Å) made of silicon nitride, silicon oxide, or the like is deposited by CVD (Chemical Vapor Deposition) method to form a gate insulating film.

Subsequently, an intrinsic amorphous silicon film (thickness: 1000 Å to 3000 Å) and an n+ amorphous silicon film (thickness: 400 Å to 700 Å) doped with phosphorus are continuously deposited over the gate insulating film (over the entire substrate) by the CVD method. Then, the films are patterned by the PEP technique to form an island-shaped multi-layered body of silicon composed of the intrinsic amorphous silicon layer and the n+ amorphous silicon layer on the gate electrode.

Next, over the entire substrate having the multi-layered body of silicon formed thereon, a metal film of titanium, chrome, aluminum, molybdenum, tantalum, tungsten, copper, or the like, an alloy film of such metals, or a layered film (thickness: 1000 Å to 3000 Å) of such metals is deposited by sputtering. Then, patterning is conducted by the PEP technique to form data signal lines, source electrodes and drain electrodes of transistors, and drain lead-out wirings.

Further, using the source electrode and the drain electrode as a mask, the n+ amorphous silicon layer constituting the multi-layered body of silicon is etched to form a transistor channel. Here, although the semiconductor layer may be formed of amorphous silicon film as described above, a polysilicon film may alternatively be deposited. Also, the amorphous silicon film or the polysilicon film may optionally be subjected to a laser annealing treatment for improved crystallinity. This treatment makes the electrons in the semiconductor layer move faster, and therefore improves the characteristics of the transistor (TFT).

Next, over the entire substrate with data signal lines and the like formed thereon, an inorganic insulating film of silicon nitride, silicon oxide, or the like (thickness: 2000 Å to 5000 Å) is deposited by the CVD method to form an inorganic interlayer insulating film.

Subsequently, using the PEP technique, the interlayer insulating film is etched away to form contact holes. Then, over the interlayer insulating film on the entire substrate with contact holes formed therein, a transparent conductive film made of ITO (Indium Tin Oxide), IZO (Indium Zinc Oxide), zinc oxide, tin oxide, or the like (thickness: 1000 Å to 2000 Å) is formed by sputtering. Then, patterning is conducted using the PEP technique to form pixel electrodes.

Lastly, a polyimide resin is printed to a thickness of 500 Å to 1000 Å over the overall substrate with the pixel electrodes formed thereon. Then, through baking and a unidirectional rubbing treatment using a rotating cloth, an alignment film is formed. The active matrix substrate is manufactured in this manner.

Below, the process of manufacturing the color filter substrate is described.

First, over a substrate made of glass, plastic, or the like (over the entire substrate), a chrome thin film or a resin containing a black pigment is deposited. Then, using the PEP technique, the film is patterned to form a black matrix. Next, in openings in the black matrix, a color filter layer (thickness: approx. 2 μm) of red, green, and blue is formed by patterning using a pigment dispersing method or the like.

Next, on the color filter layer over the entire substrate, a transparent conductive film (thickness: approx. 1000 Å) made of ITO, IZO, zinc oxide, tin oxide, or the like is deposited to form a common electrode (com).

Lastly, a polyimide resin is printed to a thickness of 500 Å to 1000 Å over the entire substrate with the common electrode formed thereon. Then, through baking and a unidirectional rubbing treatment using a rotating cloth, an alignment film is formed. The color filter substrate can be manufactured in this manner.

Below, the assembly process is described.

First, a sealing material made of a thermosetting epoxy resin or the like is applied on either the active matrix substrate or the color filter substrate by screen printing in a frame-like pattern with an opening, which will be the inlet for the liquid crystal. On the other substrate, ball-shaped spacers made of plastic or silica and having a diameter equivalent to the thickness of the liquid crystal layer are dispersed.

Next, the active matrix substrate and the color filter substrate are bonded together, and the sealing material is cured.

Lastly, liquid crystal material is introduced into the space surrounded by the active matrix substrate, the color filter substrate, and the sealing material by a decompression procedure. Then, a UV-curable resin is applied to the inlet for the liquid crystal, and is subjected to UV radiation to seal in the liquid crystal material, and thereby to form a liquid crystal layer. The liquid crystal panel is manufactured in this manner.

Below, the first inspection process, which is conducted during the active matrix substrate manufacturing process (after the pixel electrodes are formed and before the alignment film is formed, for example) or after the active matrix substrate manufacturing process, is described. In the first inspection process, the active matrix substrate is subjected to an appearance inspection, electro-optical inspection, and the like to identify the location of any short-circuit (short-circuit site). For example, a short-circuit can occur between the capacitance electrode and a pixel electrode. The appearance inspection refers to an optical inspection of the wiring pattern using a CCD camera or the like, and the electro-optical inspection refers to an inspection in which, after a modulator (electro-optic element) is installed to face the active matrix substrate, a voltage is applied and light is passed between the active matrix substrate and the modulator. The change in luminance of the light is detected by the CCD camera for the electro-optical examination of the wiring pattern.

If any short-circuit site is detected, a repair process is conducted in which a shorted capacitance electrode or a conductive portion connected to the shorted capacitance electrode (drain lead-out wirings 47a or 48a of FIG. 2, for example) is cut by laser. For the laser cutting, the fourth harmonic (wavelength: 266 nm) of YAG (Yttrium Aluminum Garnet) laser, for example, is used. High cutting precision can be obtained this way. Alternatively, when any short-circuit site is detected with respect to the pixel electrode connected to a shorted capacitance electrode through a contact hole, a portion inside the contact hole is removed (trimmed) by laser or the like. In the repair process performed after the first inspection process, typically, laser irradiation can be performed from the front side (pixel electrode side) or the back side (substrate side) of the active matrix substrate.

The first inspection process and the repair process may be performed after pixel electrodes have been formed, after capacitance electrodes have been formed, or after channels of transistors have been formed. That way, a defect can be corrected at an earlier stage of the manufacturing process, and the manufacturing yield of the active matrix substrate can be improved.

Next, the second inspection process, which is performed after the assembling process, is explained. In the second inspection process, a short-circuit site is detected by performing a lighting test of the liquid crystal panel. For example, a short-circuit may occur between a capacitance electrode and a pixel electrode. Specifically, a gate inspection signal of +15 V pulse voltage (bias voltage: −10 V; cycle: 16.7 msec; pulse width: 50 μsec), for example, is input to the respective scan signal lines, thereby turning on all TFTs. Then, a source inspection signal of ±2 V potential that reverses the polarity every 16.7 msec is input to the respective data signal lines, thereby writing signal potentials corresponding to ±2 V to the pixel electrode through the source electrode and the drain electrode of the respective TFTs. At the same time, a common electrode inspection signal of −1V potential is input by a direct current to the common electrode (com) and the storage capacitance wiring. At this time, a voltage is applied to the liquid crystal capacitance formed between the pixel electrodes and the common electrode, and to the storage capacitance formed between the pixel electrodes and the storage capacitance wiring, thereby lighting the sub-pixels formed of the pixel electrodes. At the short-circuit site, the pixel electrode and the capacitance electrode are conducted, and a sub-pixel that was supposed to be a dark sub-pixel becomes a bright sub-pixel. Short-circuit sites are detected this way.

If any short-circuit site is detected, a repair process is conducted in which a shorted capacitance electrode or a conductive portion connected to the shorted capacitance electrode (lead-out wiring, for example) is cut by laser. In the repair process performed after the second inspection process, typically, laser irradiation is performed from the back side (substrate side of the active matrix substrate) of the active matrix substrate.

Figure 4:
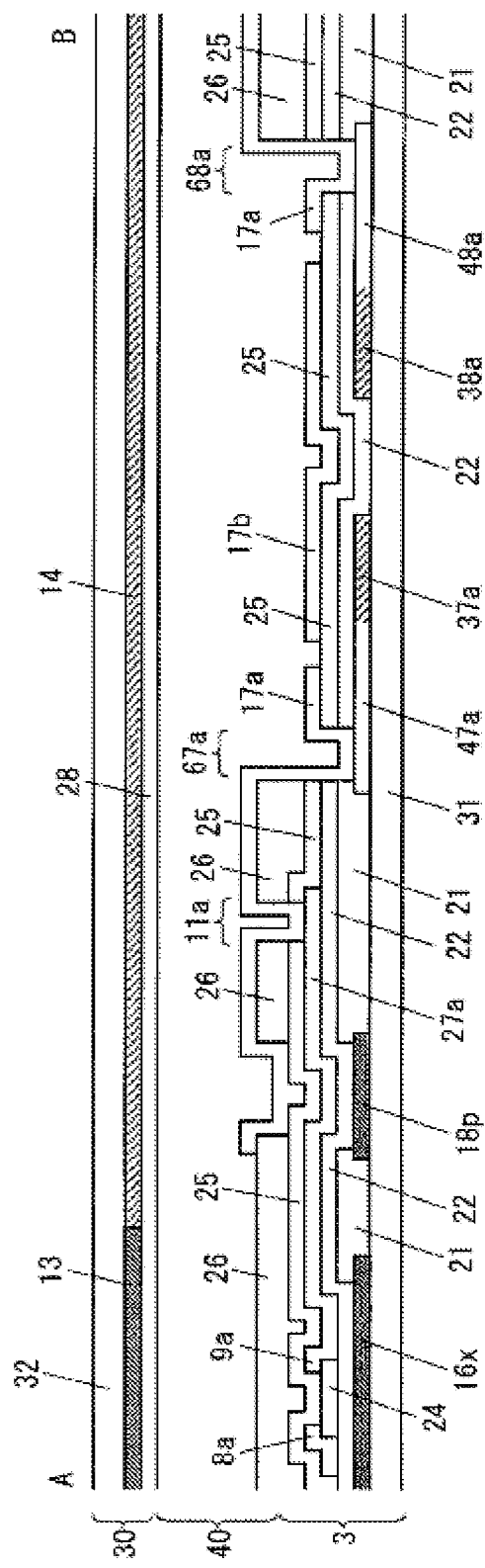
FIG. 4 is a cross-sectional arrow view of a modified configuration of FIG. 2, taken along the line A-B.

The cross-section along the line A-B of FIG. 2 may be configured as shown in FIG. 4. Over the glass substrate 31, a thick organic gate insulating film 21 and a thin inorganic gate insulating film 22 are formed, and a thin inorganic interlayer insulating film 25 and a thick organic interlayer insulating film 26 are formed below pixel electrodes. This configuration provides advantages including reduction in various parasitic capacitances, prevention of short-circuit between wirings, and reduction of problems such as torn pixel electrode due to planarization. As shown in FIG. 4, in this configuration, it is preferable to remove portions of the organic gate insulating film 21 and the organic interlayer insulating film 26 located over the capacitance electrodes 37a and 38a. This way, the advantage of improved yield can be obtained while ensuring sufficient capacitance values of the coupling capacitances Cab1 and Cab2.

Figure 10:
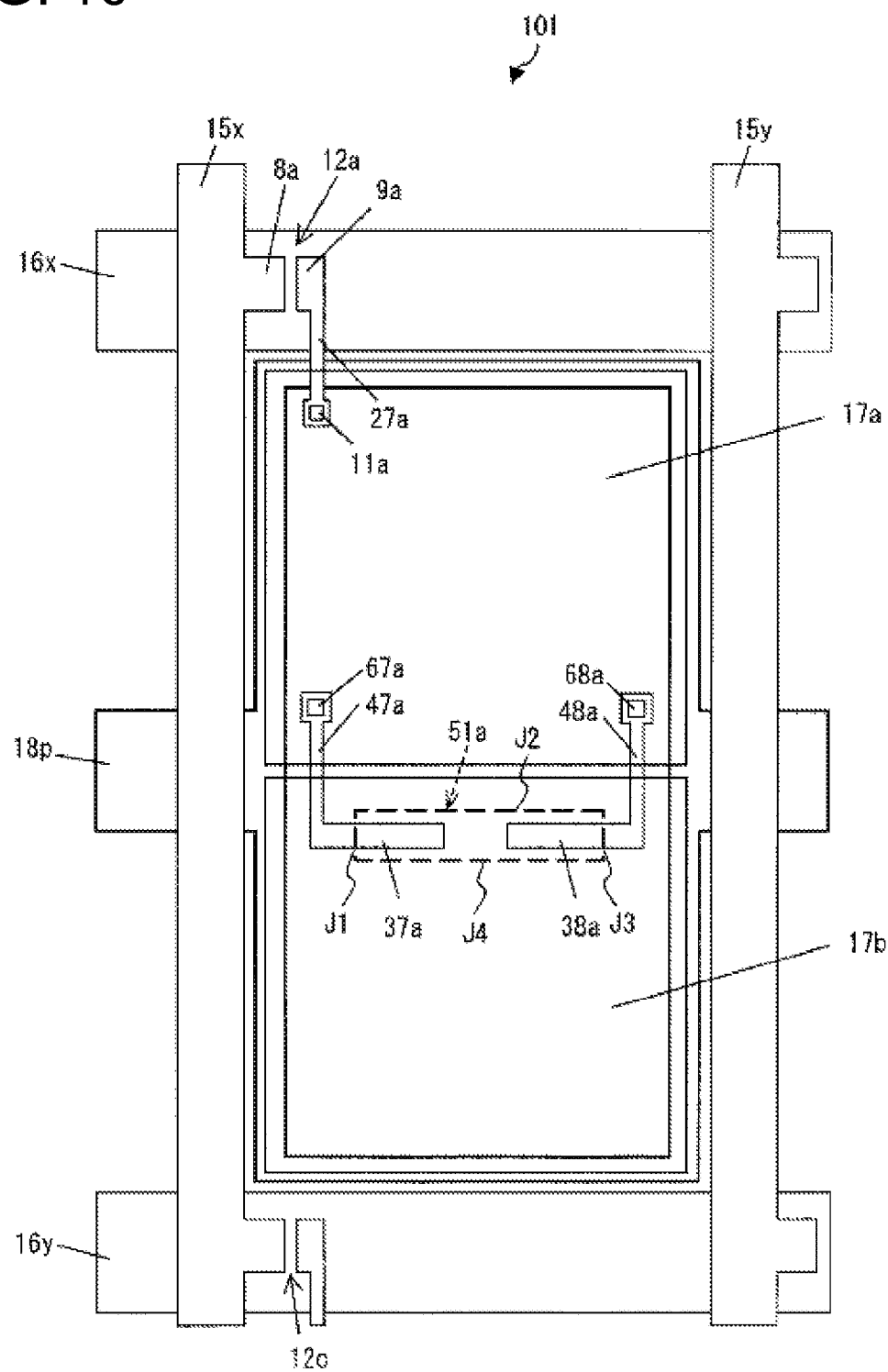
FIG. 10 is a plan view showing another specific example of the liquid crystal panel shown in FIG. 1.

The portion to be removed (thin film portion 51a) of the organic interlayer insulating film 26 preferably is the region shown by the dotted line in FIG. 10. Specifically, as shown in FIG. 10, the thin film portion 51a is formed in a rectangular shape by the first side (J1) to the forth side (J4). The capacitance electrode 37a crosses the first side (J1), and the capacitance electrode 38a, which is arranged side by side with the capacitance electrode 37a in the row direction, crosses the third side (J3), which is the opposite side of the first side (J1).

This way, even when the capacitance electrodes 37a and 38a are misaligned in the row direction, the area where the capacitance electrode 37a and the pixel electrode 17b overlap with each other and the area where the capacitance electrode 38a and the pixel electrode 17b overlap with each other compensate for each other. Therefore, it is more difficult for the total amount of the two capacitances (coupling capacitances Cab1 and Cab2) to change, which is advantageous. Needless to say, this configuration can be applied to each of the liquid crystal panels described later.

The inorganic interlayer insulating film 25, the organic interlayer insulating film 26, and the contact holes 11a, 67a, and 68a of FIG. 4 can be formed as follows, for example. First, transistors, data signal lines, and the like are formed. Then, the inorganic interlayer insulating film 25 (passivation film) made of approximately 3000 Å-thick SiNx is formed to cover the overall substrate by CVD using a mixed gas of $SiH_4$, $NH_3$, and $N_2$. Next, the organic interlayer insulating film 26 made of an approximately 3 μm-thick positive-type photosensitive acrylic resin is formed by spin coating or by die coating. Next, the organic interlayer insulating film 26 is subjected to photolithography for patterning of portions to be removed and various contacts. Then, using the patterned organic interlayer insulating film 26 as a mask, a mixed gas of $CF_4$ and $O_2$ is used to dry-etch the inorganic interlayer insulating film 25 at the location of the contact hole 11a, and also to dry-etch the inorganic interlayer insulating film 25 and the gate insulating film 22 located at the locations of the contact holes 67a and 68a. Specifically, at the location of the contact hole 11a, for example, the organic insulating film undergoes half-exposure in the photolithography process so that a thin layer of the organic interlayer insulating film remains when development is complete. At the locations of the contact holes 67a and 68a, the organic insulating film undergoes full exposure in the photolithography process so that there is no residue of the organic interlayer insulating film left when development is complete. Here, when the dry-etching using the mixed gas of $CF_4$ and $O_2$ is conducted, at the location of contact hole 11a, the residual film (of the organic interlayer insulating film) is removed first, and then the inorganic interlayer insulating film 25 is removed. At the locations of the contact holes 67a and 68a, the inorganic interlayer insulating film 25 under the organic interlayer insulating film is removed first, and then, the gate insulating film 22 is removed. The organic interlayer insulating film 26 may be an insulating film made of, for example, SOG (spin-on-glass) material. Also, the organic interlayer insulating film 26 may contain at least any one of acrylic resin, epoxy resin, polyimide resin, polyurethane resin, novolac resin, and siloxane resin.

Figure 11:
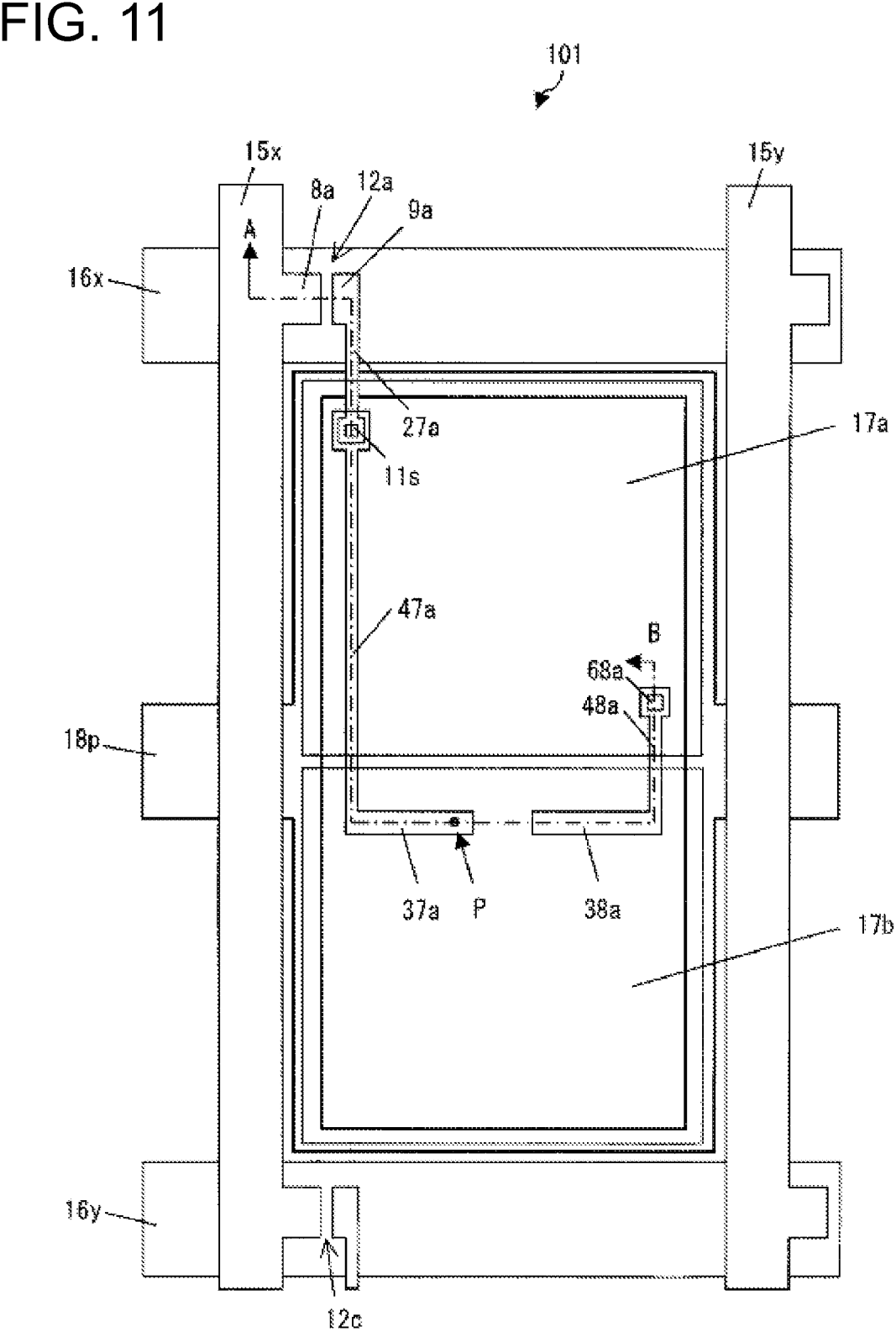
FIG. 11 is a plan view showing another specific example of the liquid crystal panel shown in FIG. 1.

The pixel electrode 101 of FIG. 2 may be modified as shown in FIG. 11. The lead-out wiring 47a connected to the capacitance electrode 37a is extended to the location overlapping with the drain lead-out wiring 27a, thereby connecting the capacitance electrode 37a, the lead-out wiring 47a, the drain lead-out wiring 27a, and the pixel electrode 17a together through a contact hole 11s. This way, the two contact holes (11a and 67a) of FIG. 2 can be combined into one contact hole (11s). The liquid crystal orientation tends to be disarrayed at locations where contact holes are formed because of the step structure of the contact holes, which can make contact holes visually identifiable. By combining the contact holes into one as described above, the region where the liquid crystal orientation may be disarrayed is made smaller, which improves the display quality. When such disarrayed liquid crystal orientation is concealed by a light-shielding film (black matrix, for example) or by a widened capacitance electrode, the light-shielding area can be reduced by combining the contact holes into one, and the aperture ratio can be improved accordingly.

Figure 12:
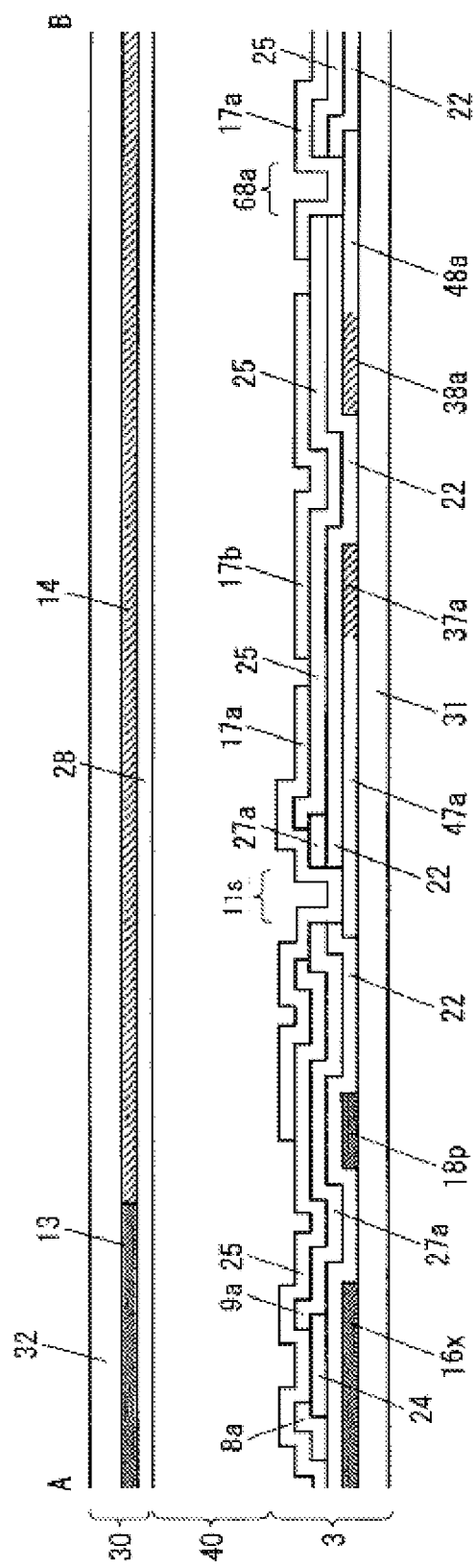
FIG. 12 is a cross-sectional arrow view taken along the line A-B of FIG. 11.

FIG. 12 is a cross-sectional arrow view taken along the line A-B of FIG. 11. As shown in the figure, the interlayer insulating film 25 and the gate insulating film 22 are removed in the contact hole 11s. Therefore, the capacitance electrode 37a, the lead-out wiring 47a, the drain lead-out wiring 27a, and the pixel electrode 17a become interconnected. At the location where the contact hole 11s is formed, the gate insulating film 22 is etched away by the PEP technique, for example, before the drain lead-out wiring 27a is formed.

In the liquid crystal panel of FIG. 11, when a short-circuit occurs (during the manufacturing process or the like) between the capacitance electrode 37a and the pixel electrode 17b at "P" in the figure, by performing a repair process in which the lead-out wiring 47a is cut at a portion below the contact hole 11s, the capacitance coupling between the pixel electrodes 17a and 17b is maintained through the coupling capacitance formed at the portion where the pixel electrode 17b and the capacitance electrode 38a overlap with each other.

Figure 13:
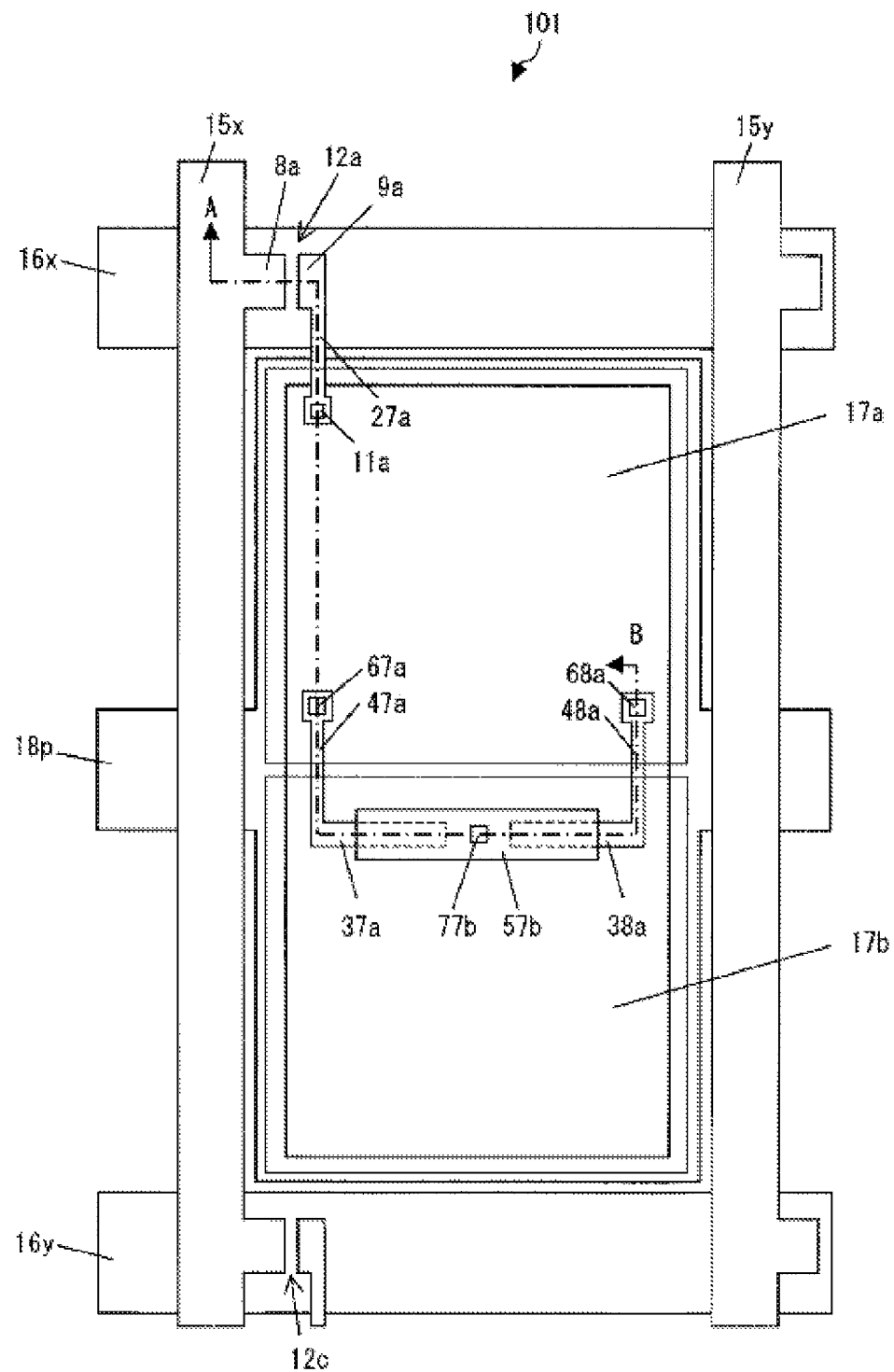
FIG. 13 is a plan view showing another specific example of the liquid crystal panel shown in FIG. 1.
Figure 14:
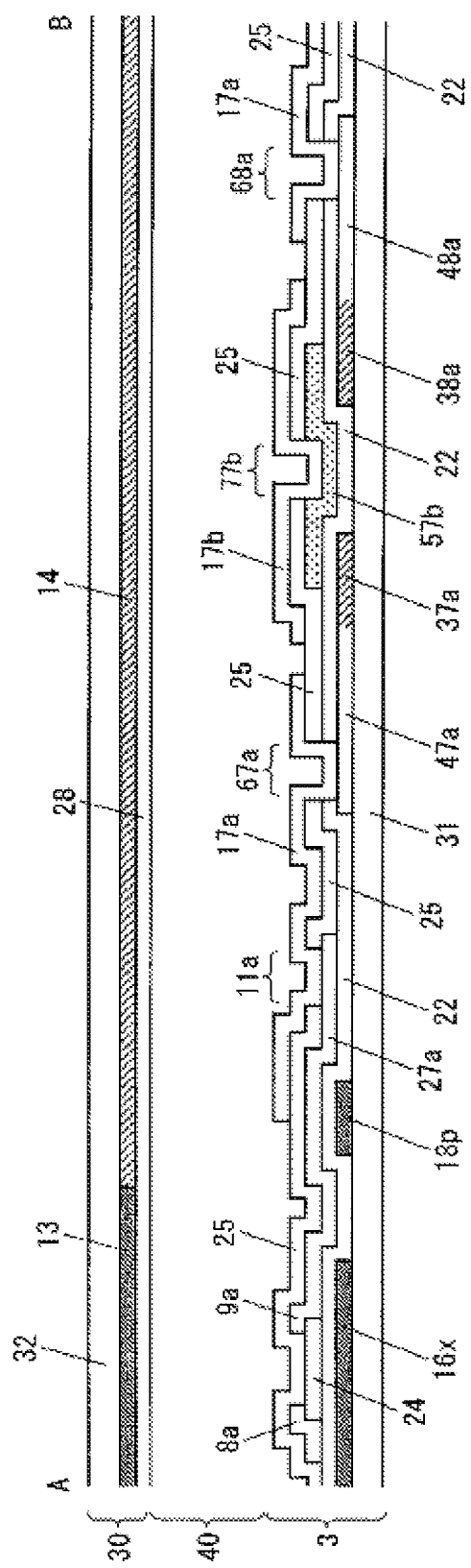
FIG. 14 is a cross-sectional arrow view taken along the line A-B of FIG. 13.

In order to increase the capacitance values of the coupling capacitances (Cab1 and Cab2), the configuration shown in FIGS. 13 and 14 may be used. In the liquid crystal panel of FIG. 13, a capacitance upper electrode 57b is formed in the same layer as the drain lead-out wiring 27a. The capacitance upper electrode 57b is connected to the pixel electrode 17b through the contact hole 77b, and overlaps with the capacitance electrodes 37a and 38a through the gate insulating film 22 (see FIG. 14). Consequently, at the locations where the capacitance upper electrode 57b overlap with the capacitance electrodes 37a and 38a, respectively, the coupling capacitances Cab1 and Cab2 between the pixel electrodes 17a and 17b are formed. In this configuration, compared to the case shown in FIG. 2 in which the coupling capacitances Cab1 and Cab2 are formed between the pixel electrode 17b and the capacitance electrodes 37a and 38b, the coupling capacitance value can be made larger because the insulating film interposed therebetween can be reduced (made thinner). Furthermore, because the insulating film forming the coupling capacitances Cab1 and Cab2 can be made thin, the widths of the capacitance electrodes 37a and 38a and of the capacitance upper electrode 57b can be made narrower without changing the coupling capacitance value, which improves the aperture ratio without decreasing reliability.

Here, in the liquid crystal panel of FIG. 13, the capacitance upper electrode 57b is formed between the capacitance electrodes 37a and 38a and the pixel electrode 17b. Because of this, there is a risk of short-circuit formation between the capacitance upper electrode 57b and the capacitance electrode 37a (38a) in addition to the risk of short-circuit formation between the capacitance electrodes 37a or 38a and the pixel electrode 17b, which was described above. Even in this case, however, capacitance coupling between the pixel electrodes 17a and 17b can be maintained by conducting one of the repair processes described above, such as cutting the lead-out wiring 47a (48a) by laser, and removing (trimming) the portion of the pixel electrode 17b inside the contact hole 77b by laser or the like, for example.

Figure 15:
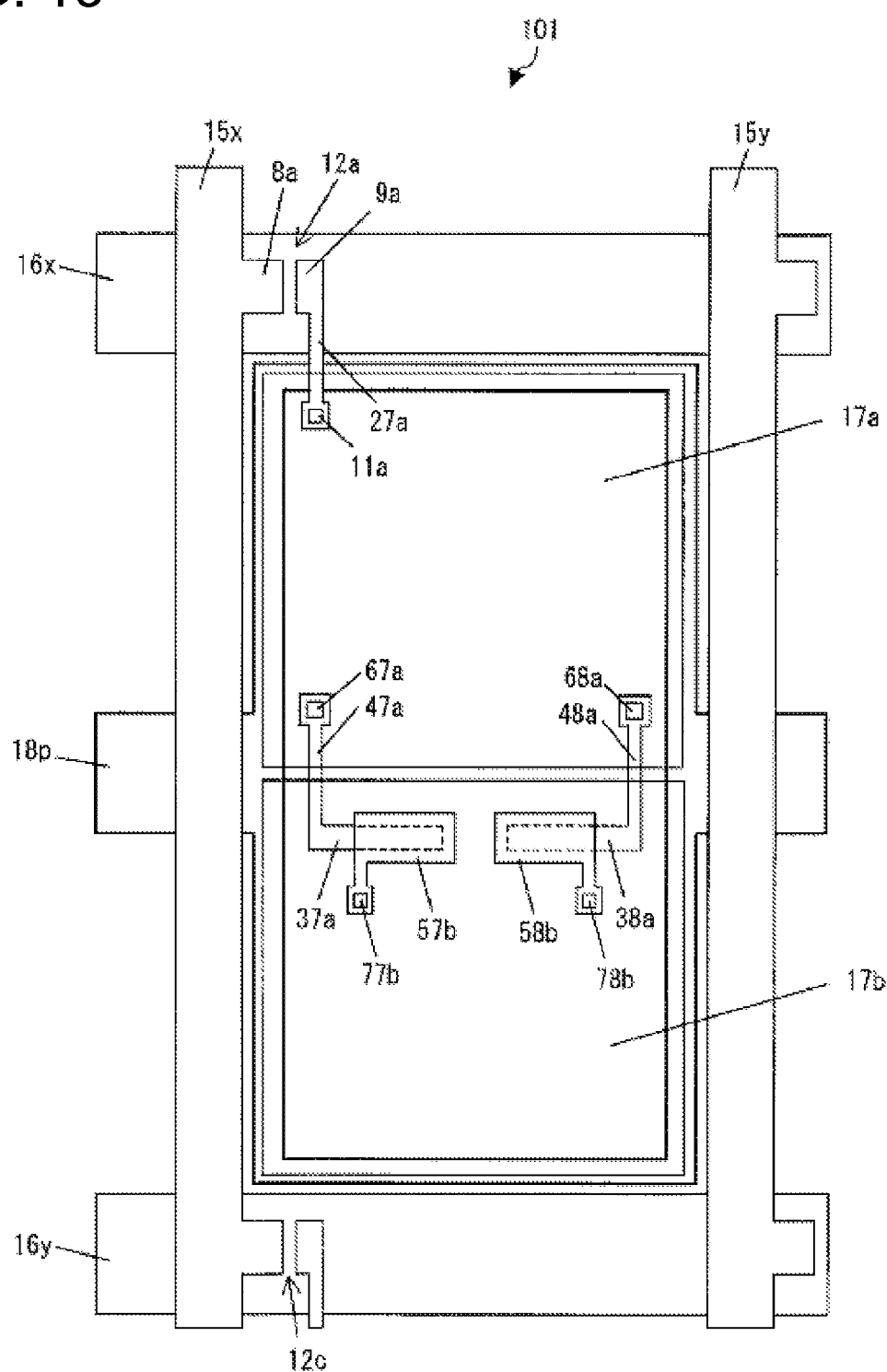
FIG. 15 is a plan view showing another specific example of the liquid crystal panel shown in FIG. 1.

In FIG. 13, the capacitance upper electrode 57b is formed of a single capacitance upper electrode to overlap with the capacitance electrode 37a and 38a, respectively. However, as an alternative configuration, two capacitance upper electrodes may be provided as shown in FIG. 15. In this configuration, one of the capacitance upper electrodes 57b overlaps with the capacitance electrode 37a, and the other capacitance upper electrode 58b overlaps with the capacitance electrode 38a. The respective capacitance upper electrodes 57b and 58b are individually connected to the pixel electrode 17b through different contact holes 77b and 78b, respectively.

Configurations in which a capacitance upper electrode(s) overlapping with the capacitance electrodes is provided as shown in FIGS. 13 and 15 can be applied to each of the liquid crystal panels (including the respective liquid crystal panels shown in Embodiments 2 to 4), which are described later.

Figure 16:
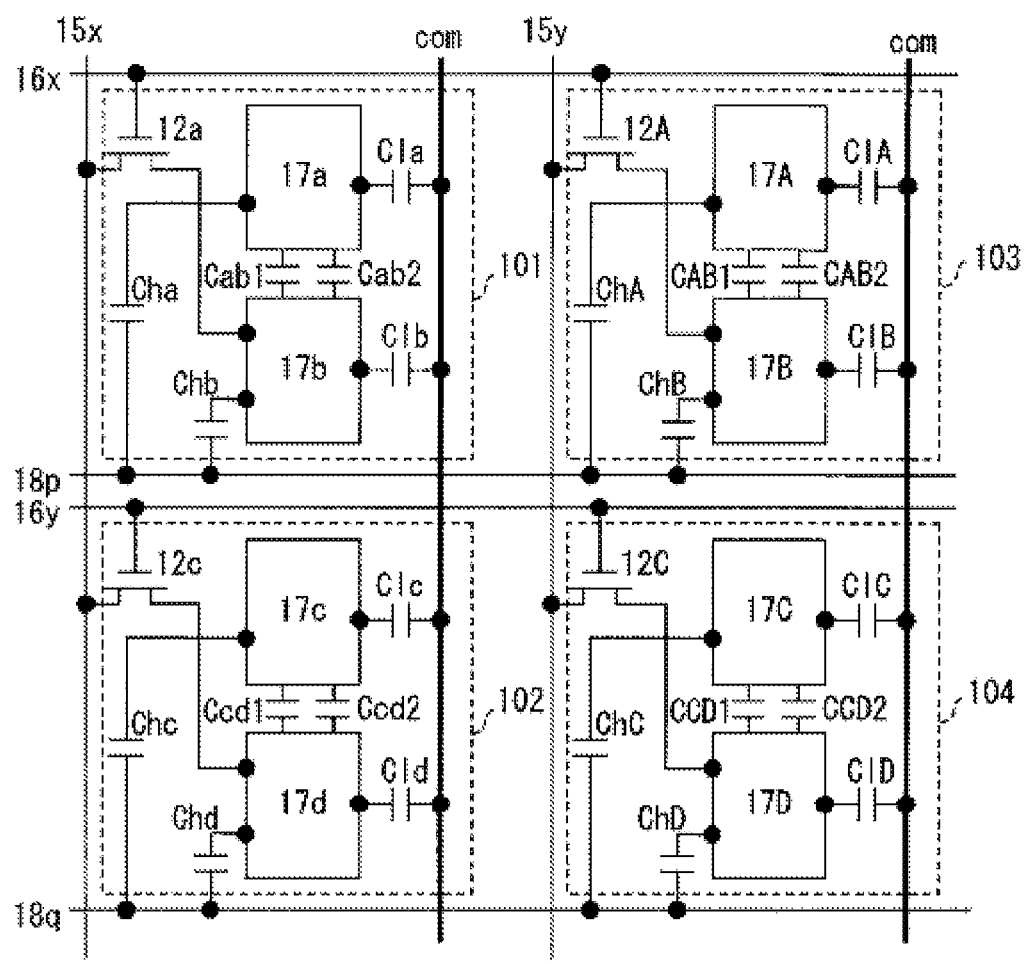
FIG. 16 is a circuit diagram showing another configuration of a liquid crystal panel according to Embodiment 1.
Figure 17:
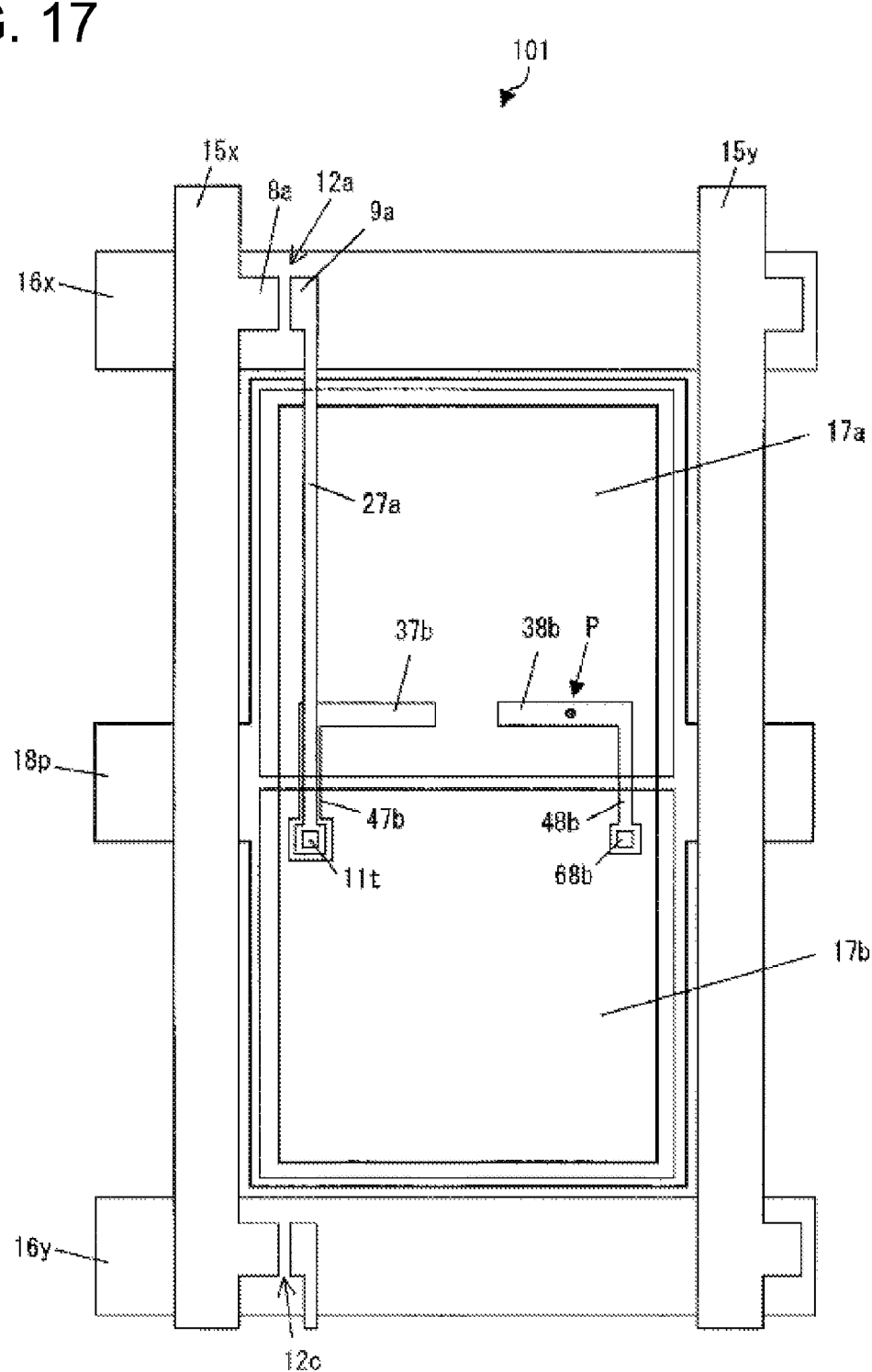
FIG. 17 is a plan view showing a specific example of the liquid crystal panel shown in FIG. 16.

In the liquid crystal panel of FIG. 1, out of the two pixel electrodes provided in a single pixel, the one closer to the transistor is connected to the transistor. However, the present invention is not limited to such. As shown in FIG. 16, out of the two pixel electrodes provided in a single pixel, the one farther from the transistor may be connected to the transistor. A specific example of the pixel 101 of FIG. 16 is shown in FIG. 17. In the liquid crystal panel of FIG. 17, the transistor 12a is disposed in the proximity of the intersection of the data signal line 15x and the scan signal line 16x, and in the pixel region defined by the signal lines (15x and 16x), the rectangular-shaped pixel electrode 17a and the rectangular-shaped pixel electrode 17b are arranged in the column direction. One of the four sides constituting the perimeter of the first pixel electrode and one of the four sides constituting the perimeter of the second pixel electrode are disposed adjacent to each other. The storage capacitance wiring 18p has a storage capacitance wiring extension that branches off from the storage capacitance wiring 18p, and is disposed such that it extends to overlap with portions of the edges of the pixel electrodes 17a and 17b when observed in a plan view. The respective capacitance electrodes 37b and 38b are arranged to overlap with the pixel electrode 17a.

More specifically, the capacitance electrode 37b extends in the same direction as the extending direction of the scan signal line 16x to overlap with the pixel electrode 17a. The capacitance electrode 38b is arranged side by side with the capacitance electrode 37b in the row direction (the aforementioned extending direction), and extends in the same direction as the extending direction of the scan signal line 16x to overlap with the pixel electrode 17a. The respective capacitance electrodes 37b and 38b are formed in the same layer as the scan signal line 16x.

Over the scan signal line 16x, the source electrode 8a and the drain electrode 9a of the transistor 12a are formed. The source electrode 8a is connected to the data signal line 15x, and the drain electrode 9a is connected to the drain lead-out wiring 27a. The drain lead-out wiring 27a, the capacitance electrode 37b, and the pixel electrode 17b are interconnected by a single contact hole 11t. Therefore, the drain lead-out wiring 27a is connected to the pixel electrode 17b through the contact hole 11t, and the lead-out wiring 47b connected to the capacitance electrode 37b is connected to the pixel electrode 17b through the contact hole 11t. Additionally, the capacitance electrode 37b overlaps with the pixel electrode 17a through the gate insulating film and the interlayer insulating film, and the coupling capacitance Cab1 (see FIG. 16) between the pixel electrodes 17a and 17b is formed at the location of the overlap. The capacitance electrode 38b overlaps with the pixel electrode 17a through the gate insulating film and the interlayer insulating film, and a lead-out wiring 48b connected to the capacitance electrode 38b is connected to the pixel electrode 17b through a contact hole 68b. As a result, the coupling capacitance Cab2 (see FIG. 16) between the pixel electrodes 17a and 17b is formed at the location where the capacitance electrode 38b and the pixel electrode 17a overlap with each other.

Also, the pixel electrode 17a and the storage capacitance wiring 18p overlap with each other through the interlayer insulating film and the gate insulating film, and the storage capacitance Cha (see FIG. 16) is formed at the location of the overlap. The pixel electrode 17b and the storage capacitance wiring 18p overlap with each other through the interlayer insulating film and the gate insulating film, and the storage capacitance Chb (see FIG. 16) is formed at the location of the overlap. Configuration (the shapes and locations of the respective members and the relation of connection among them) of other pixels is the same as that of the pixel 101.

In the liquid crystal panel of FIG. 17, the sub-pixel that includes the pixel electrode 17a becomes "DA," and the sub-pixel that includes the pixel electrode 17b becomes "BR."

In the liquid crystal panel of FIG. 17, the pixel electrode 17a and the pixel electrode 17b are connected (capacitively coupled) to each other by the two coupling capacitances (Cab1 and Cab2) arranged side by side. Therefore, even when the lead-out wiring 48b, for example, is disconnected (during the manufacturing process or the like), the capacitance coupling between the pixel electrodes 17a and 17b can be maintained by the capacitance electrode 37b. When a short-circuit occurs (during the manufacturing process or the like) between the capacitance electrode 38b and the pixel electrode 17a at "P" shown in FIG. 17, the capacitance coupling between the pixel electrodes 17a and 17b can be maintained through the coupling capacitance formed at the location where the pixel electrode 17a and the capacitance electrode 37b overlap with each other by performing a repair process either by cutting the lead-out wiring 48b, or by cutting the capacitance electrode 38b by laser between the location connected to the pixel electrode 17b and the short-circuit site. Alternatively, the capacitance coupling between the pixel electrodes 17a and 17b can be maintained through the coupling capacitance formed at the location where the pixel electrode 17a and the capacitance electrode 37b overlap with each other by removing (trimming) a portion of the pixel electrode 17b inside the contact hole 68b by laser or the like to electrically disconnect the pixel electrode 17b from the capacitance electrode 38b. If a short-circuit occurs between the capacitance electrode 37b and the pixel electrode 17a, the capacitance electrode 37b or the lead-out wiring 47b can be cut between the contact hole 11t and the short-circuit site by laser.

As described above, a higher production yield of liquid crystal panels and active matrix substrates to be used in the liquid crystal panels can be achieved in the present configuration as well. Further, occurrence of short-circuits between the capacitance electrodes and the pixel electrode can be suppressed because the capacitance electrodes (37b and 38b) are formed in the same layer as the scan signal line.

Figure 18:
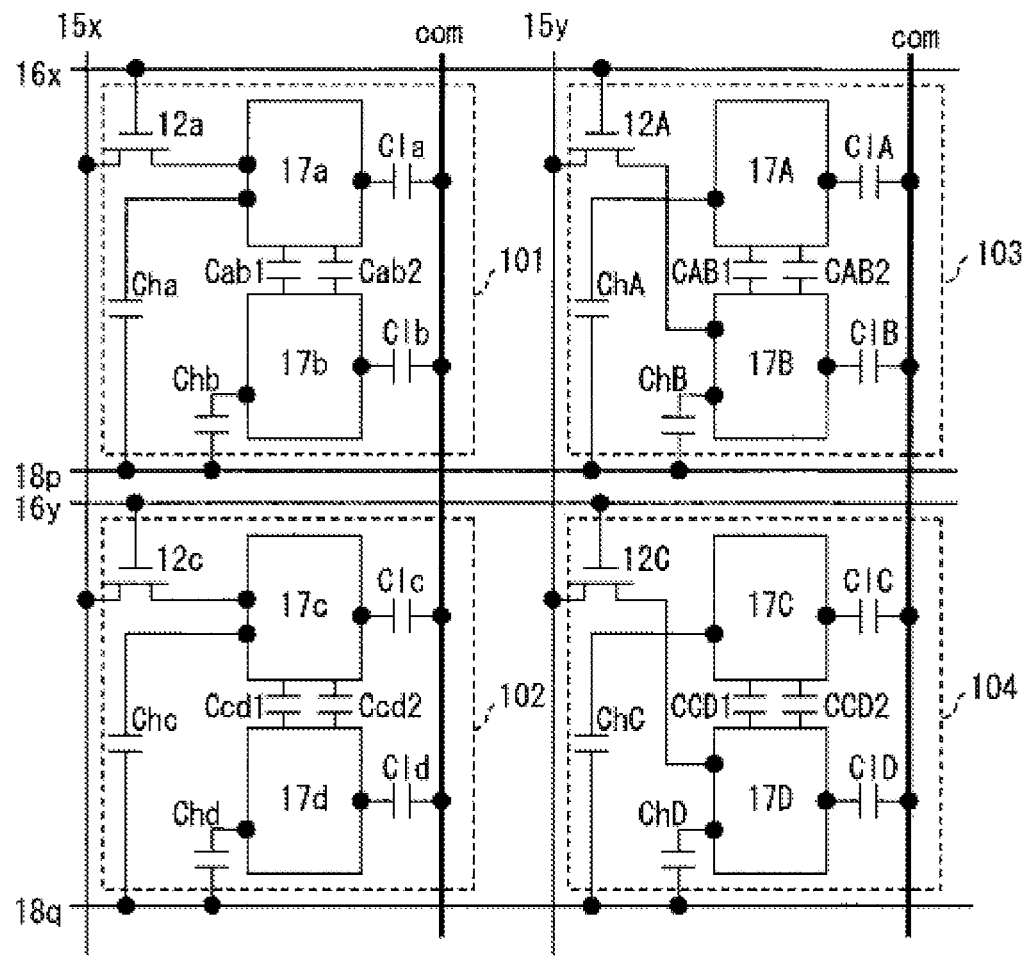
FIG. 18 is a circuit diagram showing another configuration of the liquid crystal panel according to Embodiment 1.
Figure 19:
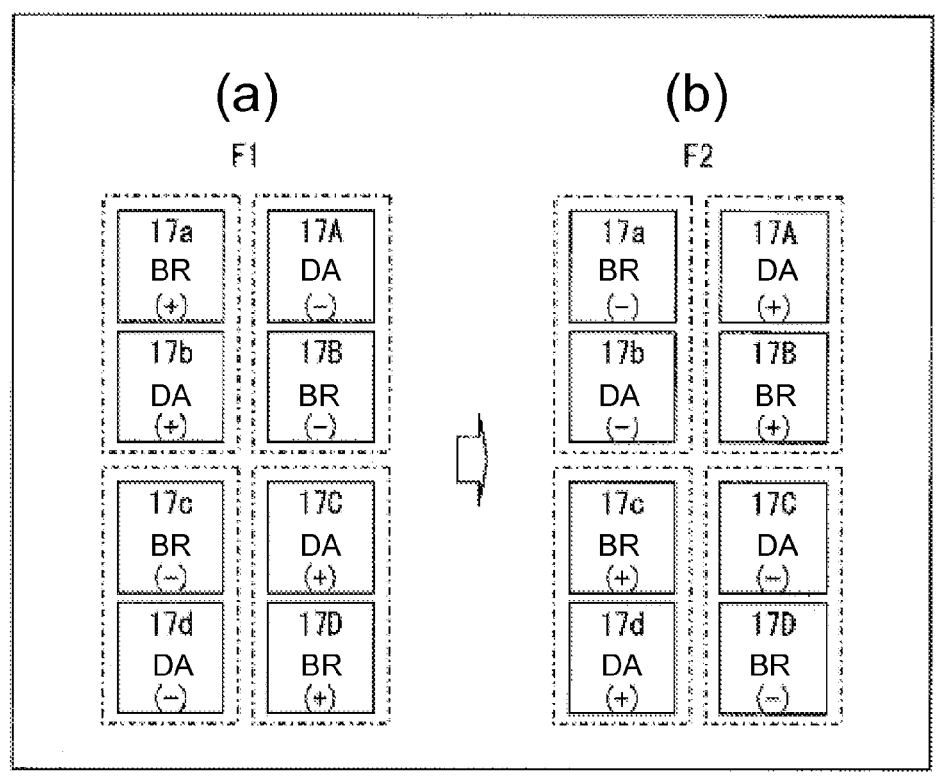
FIG. 19 is a schematic view showing the display state of respective frames when the drive method of FIG. 5 is used for a liquid crystal display device equipped with the liquid crystal panel of FIG. 18.

The liquid crystal panel of FIG. 1 may be configured as shown in FIG. 18. In FIG. 18, in one of the two adjacent pixels in the row direction, the pixel electrode proximal to the transistor is connected to the transistor, and in the other pixel, the pixel electrode distal to the transistor is connected to the transistor.

In the liquid crystal display device equipped with the liquid crystal panel of FIG. 18, when the data signal lines 15x and 15y are driven as shown in FIG. 5, in frame F1, the sub-pixel that includes the pixel electrode 17a (positive polarity) becomes "BR," and the sub-pixel that includes the pixel electrode 17b (positive polarity) becomes "DA." The sub-pixel that includes the pixel electrode 17c (negative polarity) becomes "BR," and the sub-pixel that includes the pixel electrode 17d (negative polarity) becomes "DA." The sub-pixel that includes the pixel electrode 17A (negative polarity) becomes "DA," and the sub-pixel that includes the pixel electrode 17B (negative polarity) becomes "BR." FIG. 19(a) shows the overall picture. In frame F2, the sub-pixel that includes the pixel electrode 17a (negative polarity) becomes "BR," and the sub-pixel that includes the pixel electrode 17b (negative polarity) becomes "DA." The sub-pixel that includes the pixel electrode 17c (positive polarity) becomes "BR," and the sub-pixel that includes the pixel electrode 17d (positive polarity) becomes "DA." The sub-pixel that includes the pixel electrode 17A (positive polarity) becomes "DA," and the sub-pixel that includes the pixel electrode 17B (positive polarity) becomes "BR." FIG. 19(b) shows the overall picture.

In the liquid crystal panel of FIG. 18, because no two bright sub-pixels are arranged side by side in the row direction and no two dark sub-pixels are arranged side by side in the row direction, uneven streaks in the row direction can be suppressed.

Figure 20:
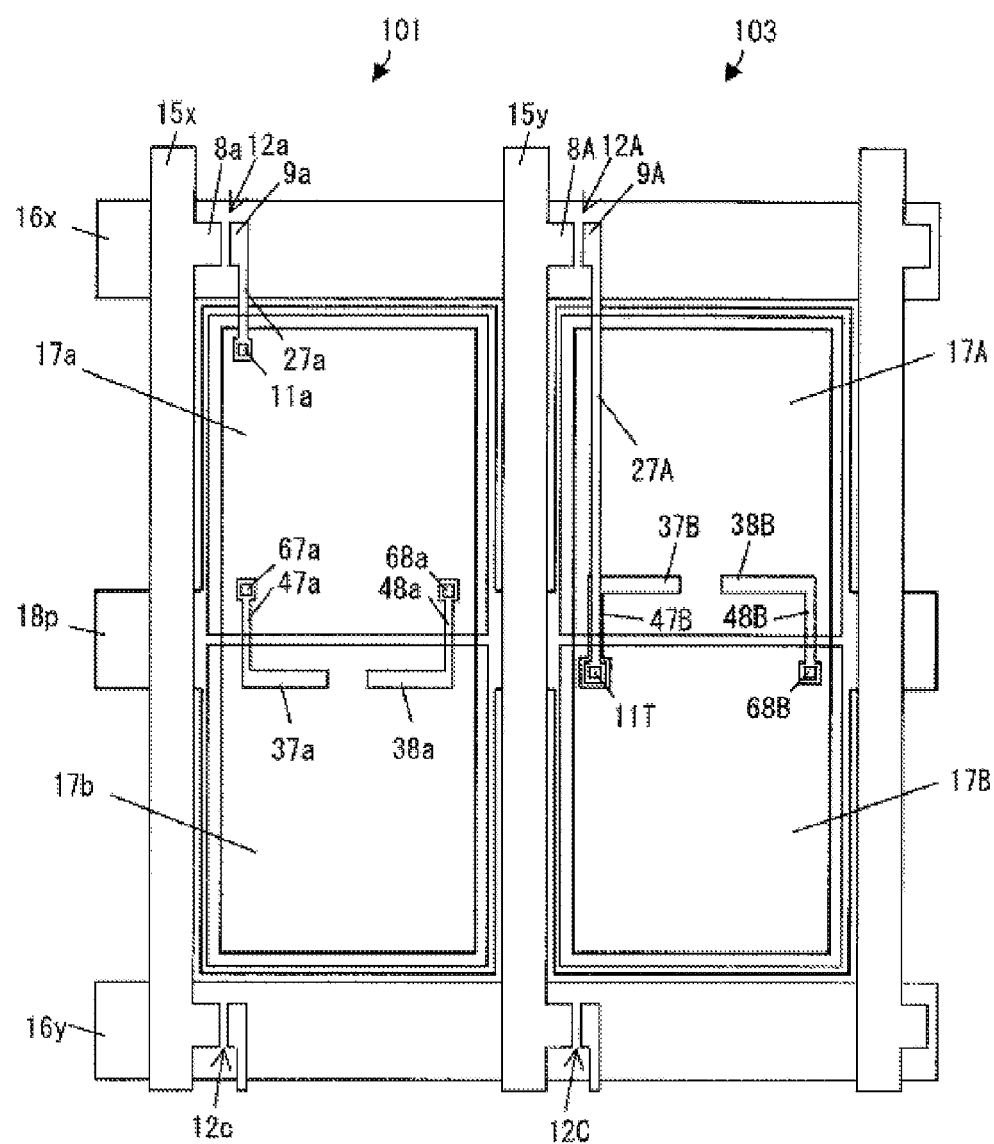
FIG. 20 is a plan view showing a specific example of the liquid crystal panel shown in FIG. 18.

A specific example of pixels 101 and 103 of FIG. 18 is shown in FIG. 20. As shown in the figure, in the pixel 101, the transistor 12a is disposed in the proximity of the intersection of the data signal line 15x and the scan signal line 16x. In the pixel region defined by the signal lines (15x and 16x), the rectangular-shaped pixel electrode 17a and the rectangular-shaped pixel electrode 17b are arranged in the column direction, and one of the four sides constituting the perimeter of the first pixel electrode and one of the four sides constituting the perimeter of the second pixel electrode are disposed adjacent to each other. The storage capacitance wiring 18p has a storage capacitance wiring extension that branches off from the storage capacitance wiring 18p, and is disposed such that it extends to overlap with portions of the edges of the pixel electrodes 17a and 17b when observed in a plan view. The respective capacitance electrodes 37a and 38a are arranged to overlap with the pixel electrode 17b.

More specifically, the capacitance electrode 37a extends in the same direction as the extending direction of the scan signal line 16x, and overlaps with the pixel electrode 17b. The capacitance electrode 38a is arranged side by side with the capacitance electrode 37a in the row direction (the aforementioned extending direction), and extends in the same direction as the extending direction of the scan signal line 16x to overlap with the pixel electrode 17b. The respective capacitance electrodes 37a and 38a are formed in the same layer as the scan signal line 16x.

Over the scan signal line 16x, the source electrode 8a and the drain electrode 9a of the transistor 12a are formed, and the source electrode 8a is connected to the data signal line 15x. The drain electrode 9a is connected to the drain lead-out wiring 27a, and the drain lead-out wiring 27a is connected to the pixel electrode 17a through the contact hole 11a. The capacitance electrode 37a overlaps with the pixel electrode 17b through the gate insulating film and the interlayer insulating film, and the lead-out wiring 47a connected to the capacitance electrode 37a is connected to the pixel electrode 17a through the contact hole 67a. As a result, the coupling capacitance Cab1 (see FIG. 18) between the pixel electrodes 17a and 17b is formed at the location where the capacitance electrode 37a and the pixel electrode 17b overlap with each other. Similarly, the capacitance electrode 38a overlaps with the pixel electrode 17b through the gate insulating film and the interlayer insulating film, and the lead-out wiring 48a connected to the capacitance electrode 38a is connected to the pixel electrode 17a through the contact hole 68a. As a result, the coupling capacitance Cab2 (see FIG. 18) between the pixel electrodes 17a and 17b is formed at the location where the capacitance electrode 38a and the pixel electrode 17b overlap with each other.

Also, the pixel electrode 17a and the storage capacitance wiring 18p overlap with each other through the interlayer insulating film and the gate insulating film, and the storage capacitance Cha (see FIG. 18) is formed at the location of the overlap. The pixel electrode 17b and the storage capacitance wiring 18p overlap with each other through the interlayer insulating film and the gate insulating film, and the storage capacitance Chb (see FIG. 18) is formed at the location of the overlap.

Consequently, in the pixel 101, the sub-pixel that includes the pixel electrode 17a becomes "BR," and the sub-pixel that includes the pixel electrode 17b becomes "DA."

On the other hand, in the pixel 103, the transistor 12A is disposed in the proximity of the intersection of the data signal line 15y and the scan signal line 16x, and in the pixel region defined by the signal lines (15y and 16x), the rectangular-shaped pixel electrode 17A and the rectangular-shaped pixel electrode 17B are arranged in the column direction. One of the four sides constituting the perimeter of the first pixel electrode and one of the four sides constituting the perimeter of the second pixel electrode are disposed adjacent to each other. The storage capacitance wiring 18p has a storage capacitance wiring extension that branches off from the storage capacitance wiring 18p, and is disposed such that it extends to overlap with portions of the edges of the pixel electrodes 17A and 17B when observed in a plan view. The respective capacitance electrodes 37B and 38B are arranged to overlap the pixel electrode 17A.

More specifically, the capacitance electrode 37B extends in the same direction as the extending direction of the scan signal line 16x, and overlaps with the pixel electrode 17A. The capacitance electrode 38B is arranged side by side with the capacitance electrode 37B in the row direction (the aforementioned extending direction), and extends in the same direction as the extending direction of the scan signal line 16x to overlap the pixel electrode 17A. The respective capacitance electrodes 37B and 38B are formed in the same layer as the scan signal line 16x.

Over the scan signal line 16x, the source electrode 8A and the drain electrode 9A of the transistor 12A are formed. The source electrode 8A is connected to the data signal line 15y, and the drain electrode 9A is connected to a drain lead-out wiring 27A. The drain lead-out wiring 27A, the capacitance electrode 37B, and the pixel electrode 17B are connected together by a single contact hole 11T. Thus, the drain lead-out wiring 27A is connected to the pixel electrode 17B through the contact hole 11T, and a lead-out wiring 47B connected to the capacitance electrode 37B is connected to the pixel electrode 17B through the contact hole 11T. Additionally, the capacitance electrode 37B overlaps with the pixel electrode 17A through the gate insulating film and the interlayer insulating film, and the coupling capacitance CAB1 (see FIG. 16) between the pixel electrodes 17A and 17B is formed at the location of the overlap. Furthermore, the capacitance electrode 38B overlaps with the pixel electrode 17A through the gate insulating film and the interlayer insulating film, and a lead-out wiring 48B connected to the capacitance electrode 38B is connected to the pixel electrode 17B through a contact hole 68B. As a result, the coupling capacitance CAB2 (see FIG. 16) between the pixel electrodes 17A and 17B is formed at the location where the capacitance electrode 38B and the pixel electrode 17A overlap with each other.

Also, the pixel electrode 17A and the storage capacitance wiring 18p overlap with each other through the interlayer insulating film and the gate insulating film, and the storage capacitance ChA (see FIG. 16) is formed at the location of the overlap. The pixel electrode 17B and the storage capacitance wiring 18p overlap with each other through the interlayer insulating film and the gate insulating film, and the storage capacitance ChB (see FIG. 16) is formed at the location of the overlap.

Consequently, in the pixel 103, the sub-pixel that includes the pixel electrode 17A becomes "DA," and the sub-pixel that includes the pixel electrode 17B becomes "BR."

Here, the respective liquid crystal panels described above have the configuration in which the capacitance electrodes are electrically connected to the pixel electrode corresponding to the sub-pixel that becomes the bright sub-pixel; however, the present invention is not limited to such. The present liquid crystal panel may have a configuration in which the capacitance electrodes are electrically connected to the pixel electrode corresponding to the sub-pixel that becomes the dark sub-pixel, as shown in FIG. 21.

Figure 21:
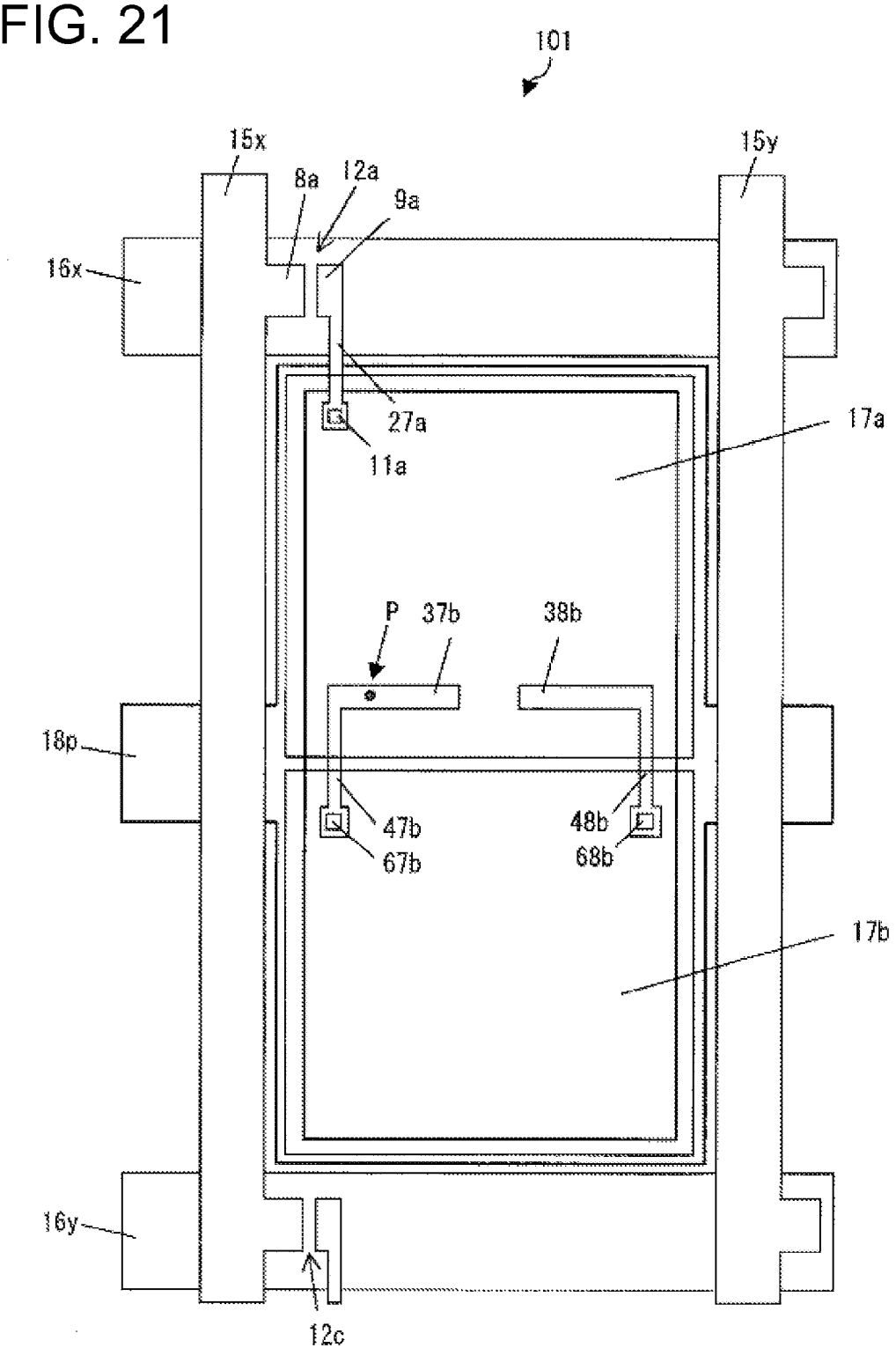
FIG. 21 is a plan view showing another specific example of the liquid crystal panel shown in FIG. 2.

In the liquid crystal panel shown in FIG. 21, the transistor 12a is disposed in the proximity of the intersection of the data signal line 15x and the scan signal line 16x, and in the pixel region defined by the signal lines (15x and 16x), the rectangular-shaped pixel electrode 17a and the rectangular-shaped pixel electrode 17b are arranged in the column direction. One of the four sides constituting the perimeter of the first pixel electrode and one of the four sides constituting the perimeter of the second pixel electrode are disposed adjacent to each other. The storage capacitance wiring 18p has a storage capacitance wiring extension that branches off from the storage capacitance wiring 18p, and is disposed such that it extends to overlap with portions of the edges of the pixel electrodes 17a and 17b when observed in a plan view. The respective capacitance electrodes 37b and 38b are disposed to overlap with the pixel electrode 17a.

More specifically, the capacitance electrode 37b extends in a direction that is the same as the extending direction of the scan signal line 16x, and overlaps with the pixel electrode 17a. The capacitance electrode 38b is arranged side by side with the capacitance electrode 37b in the row direction (the aforementioned extending direction), and extends in the same direction as the extending direction of the scan signal line 16x to overlap with the pixel electrode 17a. The respective capacitance electrode 37b and 38b are formed in the same layer as the scan signal line 16x.

Over the scan signal line 16x, the source electrode 8a and the drain electrode 9a of the transistor 12a are formed, and the source electrode 8a is connected to the data signal line 15x. The drain electrode 9a is connected to the drain lead-out wiring 27a, and the drain lead-out wiring 27a is connected to the pixel electrode 17a through the contact hole 11a. The capacitance electrode 37b overlaps with the pixel electrode 17a through the gate insulating film and the interlayer insulating film, and the lead-out wiring 47b connected to the capacitance electrode 37b is connected to the pixel electrode 17b through a contact hole 67b. As a result, the coupling capacitance Cab1 (see FIG. 1) between the pixel electrodes 17a and 17b is formed at the location where the capacitance electrode 37b and the pixel electrode 17a overlap with each other. Similarly, the capacitance electrode 38b overlaps with the pixel electrode 17a through the gate insulating film and the interlayer insulating film, and the lead-out wiring 48b connected to the capacitance electrode 38b is connected to the pixel electrode 17b through the contact hole 68b. As a result, the coupling capacitance Cab2 (see FIG. 1) between the pixel electrodes 17a and 17b is formed at the location where the capacitance electrode 38b and the pixel electrode 17a overlap with each other.

Also, the pixel electrode 17a and the storage capacitance wiring 18p overlap with each other through the interlayer insulating film and the gate insulating film, and the storage capacitance Cha (see FIG. 1) is formed at the location of the overlap. The pixel electrode 17b and the storage capacitance wiring 18p overlap with each other through the interlayer insulating film and the gate insulating film, and the storage capacitance Chb (see FIG. 1) is formed at the location of the overlap. Configuration (the shapes and locations of the respective members and the relation of connection among them) of other pixels is the same as that of the pixel 101.

In the liquid crystal panel of FIG. 21, the sub-pixel that includes the pixel electrode 17a becomes "BR," and the sub-pixel that includes the pixel electrode 17b becomes "DA."

In the liquid crystal panel of FIG. 21, the pixel electrode 17a and the pixel electrode 17b are connected (capacitively coupled) to each other by two coupling capacitances (Cab1 and Cab2) arranged side by side. Therefore, even if the lead-out wiring 47b, for example, is disconnected (during the manufacturing process or the like), the capacitance coupling between the pixel electrodes 17a and 17b can be maintained by the capacitance electrode 38b. If a short-circuit occurs (during the manufacturing process or the like) between the capacitance electrode 37b and the pixel electrode 17a at "P" of FIG. 21, the capacitance coupling between the pixel electrodes 17a and 17b can be maintained through the coupling capacitance formed at the location where the pixel electrode 17a and the capacitance electrode 38b overlap with each other by performing a repair process either by cutting the lead-out wiring 47b or by cutting the capacitance electrode 37b by laser between the location connected to the pixel electrode 17b and the short-circuit site. Alternatively, the capacitance coupling between the pixel electrodes 17a and 17b can be maintained through the coupling capacitance formed at the location where the pixel electrode 17a and the capacitance electrode 38b overlap with each other by removing (trimming) a portion of the pixel electrode 17b inside the contact hole 67b by laser or the like to electrically disconnect the pixel electrode 17b from the capacitance electrode 37b. If a short-circuit occurs between the capacitance electrode 38b and the pixel electrode 17a, the capacitance electrode 38b or the lead-out wiring 48b can be cut between the contact hole 68b and the short-circuit site by laser.

As described above, a higher production yield of liquid crystal panels and active matrix substrates to be used in the liquid crystal panels can be achieved in the present configuration as well. Furthermore, short-circuit formation between capacitance electrodes and pixel electrodes can be suppressed because the capacitance electrodes (37b and 38b) are formed in the same layer as the scan signal line.

Figure 22:
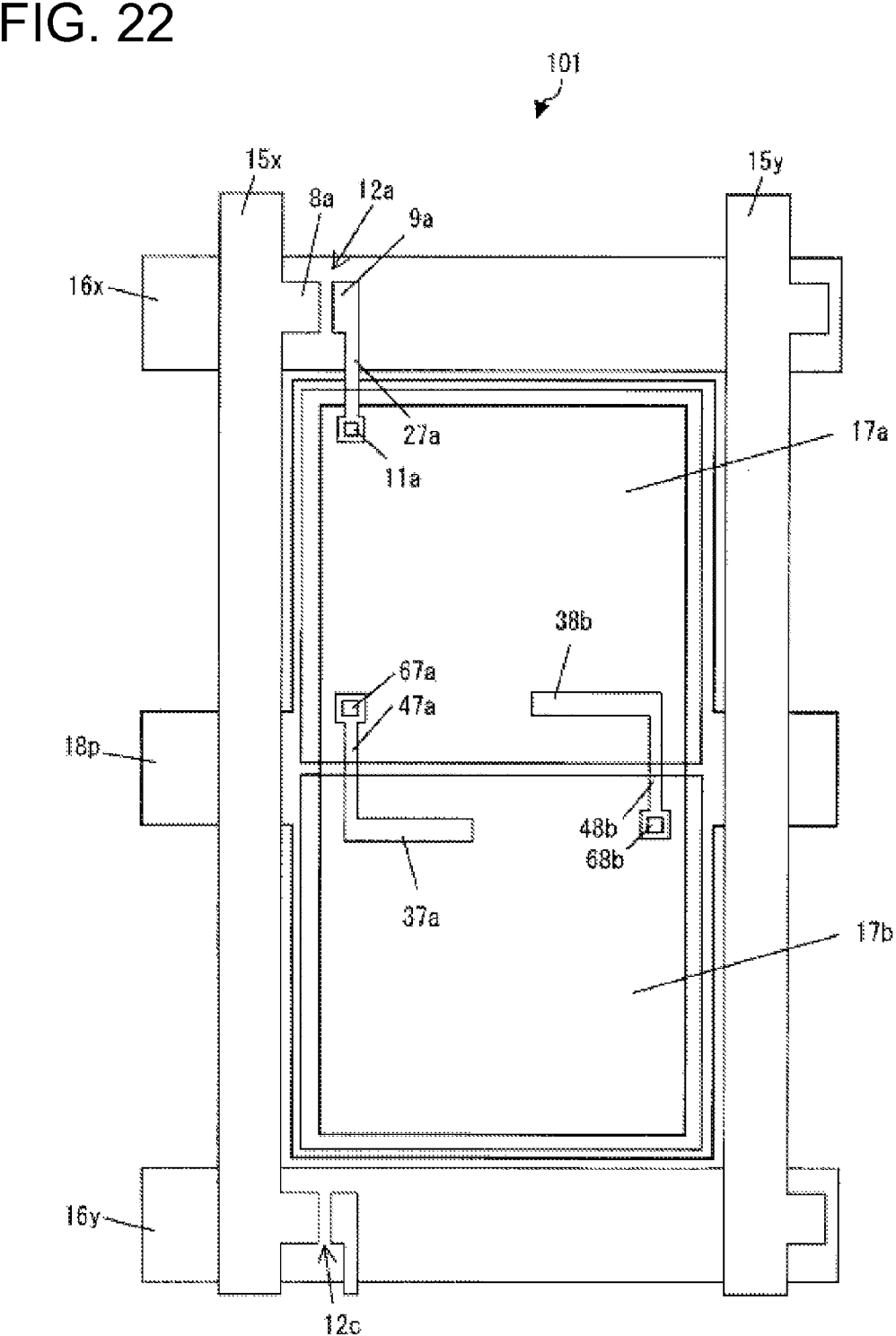
FIG. 22 is a plan view showing another specific example of the liquid crystal panel shown in FIG. 2.

The respective liquid crystal panels described above have the configuration in which the respective capacitance electrodes (37a and 38a) are electrically connected to one of the pixel electrodes (17a and 17b) and overlap the other pixel electrode; however, the present invention is not limited to such. As shown in FIG. 22, the present liquid crystal panel may have a configuration in which one of the capacitance electrodes (37a) is electrically connected to the pixel electrode (17a) corresponding to the sub-pixel that becomes the bright sub-pixel, and overlaps with the pixel electrode (17b) corresponding to the sub-pixel that becomes the dark sub-pixel, whereas the other capacitance electrode (38b) is electrically connected to the pixel electrode (17b) corresponding to the sub-pixel that becomes the dark sub-pixel, and overlaps with the pixel electrode (17a) corresponding to the sub-pixel that becomes the bright sub-pixel. The aforementioned advantages can be obtained in this configuration as well.

The respective liquid crystal panels described above have the configuration in which the pixel electrodes 17a and 17b are disposed side by side in the column direction. However, the arrangement of the pixel electrodes 17a and 17b is not limited to such, and the pixel electrodes 17a and 17b may be disposed side by side in the row direction.

Embodiment 2

Figure 23:
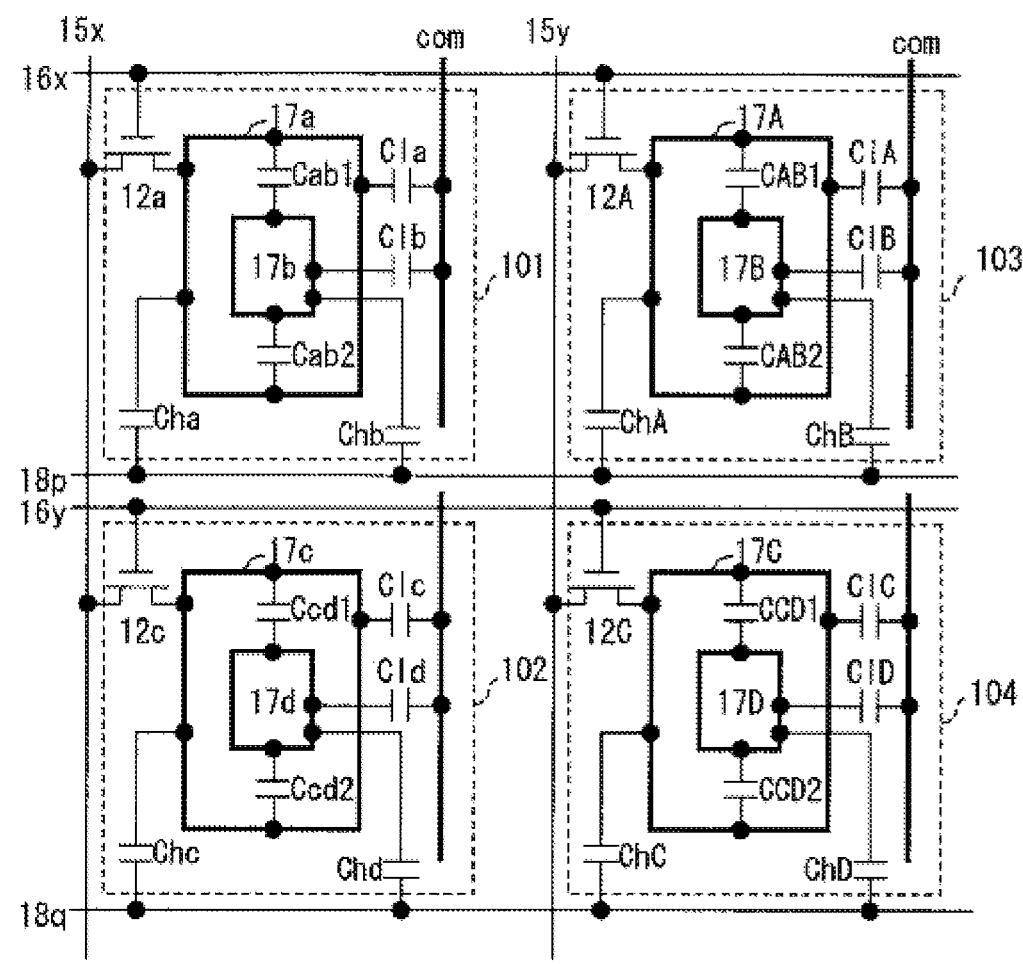
FIG. 23 is a circuit diagram showing the configuration of a liquid crystal panel according to Embodiment 2.

FIG. 23 is an equivalent circuit diagram showing a part of a liquid crystal panel according to Embodiment 2. As shown in FIG. 23, the present liquid crystal panel includes the following: data signal lines (15x and 15y) extending in a column direction (up and down directions in the figure); scan signal lines (16x and 16y) extending in a row direction (right and left directions in the figure); pixels (101 to 104) arranged in the row and column directions; storage capacitance wirings (18p and 18q); and a common electrode (opposite electrode) com. All pixels have the same structure. The pixel column that includes pixels 101 and 102 and the pixel column that includes pixels 103 and 104 are adjacent to each other, and the pixel row that includes pixels 101 and 103 and the pixel row that includes pixels 102 and 104 are adjacent to each other.

For the present liquid crystal panel, one data signal line and one scan signal line are provided for each of the pixels. In a single pixel, two pixel electrodes are provided such that one of them surrounds the other. In the pixel 101, a pixel electrode 17b and a pixel electrode 17a surrounding the pixel electrode 17b are provided. In the pixel 102, a pixel electrode 17d and a pixel electrode 17c surrounding the pixel electrode 17d are provided. In the pixel 103, a pixel electrode 17B and a pixel electrode 17A surrounding the pixel electrode 17B are provided. In the pixel 104, a pixel electrode 17D and a pixel electrode 17C surrounding the pixel electrode 17D are provided.

Figure 24:
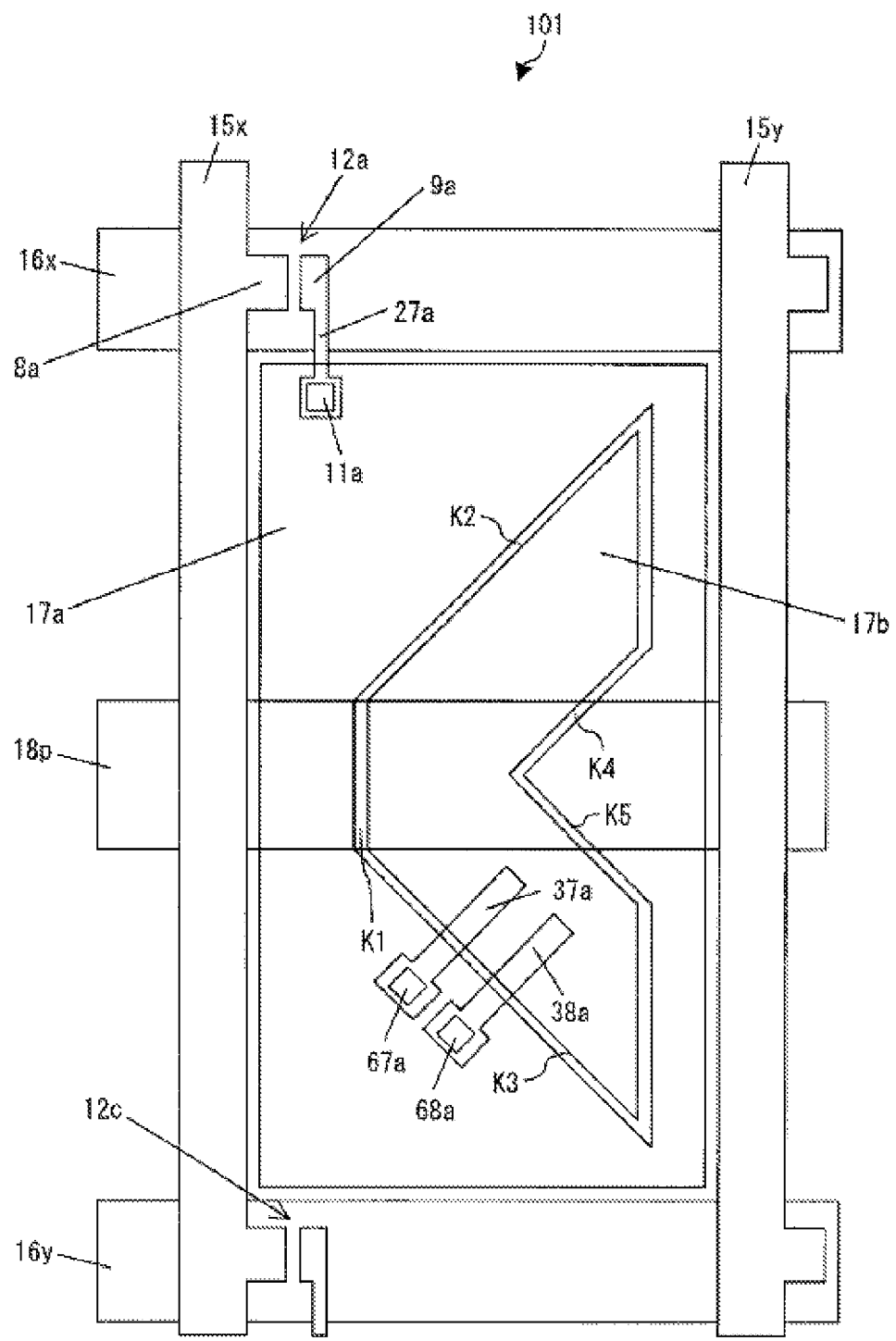
FIG. 24 is a plan view showing a specific example of the liquid crystal panel shown in FIG. 23.

A specific example of the pixel 101 of FIG. 23 is shown in FIG. 24. As shown in the figure, the transistor 12a is disposed in the proximity of the intersection of the data signal line 15x and the scan signal line 16x. In the pixel region defined by the signal lines (15x and 16x), the pixel electrode 17b, which is V-shaped when observed in the row direction, and the pixel electrode 17a, which surrounds the pixel electrode 17b, are disposed, and the storage capacitance wiring 18p extends in the row direction across the center of the pixel. More specifically, the pixel electrode 17b has the following: a first side, which is present over the storage capacitance wiring 18p and forms an angle of approx. 90° to the row direction; a second side, which extends from one end of the first side and forms an angle of approx. 45° to the row direction; a third side, which extends from the other end of the first side and forms an angle of approx. 315° to the row direction; a fourth side, which has its one end over the storage capacitance wiring 18p and is parallel to and shorter than the second side; a fifth side, which is connected to one end of the fourth side and is parallel to and shorter than the third side; a sixth side, which connects the second side and the fourth side; and a seventh side, which connects the third side and the fifth side. The inner perimeter of the pixel electrode 17a is composed of seven sides respectively facing the aforementioned first to seventh sides.

The gap between the first side of the pixel electrode 17b and a side of the inner perimeter of the pixel electrode 17a that faces the first side of the pixel electrode 17b is a first gap K1. The gap between the second side of the pixel electrode 17b and a side of the inner perimeter of the pixel electrode 17a that faces the second side of the pixel electrode 17b is a second gap K2. The gap between the third side of the pixel electrode 17b and a side of the inner perimeter of the pixel electrode 17a that faces the third side of the pixel electrode 17b is a third gap K3. The gap between the fourth side of the pixel electrode 17b and a side of the inner perimeter of the pixel electrode 17a that faces the fourth side of the pixel electrode 17b is a fourth gap K4, and the gap between the fifth side of the pixel electrode 17b and a side of the inner perimeter of the pixel electrode 17a that faces the fifth side of the pixel electrode 17b is a fifth gap K5.

The capacitance electrodes 37a and 38a are disposed such that they respectively overlap with the third gap K3, the pixel electrode 17a, and the pixel electrode 17b. More specifically, when observed in a plan view, the respective capacitance electrodes 37a and 38b are in shapes extending to cross the third gap K3 and to form an angle of 225° with respect to the row direction of the storage capacitance wiring 18p, and do not overlap with the storage capacitance wiring 18p. Furthermore, the respective capacitance electrodes 37a and 38a are formed in the same layer as the scan signal line 16x.

Over the scan signal line 16x, the source electrode 8a and the drain electrode 9a of the transistor 12a are formed, and the source electrode 8a is connected to the data signal line 15x. The drain electrode 9a is connected to the drain lead-out wiring 27a, and the drain lead-out wiring 27a is connected to the pixel electrode 17a through the contact hole 11a. The capacitance electrode 37a is connected to the pixel electrode 17a through the contact hole 67a, and overlaps with the pixel electrode 17b through the gate insulating film and the interlayer insulating film. The coupling capacitance Cab1 (see FIG. 23) between the pixel electrodes 17a and 17b is formed at the location of the overlap. Similarly, the capacitance electrode 38a is connected to the pixel electrode 17a through the contact hole 68a, and overlaps with the pixel electrode 17b through the gate insulating film and the interlayer insulating film. The coupling capacitance Cab2 (see FIG. 23) between the pixel electrodes 17a and 17b is formed at the location of the overlap.

Also, the pixel electrode 17a and the storage capacitance wiring 18p overlap with each other through the interlayer insulating film and the gate insulating film, and the storage capacitance Cha (see FIG. 23) is formed at the location of the overlap. The pixel electrode 17b and the storage capacitance wiring 18p overlap with each other through the interlayer insulating film and the gate insulating film, and the storage capacitance Chb (see FIG. 23) is formed at the location of the overlap. Configuration (the shapes and locations of the respective members and the relation of connection among them) of other pixels is the same as that of the pixel 101.

According to this configuration, the sub-pixel that includes the pixel electrode 17a becomes "BR," and the sub-pixel that includes the pixel electrode 17b becomes "DA."

In the liquid crystal panel of FIG. 24, the pixel electrode 17a and the pixel electrode 17b are connected (capacitively coupled) to each other by the two coupling capacitances (Cab1 and Cab2) arranged side by side. Therefore, even if a short-circuit occurs (during the manufacturing process or the like) between the capacitance electrode 37a and the pixel electrode 17b, for example, the capacitance coupling between the pixel electrodes 17a and 17b can be maintained by performing a repair process by cutting the capacitance electrode 37a by laser between the contact hole 67a and the short-circuit site. Further, even if the contact hole 67a is not formed properly in the manufacturing process or the like, the capacitance coupling between the pixel electrodes 17a and 17b can be maintained. If a short-circuit occurs between the capacitance electrode 38a and the pixel electrode 17b, the capacitance electrode 38a can be cut between the contact hole 68a and the short-circuit site by laser.

When the aforementioned repair process is performed in the active matrix substrate stage, the capacitance electrode 37a (portion after the contact hole 67a) is cut by laser irradiation from the back side (glass substrate side) of the active matrix substrate. Alternatively, the capacitance electrode 37a is cut by laser irradiation from the front side (opposite side from the glass substrate) of the active matrix substrate through the gap between the pixel electrodes 17a and 17b. When the aforementioned repair process is performed in the liquid crystal panel stage, the capacitance electrode 37a (portion after the contact hole 67a) is cut by laser irradiation from the back side (glass substrate side of the active matrix substrate) of the liquid crystal panel.

If a short-circuit occurs between the capacitance electrode 37a and the pixel electrode 17b, the capacitance coupling between the pixel electrodes 17a and 17b can also be maintained by removing (trimming) a portion of the pixel electrode 17a inside the contact hole 67a by laser or the like to electrically disconnect the pixel electrode 17a from the capacitance electrode 37a.

This way, according to the present embodiment, the production yield of liquid crystal panels and active matrix substrates to be used in the liquid crystal panels can be increased. Furthermore, two layers of insulating layers (gate insulating film and interlayer insulating film) are interposed between the capacitance electrodes (37a and 38a) and the pixel electrode (17b). Therefore, compared to a conventional configuration having only one layer (interlayer insulating film) interposed, the present embodiment can suppress short-circuit formation between the capacitance electrodes and the pixel electrode more.

In the present embodiment, the capacitance electrodes (37a and 38a) are formed in the same layer as the scan signal line, and are covered by the gate insulating film. Typically, the gate insulating film is formed at a higher temperature than the interlayer insulating film covering transistors. Therefore, the gate insulating film tends to be a denser film than the interlayer insulating film. As a result, according to the present embodiment, a greater advantage can be obtained in terms of suppressing short-circuit formation between the capacitance electrodes and the pixel electrode.

Furthermore, in the liquid crystal panel of FIG. 24, the pixel electrode 17b, which is electrically floating, is surrounded by the pixel electrode 17a. Therefore, the pixel electrode 17a functions as a shield electrode, and jumping or the like of electric charge into the pixel electrode 17b can be suppressed. As a result, burn-in of the sub-pixel (dark sub-pixel) that includes the pixel electrode 17b can be suppressed.

Figure 25:
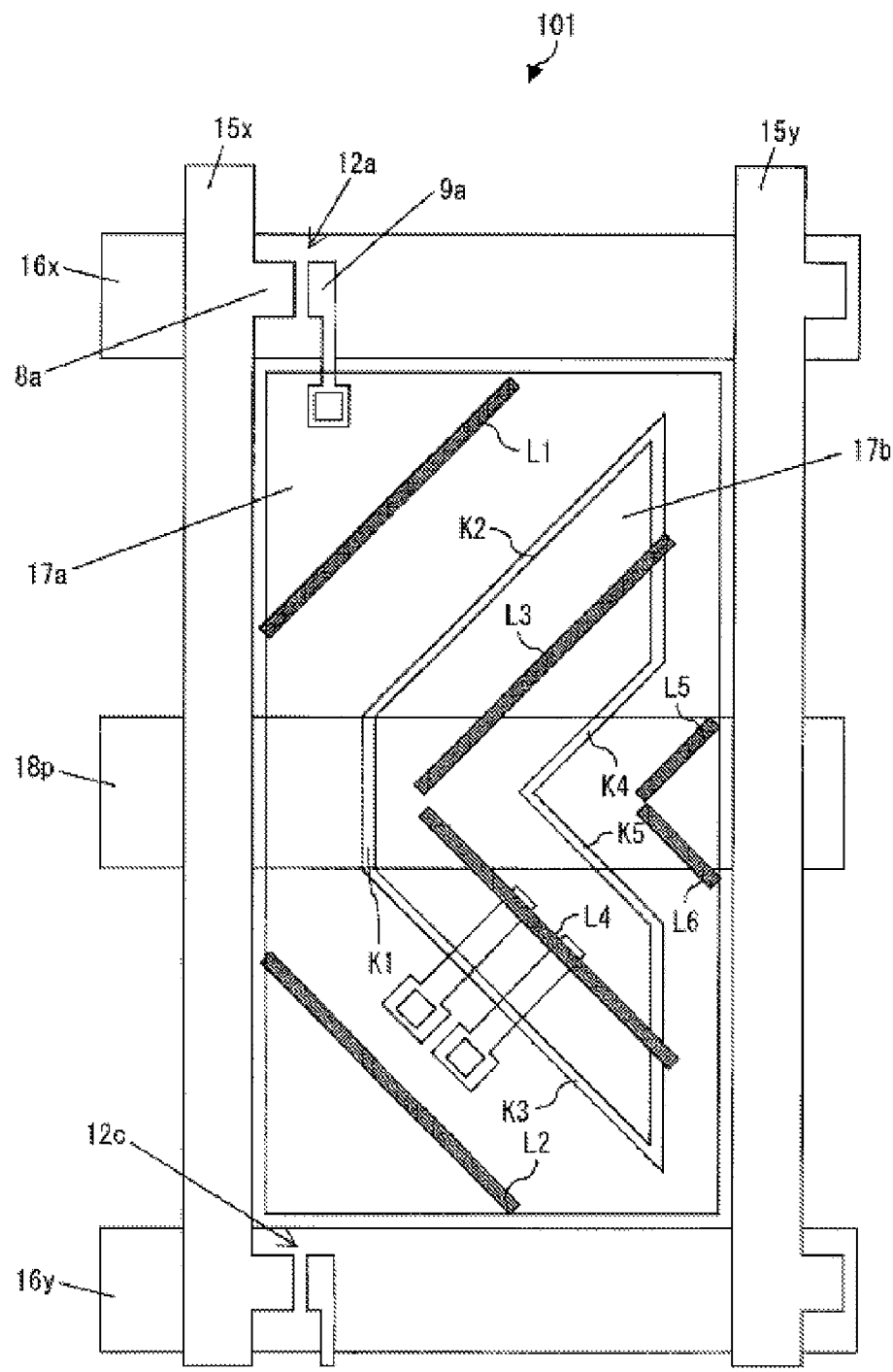
FIG. 25 is a plan view showing another specific example of the liquid crystal panel shown in FIG. 24.

The alignment control structure is omitted in FIG. 24. However, in a liquid crystal panel of MVA (Multi-domain Vertical Alignment) system, for example, as shown in FIG. 25, the gaps K2 to K5 between the pixel electrodes 17a and 17b function as alignment control structures. In a portion of the color filter substrate corresponding to the pixel electrode 17b, a rib L3 that is parallel to the gaps K2 and K4 and a rib L4 that is parallel to the gaps K3 and K5 are provided, and in a portion of the color filter substrate corresponding to the pixel electrode 17a, ribs L1 and L5 that are parallel to the gaps K2 and K4 and ribs L2 and L6 that are parallel to the gaps K3 and K5 are provided, for example. Here, instead of providing the aforementioned alignment control ribs, alignment control slits may be provided in the common electrode of the color filter substrate.

Figure 26:
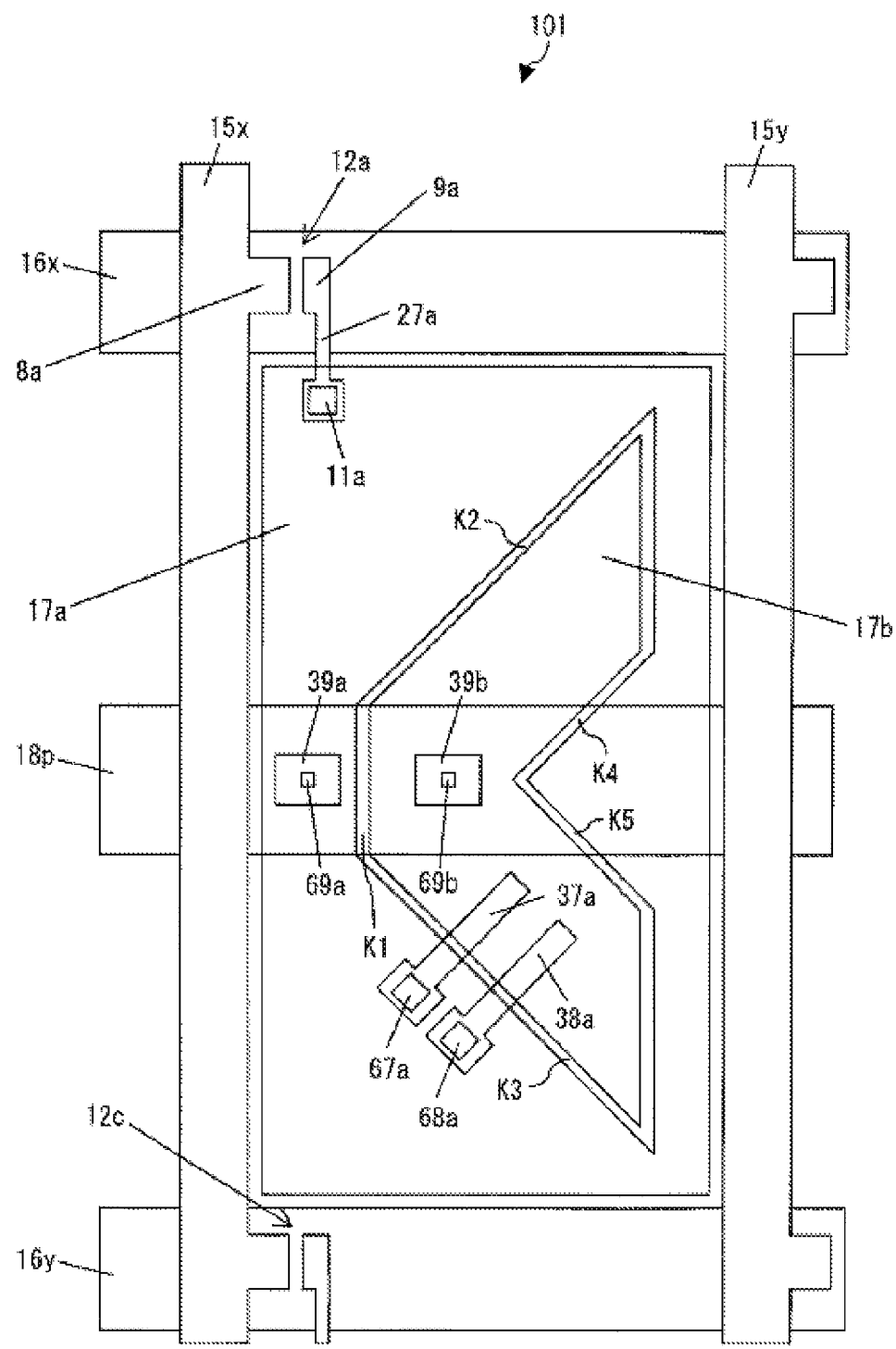
FIG. 26 is a plan view showing another specific example of the liquid crystal panel shown in FIG. 24.

Here, the capacitance values of the storage capacitances Cha and Chb (see FIG. 23) are preferably large for higher reliability. Therefore, the storage capacitances Cha and Chb may be formed of the configuration shown in FIG. 26. As shown in FIG. 26, a storage capacitance electrode 39a formed in the same layer as the drain lead-out wiring 27a is connected to the pixel electrode 17a through a contact hole 69a, and the storage capacitance electrode 39a and the storage capacitance wiring 18p overlap with each other through the gate insulating film. As a result, the storage capacitance Cha is formed between them. In addition, a storage capacitance electrode 39b formed in the same layer as the drain lead-out wiring 27a is connected to the pixel electrode 17b through a contact hole 69b, and the storage capacitance electrode 39b and the storage capacitance wiring 18p overlap with each other through the gate insulating film. As a result, the storage capacitance Chb is formed between them.

In this configuration, compared to the case in which the storage capacitances Cha and Chb are formed between the pixel electrodes 17a and 17b and the storage capacitance wiring 18p, the storage capacitance value can be larger because the insulating film interposed between them can be reduced (made thinner). Furthermore, the width of the storage capacitance wiring 18p can be made narrower without changing the storage capacitance value because the insulating film forming the storage capacitances Cha and Chb can be made thinner, and an advantage that improves the aperture ratio without decreasing reliability can be obtained.

Figure 27:
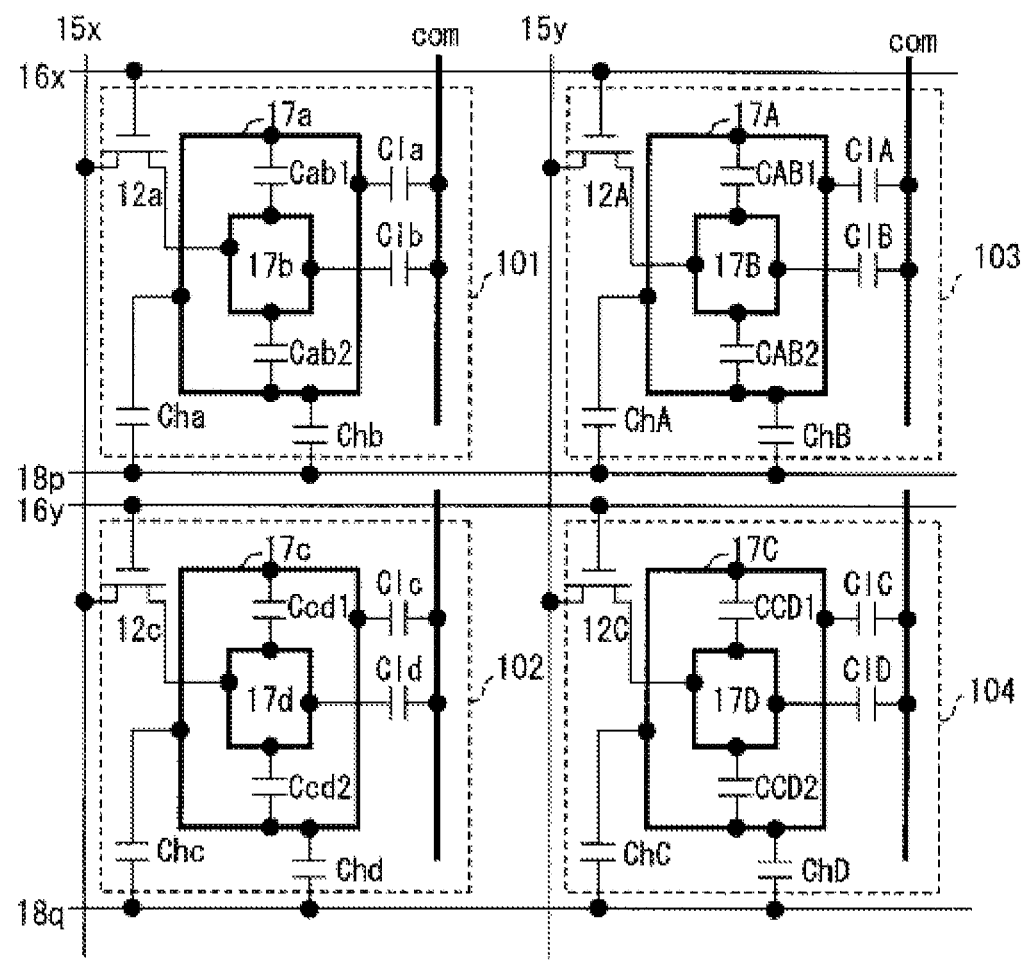
FIG. 27 is a circuit diagram showing another configuration of the liquid crystal panel according to Embodiment 2.

Here, in FIG. 23, one of the two pixel electrodes disposed in a single pixel surrounds the other, and the pixel electrode surrounding the other pixel electrode is connected to the transistors; however, the present invention is not limited to such. As shown in FIG. 27, one of the two pixel electrodes disposed in a single pixel may surround the other pixel electrode, and the pixel electrode that is being surrounded may be connected to the transistors.

Figure 28:
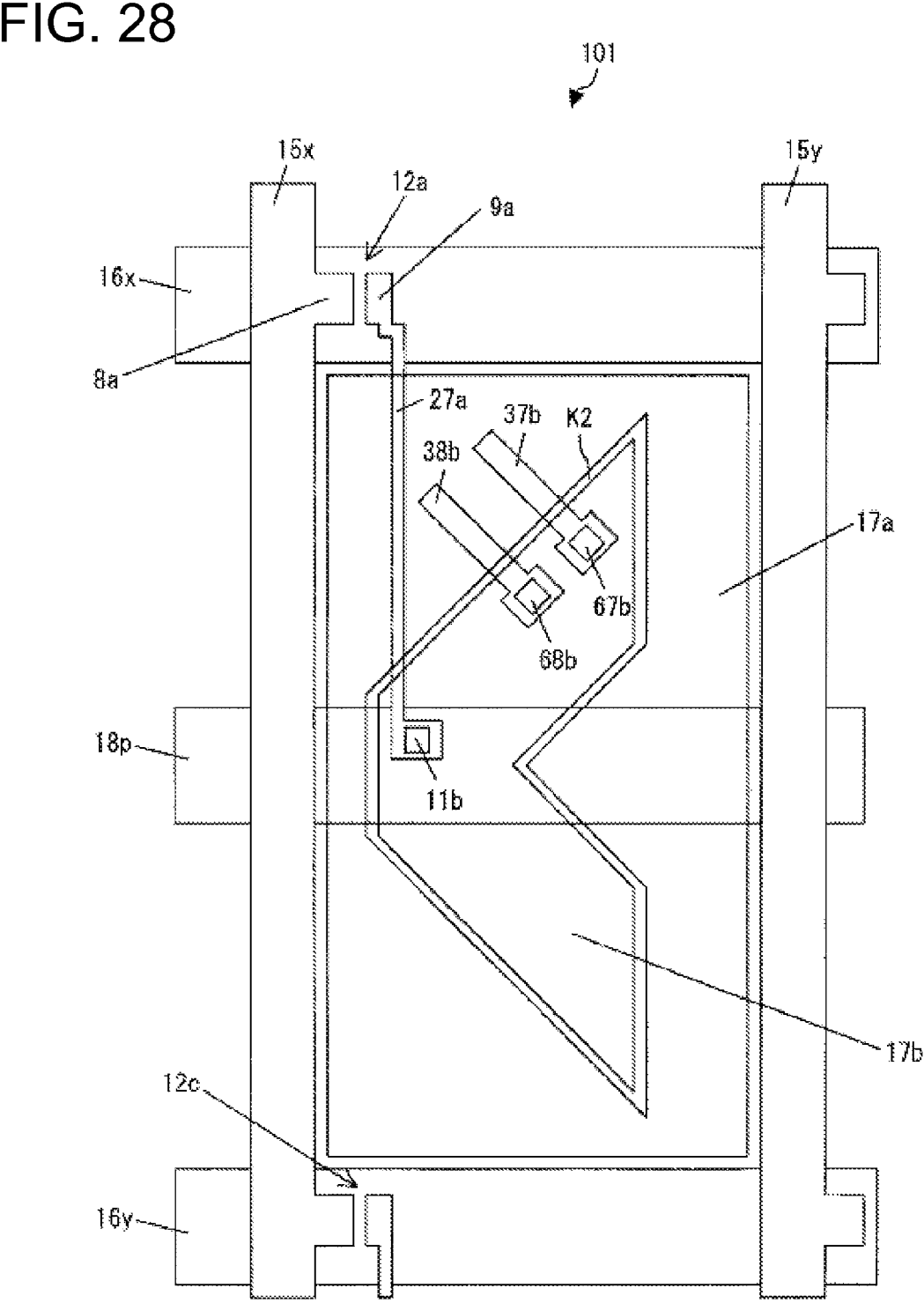
FIG. 28 is a plan view showing a specific example of the liquid crystal panel shown in FIG. 27.

A specific example of the pixel 101 of FIG. 27 is shown in FIG. 28. As shown in the figure, the shape and arrangement of the pixel electrodes 17a and 17b as well as the storage capacitance wiring 18p are same as those in FIG. 24. The capacitance electrodes 37b and 38b are respectively disposed to overlap with the second gap K2, the pixel electrode 17a, and the pixel electrode 17b.

Over the scan signal line 16x, the source electrode 8a and the drain electrode 9a of the transistor 12a are formed, and the source electrode 8a is connected to the data signal line 15x. The drain electrode 9a is connected to the pixel electrode 17b through the drain lead-out wiring 27a and a contact hole 11b. The capacitance electrode 37b is connected to the pixel electrode 17b through the contact hole 67b. A portion of the capacitance electrode 37b overlaps with the pixel electrode 17a through the gate insulating film and the interlayer insulating film, and the coupling capacitance Cab1 (see FIG. 27) is formed at the location of the overlap. The capacitance electrode 38b is connected to the pixel electrode 17b through the contact hole 68b. A portion of the capacitance electrode 38b overlaps with the pixel electrode 17a through the gate insulating film and the interlayer insulating film, and the coupling capacitance Cab2 (see FIG. 27) is formed at the location of the overlap. A portion of the pixel electrode 17a overlaps with the storage capacitance wiring 18p through the gate insulating film and the interlayer insulating film, and the storage capacitance Cha (see FIG. 27) is formed at the location of the overlap. Further, a portion of the pixel electrode 17b overlaps with the storage capacitance wiring 18p through the gate insulating film and the interlayer insulating film, and the coupling capacitance Chb (see FIG. 27) is formed at the location of the overlap.

In the liquid crystal panel of FIG. 28, the sub-pixel that includes the pixel electrode 17a becomes "DA," and the sub-pixel that includes the pixel electrode 17b becomes "BR."

Also in the liquid crystal panel of FIG. 28, the pixel electrode 17a and the pixel electrode 17b are connected (capacitively coupled) to each other by the two coupling capacitances (Cab1 and Cab2) arranged side by side. Therefore, production yield of liquid crystal panels and active matrix substrates to be used in the liquid crystal panels can be improved. Furthermore, the advantage of suppressing short-circuit formation between the capacitance electrodes and the pixel electrode can be obtained because the capacitance electrodes (37b and 38b) are formed in the same layer as the scan signal line.

Furthermore, the liquid crystal panel of FIG. 28 has the configuration in which the pixel electrode 17a corresponding to the dark sub-pixel surrounds the pixel electrode 17b corresponding to the bright sub-pixel. Therefore, images having a high spatial frequency can be displayed with clarity, which is advantageous.

Figure 29:
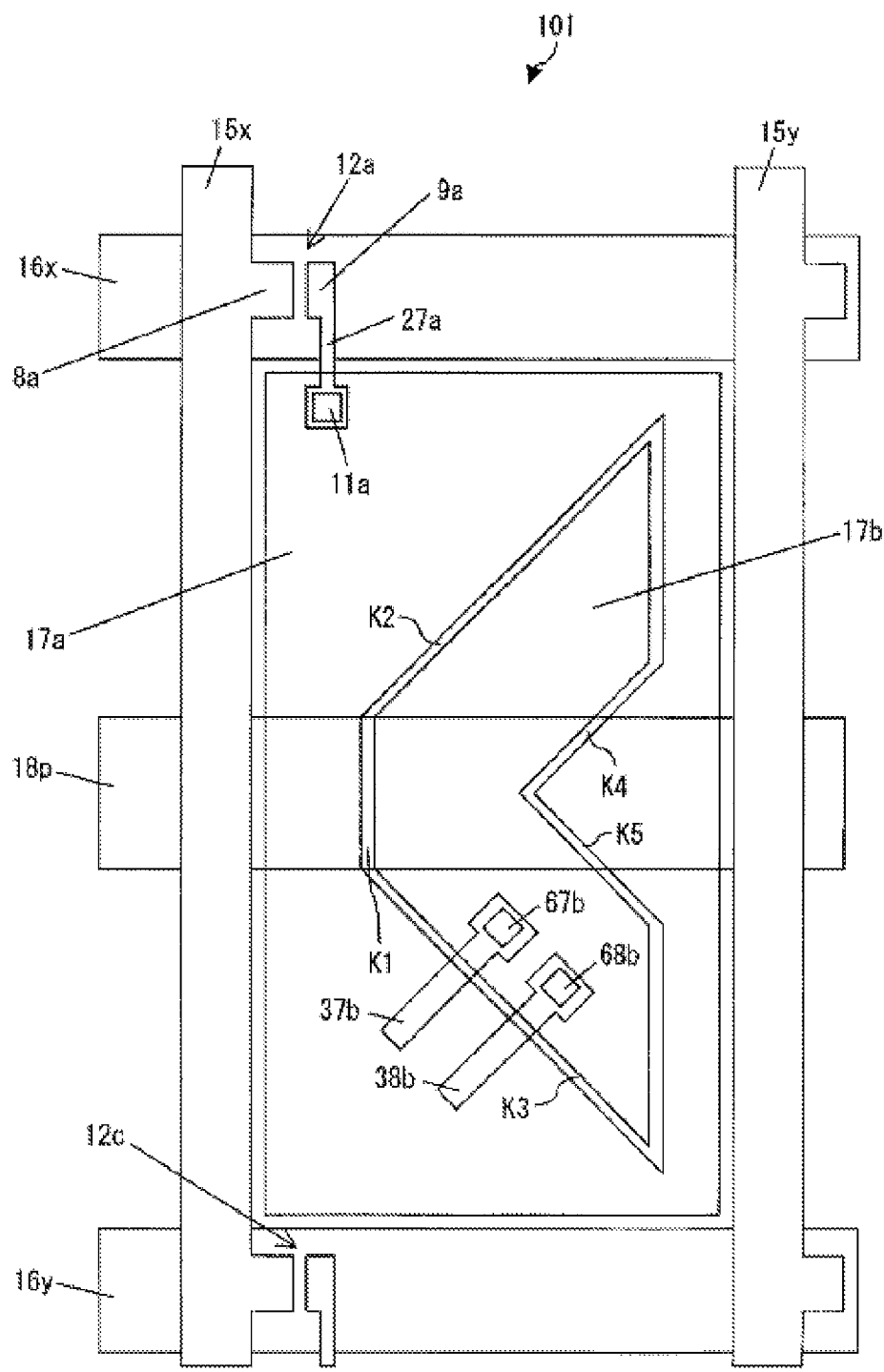
FIG. 29 is a plan view showing another specific example of the liquid crystal panel shown in FIG. 24.

Here, the respective liquid crystal panels described above have the configuration in which the capacitance electrodes are electrically connected to the pixel electrode corresponding to the sub-pixel that becomes the bright sub-pixel; however, the present invention is not limited to such. As shown in FIG. 29, the present liquid crystal panel may have a configuration in which the capacitance electrodes are electrically connected to the pixel electrode corresponding to the sub-pixel that becomes the dark sub-pixel.

In the liquid crystal panel of FIG. 29, in a manner similar to the liquid crystal panel of FIG. 24, the transistor 12a is disposed in the proximity of the intersection of the data signal line 15x and the scan signal line 16x. In the pixel region defined by the signal lines (15x and 16x), the pixel electrode 17b, which is in a V-shape when viewed in the row direction, and the pixel electrode 17a, which surrounds the pixel electrode 17b, are disposed. The storage capacitance wiring 18p extends in the row direction across the center of the pixel.

The respective capacitance electrodes 37b and 38b are disposed to overlap with the third gap K3, the pixel electrode 17a, and the pixel electrode 17b. More specifically, when observed in a plan view, the respective capacitance electrodes 37b and 38b are in shapes extending to cross the third gap K3 and to form an angle of 225° with respect to the row direction of the storage capacitance wiring 18p, and do not overlap with the storage capacitance wiring 18p. The capacitance electrodes 37b and 38b are respectively formed in the same layer as the scan signal line 16x.

Over the scan signal line 16x, the source electrode 8a and the drain electrode 9a of the transistor 12a are formed, and the source electrode 8a is connected to the data signal line 15x. The drain electrode 9a is connected to the drain lead-out wiring 27a, and the drain lead-out wiring 27a is connected to the pixel electrode 17a through the contact hole 11a. The capacitance electrode 37b is connected to the pixel electrode 17b through the contact hole 67b, and overlaps with the pixel electrode 17a through the gate insulating film and the interlayer insulating film. The coupling capacitance Cab1 (see FIG. 23) between the pixel electrodes 17a and 17b is formed at the location of the overlap. Similarly, the capacitance electrode 38b is connected to the pixel electrode 17b through the contact hole 68b, and overlaps with the pixel electrode 17a through the gate insulating film and the interlayer insulating film. The coupling capacitance Cab2 (see FIG. 23) between the pixel electrodes 17a and 17b is formed at the location of the overlap.

Also, the pixel electrode 17a and the storage capacitance wiring 18p overlap with each other through the interlayer insulating film and the gate insulating film, and the storage capacitance Cha (see FIG. 23) is formed at the location of the overlap. The pixel electrode 17b and the storage capacitance wiring 18p overlap with each other through the interlayer insulating film and the gate insulating film, and the storage capacitance Chb (see FIG. 23) is formed at the location of the overlap. Configuration (the shapes and locations of the respective members and the relation of connection among them) of other pixels is the same as that of the pixel 101.

Consequently, the sub-pixel that includes the pixel electrode 17a becomes "BR," and the sub-pixel that includes the pixel electrode 17b becomes "DA."

Also in the liquid crystal panel of FIG. 29, the pixel electrode 17a and the pixel electrode 17b are connected (capacitively coupled) to each other by the two coupling capacitances (Cab1 and Cab2) arranged side by side. Therefore, the production yield of liquid crystal panels and active matrix substrates to be used in the liquid crystal panels can be improved. Furthermore, the advantage of suppressing short-circuit formation between the capacitance electrodes and the pixel electrode can be obtained as well because the capacitance electrodes (37b and 38b) are formed in the same layer as the scan signal line.

Figure 30:
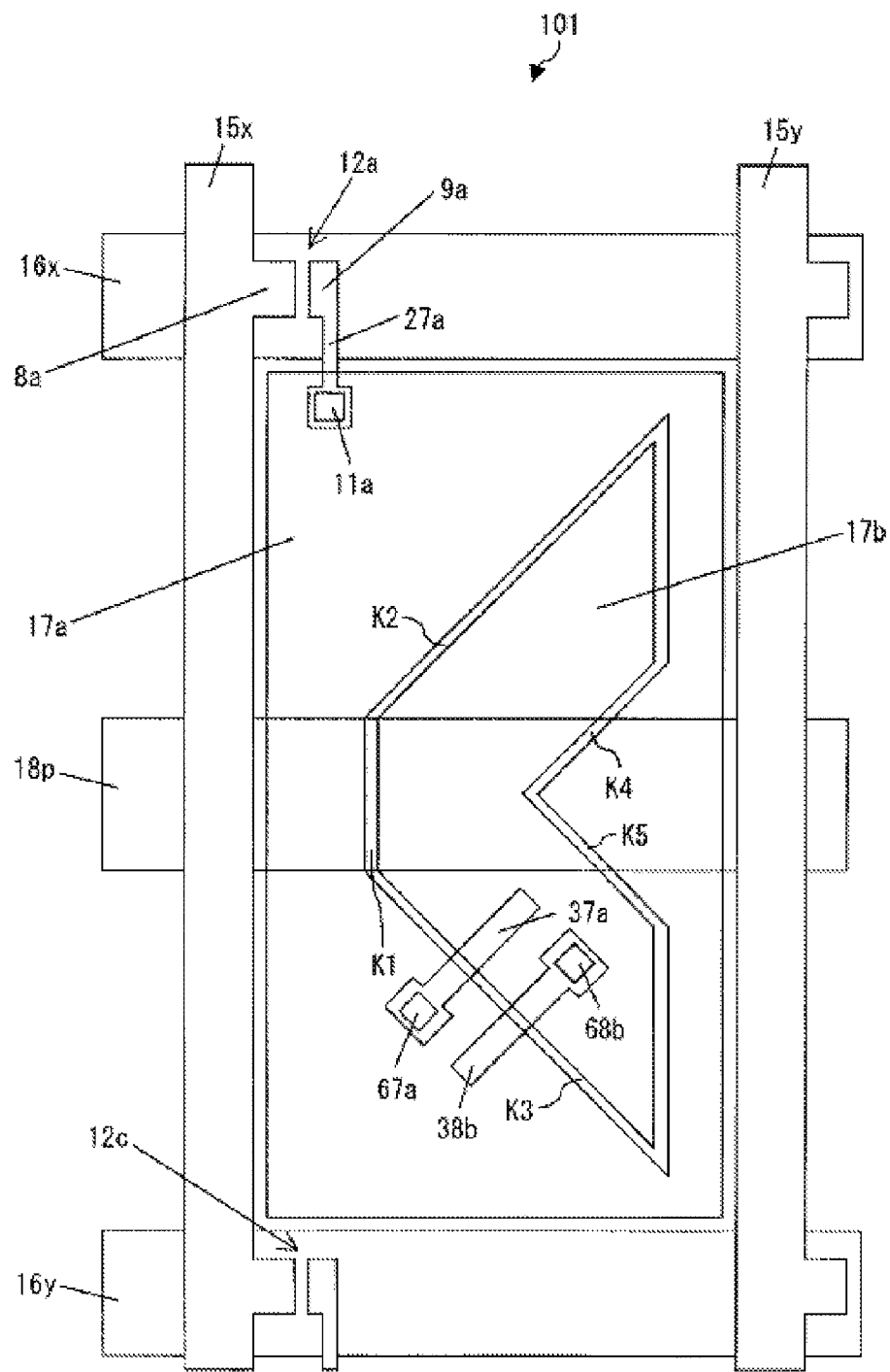
FIG. 30 is a plan view showing another specific example of the liquid crystal panel shown in FIG. 24.

The respective liquid crystal panels described above have the configuration in which the respective capacitance electrodes (37a and 38a) are electrically connected to one of the pixel electrodes (17a and 17b) and overlap with the other pixel electrode. However, the present invention is not limited to such. Thus, as shown in FIG. 30, the present liquid crystal panel may have a configuration in which one of the capacitance electrodes (37a) is electrically connected to the pixel electrode (17a) corresponding to the sub-pixel that becomes the bright sub-pixel, and overlaps with the pixel electrode (17b) corresponding to the sub-pixel that becomes the dark sub-pixel, whereas the other capacitance electrode (38b) is electrically connected to the pixel electrode (17b) corresponding to the sub-pixel that becomes the dark substrate, and overlaps with the pixel electrode (17a) corresponding to the sub-pixel that becomes the bright sub-pixel. The aforementioned advantages can be obtained in this configuration as well.

Embodiment 3

Figure 31:
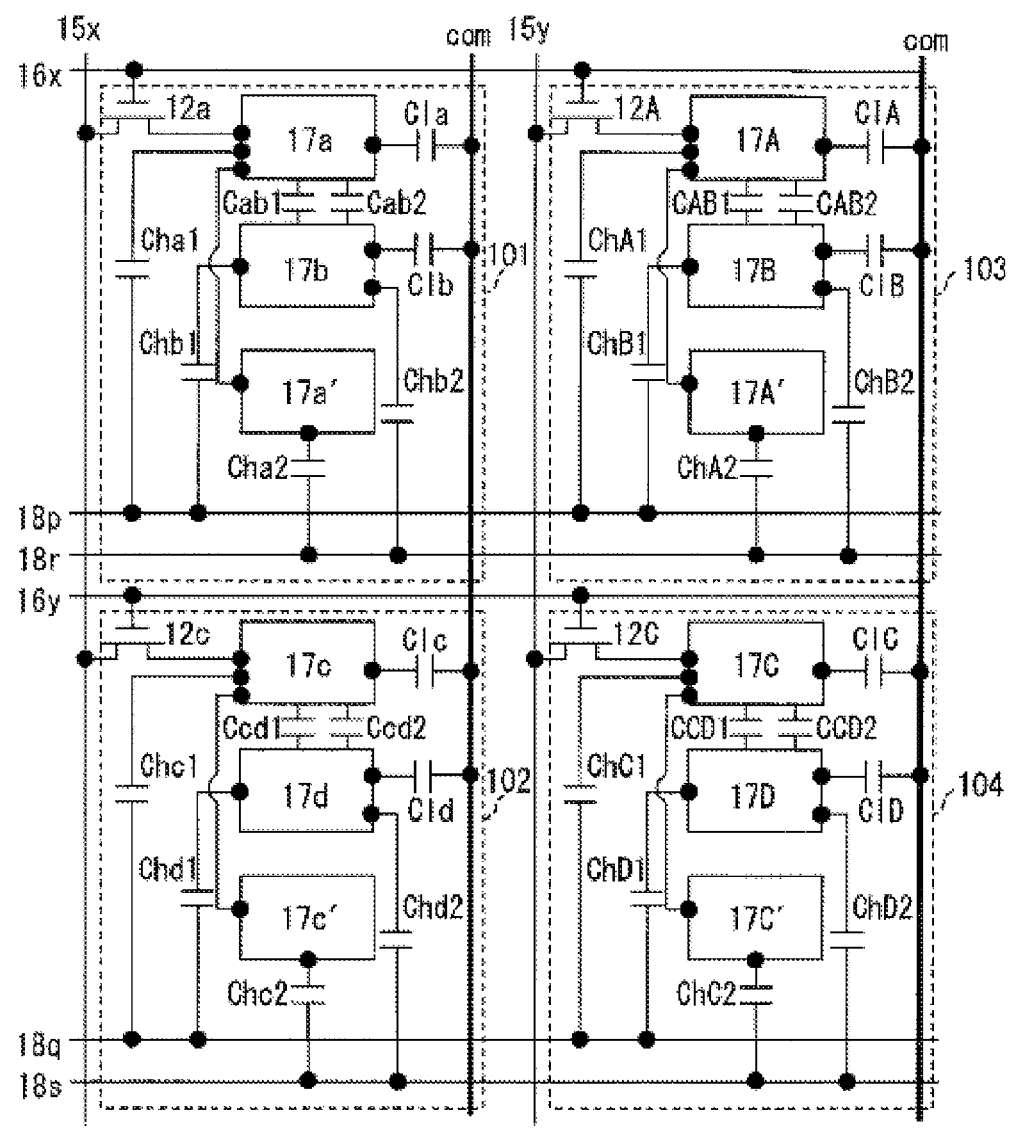
FIG. 31 is a circuit diagram showing the configuration of a liquid crystal panel according to Embodiment 3.

FIG. 31 is an equivalent circuit diagram showing a part of the liquid crystal panel according to Embodiment 3. As shown in FIG. 31, the present liquid crystal panel includes the following: data signal lines (15x and 15y) extending in a column direction (up and down directions in the figure); scan signal lines (16x and 16y) extending in a row direction (right and left directions in the figure); pixels (101 to 104) arranged in the row and column directions; storage capacitance wirings (18p to 18s); and a common electrode (opposite electrode) com. All pixels have the same structure. The pixel column that includes pixels 101 and 102 and the pixel column that includes pixels 103 and 104 are adjacent to each other, and the pixel row that includes pixels 101 and 103 and the pixel row that includes pixels 102 and 104 are adjacent to each other.

In the present liquid crystal panel, one data signal line, one scan signal line, and two storage capacitance wirings are provided for each of the pixels. Furthermore, three pixel electrodes are provided in a single pixel. In the pixel 101, pixel electrodes 17a (first pixel electrode), 17b (second pixel electrode), and 17a' (third pixel electrode) are provided. In the pixel 102, pixel electrodes 17c, 17d, and 17c' are provided. In the pixel 103, pixel electrodes 17A, 17B, and 17A' are provided. In the pixel 104, pixel electrodes 17C, 17D, and 17C' are provided.

Figure 32:
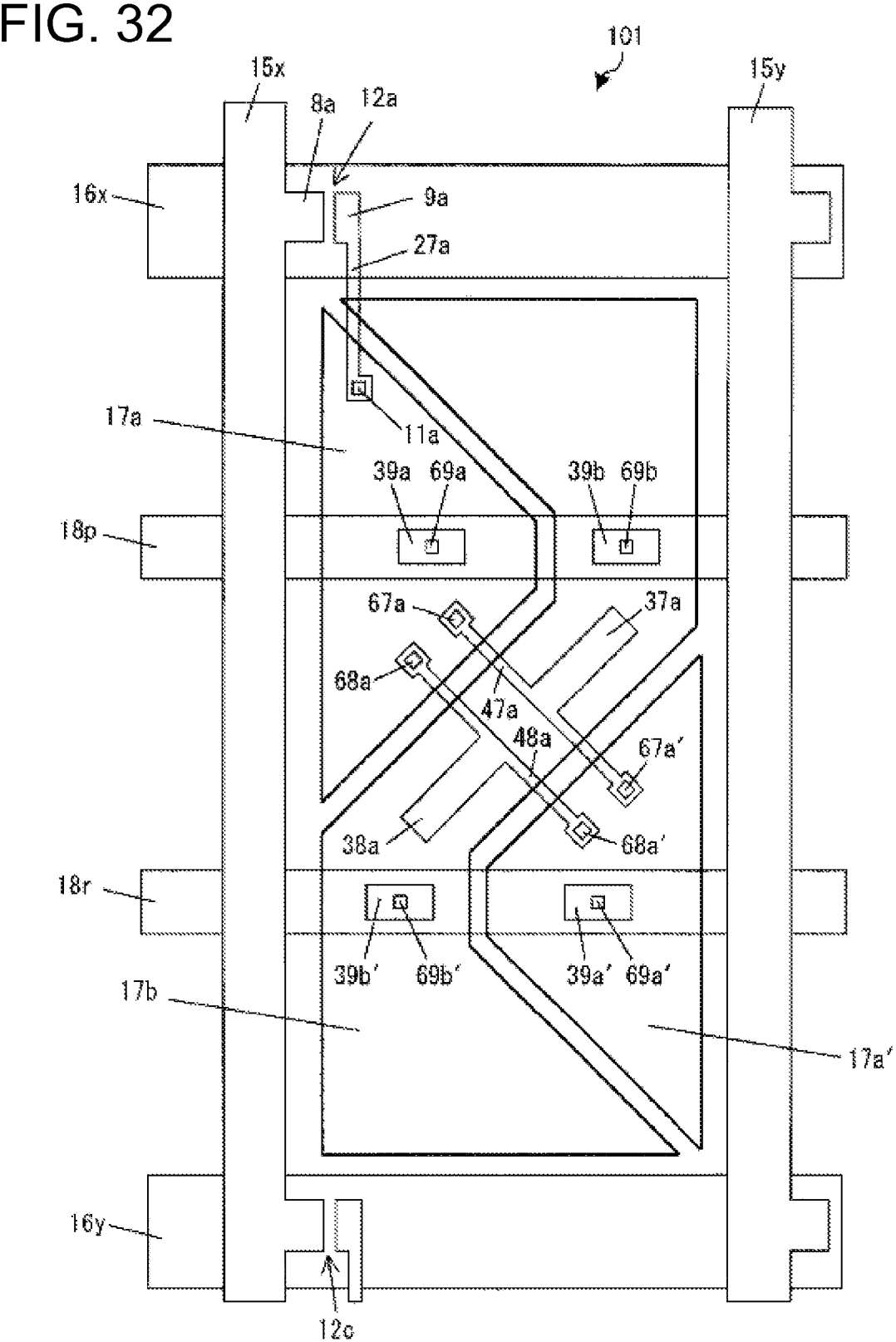
FIG. 32 is a plan view showing a specific example of the liquid crystal panel shown in FIG. 31.

A specific example of the pixel 101 of FIG. 31 is shown in FIG. 32. As shown in the figure, the transistor 12a is disposed in the proximity of the intersection of the data signal line 15x and the scan signal line 16x. In a pixel region defined by the signal lines (15x and 16x), a pixel electrode 17a in a trapezoid shape is formed; a pixel electrode 17a' in a trapezoid shape, which substantially matches to the shape of the pixel electrode 17a when it is rotated 180°, is formed at a position that is substantially 315° to a row direction of the storage capacitance wiring 18p; and a pixel electrode 17b is disposed in a region where the pixel electrodes 17a and 17a' are absent such that it corresponds to (fits) the shape of the pixel electrodes 17a and 17a'. Storage capacitance wirings 18p and 18r are disposed in parallel to each other. The storage capacitance wiring 18p crosses the pixel electrodes 17a and 17b to extend in the row direction, and the storage capacitance wiring 18r crosses the pixel electrodes 17b and 17a' to extend in the row direction.

According to such configuration, the respective pixel electrodes 17a, 17b, and 17a' are disposed as follows. A portion of the pixel electrode 17a is adjacent to the scan signal line 16x. A portion of the pixel electrode 17a' is adjacent to the scan signal line 16y. One end portion of the pixel electrode 17b is adjacent to the scan signal line 16x, and the other end portion is adjacent to the scan signal line 16y. In other words, at least parts of the respective pixel electrodes 17a and 17a' are disposed near the respective scan signal lines 16x, and the pixel electrode 17b is disposed to extend in the column direction as if to bridge the scan signal lines 16x and 16y.

The capacitance electrodes 37a and 38b extend to form an angle of 225° with respect to the row direction of the storage capacitance wiring 18p. The respective lead-out wirings 47a and 48a traverse the pixel electrode 17b to cross the gap between the pixel electrodes 17a and 17b, as well as the gap between the pixel electrodes 17b and 17a', and to overlap with portions of the respective pixel electrodes 17a and 17a'.

Over the scan signal line 16x, the source electrode 8a and the drain electrode 9a of the transistor 12a are formed, and the source electrode 8a is connected to the data signal line 15x. The drain electrode 9a is connected to the drain lead-out wiring 27a, and the drain lead-out wiring 27a is connected to the pixel electrode 17a through the contact hole 11a. The capacitance electrode 37a is connected to the pixel electrode 17a through the contact hole 67a and to the pixel electrode 17a' through a contact hole 67a', and overlaps with the pixel electrode 17b through the gate insulating film and the interlayer insulating film. The coupling capacitance Cab1 (see FIG. 31) between the pixel electrodes 17a (17a') and 17b is formed at the location of the overlap. Similarly, the capacitance electrode 38a is connected to the pixel electrode 17a through the contact hole 68a and to the pixel electrode 17a' through a contact hole 68a', and overlaps with the pixel electrode 17b through the gate insulating film and the interlayer insulating film. The coupling capacitance Cab2 (see FIG. 31) between the pixel electrodes 17a (17a') and 17b is formed at the location of the overlap.

Furthermore, the storage capacitance electrode 39a is connected to the pixel electrode 17a through the contact hole 69a, and overlaps with the storage capacitance wiring 18p through the gate insulating film. The coupling capacitance Cha1 (see FIG. 31) is mostly formed at the location of the overlap. A storage capacitance electrode 39a' is connected to the pixel electrode 17a' through a contact hole 69a', and overlaps with the storage capacitance wiring 18r through the gate insulating film. The coupling capacitance Cha2 (see FIG. 31) is mostly formed at the location of the overlap. The storage capacitance electrode 39b is connected to the pixel electrode 17b through the contact hole 69b, and overlaps with the storage capacitance wiring 18p through the gate insulating film. The storage capacitance Chb1 (see FIG. 31) is mostly formed at the location of the overlap. A storage capacitance electrode 39b' is connected to the pixel electrode 17b through a contact hole 69b', and overlaps with the storage capacitance wiring 18r through the gate insulating film. The storage capacitance Chb2 (see FIG. 31) is mostly formed at the location of the overlap.

In the liquid crystal panel of FIG. 32, the sub-pixel that includes the pixel electrodes 17a and 17a' becomes "BR," and the sub-pixel that includes the pixel electrode 17b becomes "DA."

In the liquid crystal panel of FIG. 32, the pixel electrodes 17a and 17a', and the pixel electrode 17b are connected together (capacitively coupled) by the two coupling capacitances (Cab1 and Cab2) arranged side by side. Therefore, even if a short-circuit occurs (during the manufacturing process or the like) between the capacitance electrode 37a and the pixel electrode 17b, for example, the capacitance coupling between the pixel electrodes 17a (17a') and 17b can be maintained by performing a repair process of cutting the capacitance electrode 37a by laser between the contact holes 67a and 67a' and the short-circuit site. Further, even if the contact hole 67a is not formed properly in the manufacturing process or the like, the capacitance coupling between the pixel electrodes 17a (17a') and 17b can be maintained. If a short-circuit occurs between the capacitance electrode 38a and the pixel electrode 17b, the capacitance electrode 38a can be cut between the contact holes 68a and 68a' and the short-circuit site by laser.

When the aforementioned repair process is performed in the active matrix substrate stage, the capacitance electrode 37a (portion below the contact hole 67a) is cut by laser irradiation from the back side (glass substrate side) of the active matrix substrate. Alternatively, the lead-out wiring 47a of the capacitance electrode 37a is cut by laser irradiation from the front side (opposite side from the glass substrate) of the active matrix substrate through the gap between the pixel electrodes 17a and 17b and the gap between the pixel electrodes 17b and 17a'. When the aforementioned repair process is performed in the liquid crystal panel stage, the capacitance electrode 37a (portion after the contact hole 67a) is cut by laser irradiation from the back side (glass substrate side of the active matrix substrate) of the liquid crystal panel.

When a short-circuit occurs between the capacitance electrode 37a and the pixel electrode 17b, the capacitance coupling between the pixel electrodes 17a and 17b can also be maintained by removing (trimming) a portion of the pixel electrode 17a inside the contact hole 67a by laser or the like to electrically disconnect the pixel electrode 17a from the capacitance electrode 37a, and by removing (trimming) a portion of the pixel electrode 17a' inside the contact hole 67a' by laser or the like to electrically disconnect the pixel electrode 17a' from the capacitance electrode 37a.

This way, according to the present embodiment, the production yield of liquid crystal panels and active matrix substrates to be used in the liquid crystal panels can be increased. Furthermore, two layers of insulating layers (gate insulating film and interlayer insulating film) are interposed between the capacitance electrodes (37a and 38a) and the pixel electrode (17b). Therefore, compared to a conventional configuration having only one layer (interlayer insulating film) interposed, the present embodiment can further suppress short-circuit formation between the capacitance electrodes and the pixel electrode.

In the present embodiment, the capacitance electrodes (37a and 38a) are formed in the same layer as the scan signal line, and are covered by the gate insulating film. Typically, the gate insulating film is formed at a higher temperature than the interlayer insulating film covering transistors. Therefore, the gate insulating film tends to be a denser film than the interlayer insulating film. As a result, according to the present embodiment, a greater advantage can be obtained in terms of suppressing short-circuit formation between the capacitance electrodes and the pixel electrode.

Figure 33:
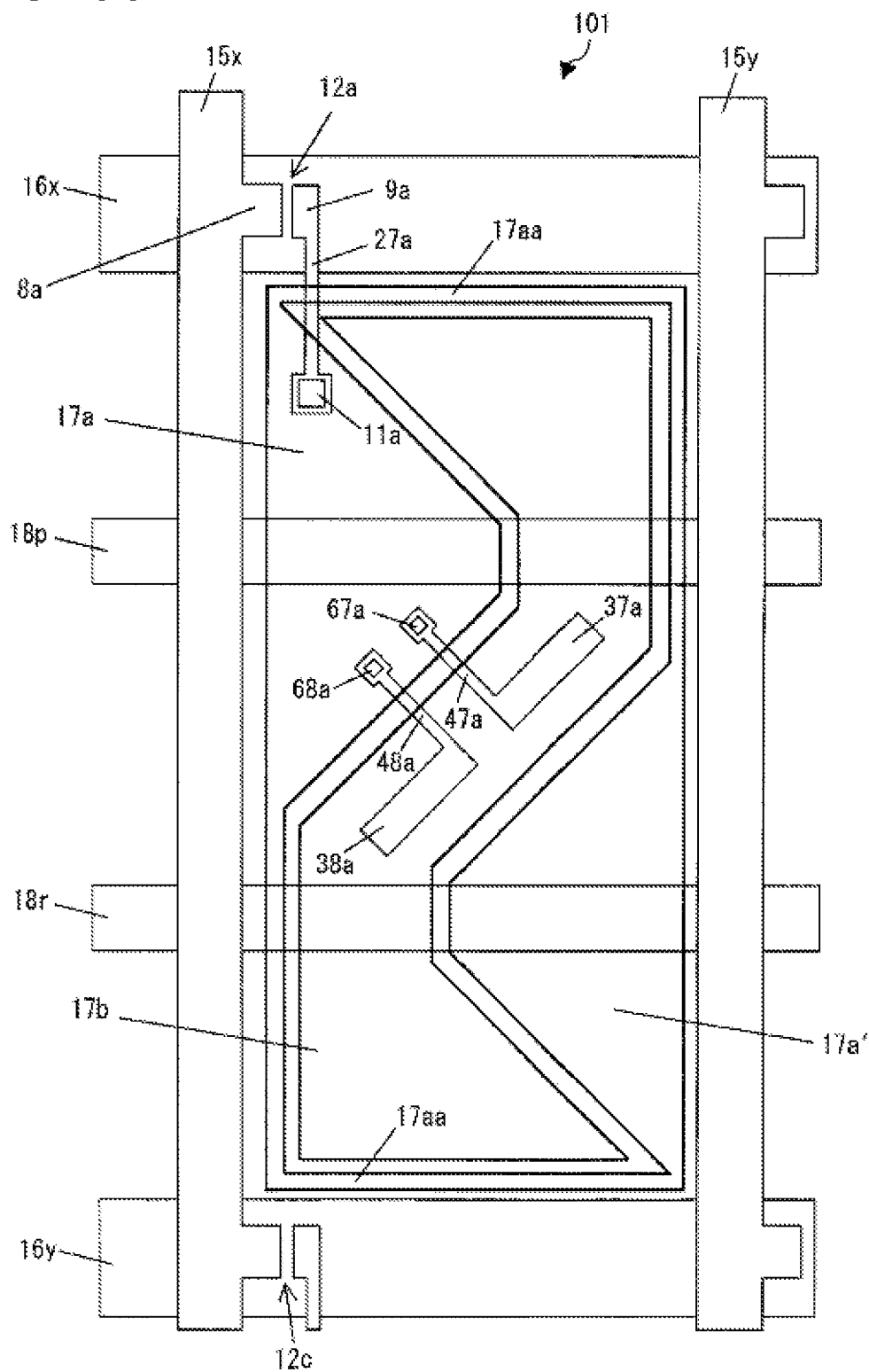
FIG. 33 is a plan view showing another specific example of the liquid crystal panel shown in FIG. 31.

The pixel 101 of FIG. 32 may be modified as shown in FIG. 33. In the configuration of FIG. 33, the pixel electrodes 17a and 17a' of FIG. 32 are connected to each other through a connecting portion 17a a made of ITO and the like in a region outside the perimeter of the pixel electrode 17b. Thus, a pixel electrode that is integrally formed of the pixel electrodes 17a and 17a' is disposed so as to surround the pixel electrode 17b. Because the pixel electrodes 17a and 17a' surround the pixel electrode 17b, which is electrically floating, the pixel electrodes 17a and 17a' function as shield electrodes, and jumping of electric charge or the like into the pixel electrode 17b can be suppressed. Consequently, burn-in of the sub-pixel (dark sub-pixel) that includes the pixel electrode 17b can be suppressed.

In this configuration, the pixel electrodes 17a and 17a' are electrically connected to each other through the connecting portion 17a a. Therefore, it is sufficient if the capacitance electrodes 37a and 38a are connected to one of the pixel electrodes 17a and 17a' (in FIG. 36, to the pixel electrode 17a) through the contact holes (67a and 68a). Furthermore, it is sufficient if the capacitance electrodes 37a and 38a are formed in the same layer as the scan signal line 16x to overlap with the pixel electrode 17b through the gate insulating film and the interlayer insulating film.

Here, the liquid crystal panel described above has the configuration in which the respective capacitance electrodes (37a and 38a of FIG. 32) are electrically connected to the pixel electrodes (17a and 17a' of FIG. 32) corresponding to the sub-pixel that becomes the bright sub-pixel. However, the present invention is not limited to such. The present liquid crystal panel may have a configuration in which the respective capacitance electrodes (37a and 38a) are electrically connected to the pixel electrode (17b) corresponding to the sub-pixel that becomes the dark sub-pixel.

Furthermore, the liquid crystal panel described above has the configuration in which the respective capacitance electrodes (37a and 38a) are electrically connected to one of the pixel electrodes (17a (17a') and 17b) and overlap with the other pixel electrode. However, the present invention is not limited to such. The present liquid crystal panel may have a configuration in which one of the capacitance electrodes (37a) is electrically connected to the pixel electrodes (17a and 17a') corresponding to the sub-pixel that becomes the bright sub-pixel, and overlaps with the pixel electrode (17b) corresponding to the sub-pixel that becomes the dark sub-pixel, whereas the other capacitance electrode (38a) is electrically connected to the pixel electrode (17b) corresponding to the sub-pixel that becomes the dark sub-pixel, and overlaps with the pixel electrodes (17a and 17a') corresponding to the sub-pixel that becomes the bright sub-pixel. The advantages described above can be obtained in this configuration as well.

Embodiment 4

Figure 34:
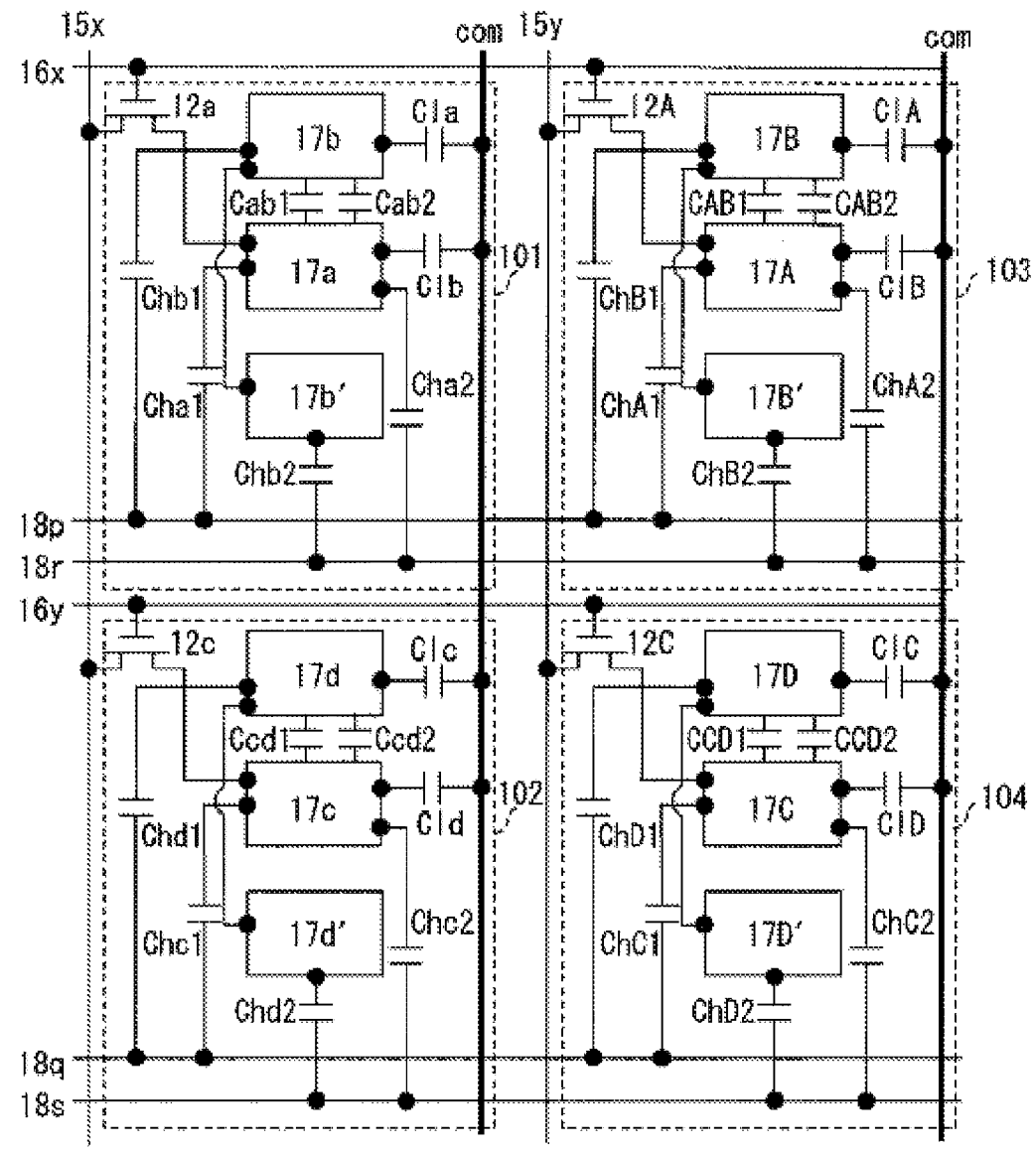
FIG. 34 is a circuit diagram showing another configuration of a liquid crystal panel according to Embodiment 4.

FIG. 34 is an equivalent circuit diagram showing a part of the liquid crystal panel according to Embodiment 4. As shown in FIG. 34, the present liquid crystal panel includes the following: data signal lines (15x and 15y) extending in the column direction (up and down directions in the figure); scan signal lines (16x and 16y) extending in the row direction (right and left directions in the figure); pixels (101 to 104) arranged in the row and column directions; storage capacitance wirings (18p to 18s); and a common electrode (opposite electrode) com. All pixels have the same structure. The pixel column that includes pixels 101 and 102 and the pixel column that includes pixels 103 and 104 are adjacent to each other, and the pixel row that includes pixels 101 and 103 and the pixel row that includes pixels 102 and 104 are adjacent to each other.

In the present liquid crystal panel, one data signal line, one scan signal line, and two storage capacitance wirings are provided for each of the pixels. In a single pixel, three pixel electrodes are provided. In the pixel 101, pixel electrodes 17b (second pixel electrode), 17a (first pixel electrode), and 17b' (third pixel electrode) are provided. In the pixel 102, pixel electrodes 17d, 17c, and 17d' are provided. In the pixel 103, pixel electrodes 17B, 17A, and 17B' are provided, and in the pixel 104, pixel electrodes 17D, 17C, and 17D' are provided.

Figure 35:
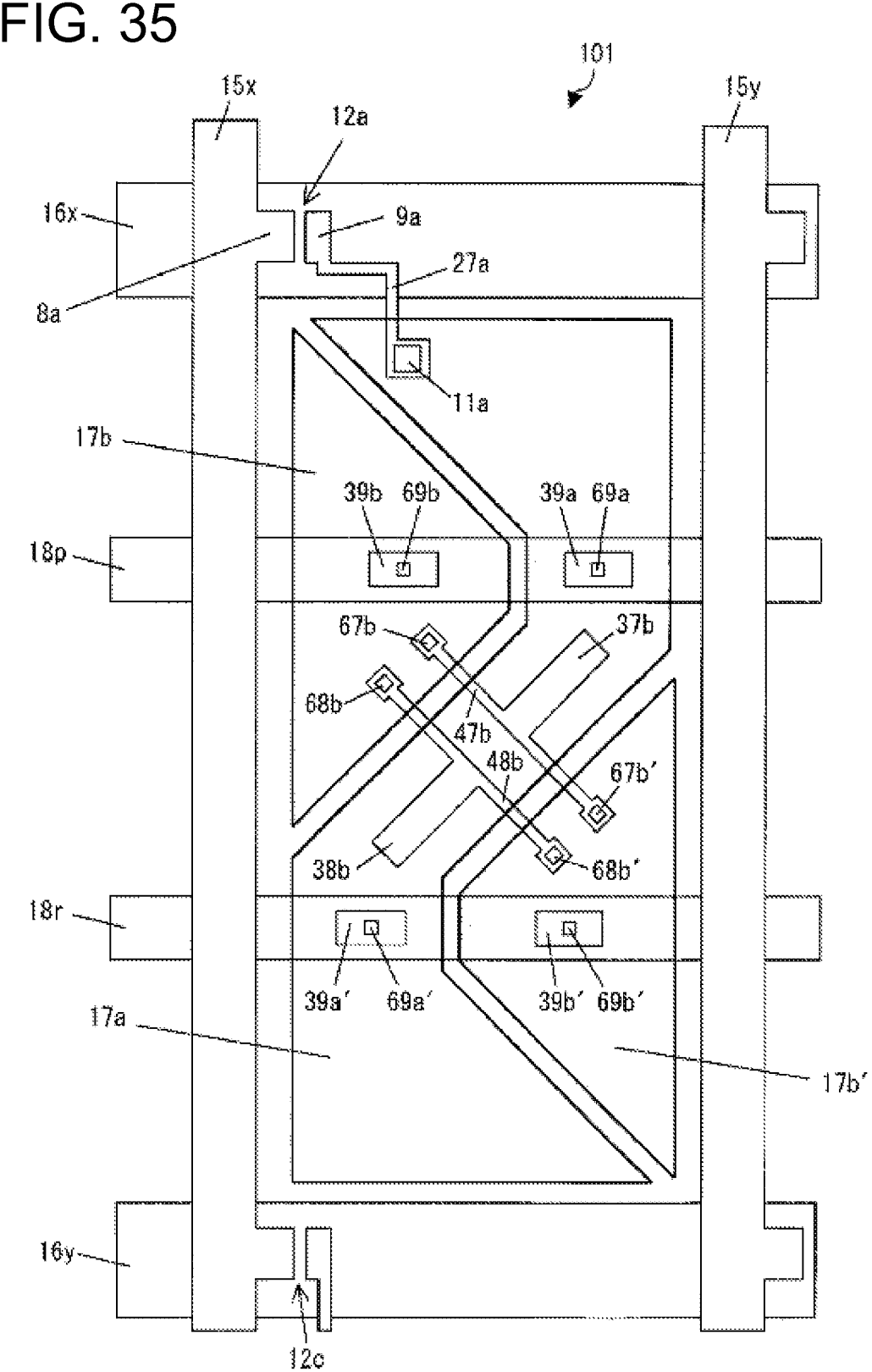
FIG. 35 is a plan view showing a specific example of the liquid crystal panel shown in FIG. 34.

A specific example of the pixel 101 of FIG. 34 is shown in FIG. 35. As shown in the figure, the transistor 12a is disposed in the proximity of the intersection of the data signal line 15x and the scan signal line 16x. In a pixel region defined by the signal lines (15x and 16x), a pixel electrode 17b in a trapezoid shape is formed; a pixel electrode 17b' in a trapezoid shape, which substantially matches the shape of the pixel electrode 17b when it is rotated 180°, is formed at a position that is substantially 315° to the row direction of the storage capacitance wiring 18p; and a pixel electrode 17a is disposed in a region where the pixel electrodes 17b and 17b' are absent such that it corresponds to (fits) the shape of the pixel electrodes 17b and 17b'. The storage capacitance wirings 18p and 18r are disposed parallel to each other. The storage capacitance wiring 18p extends in the row direction across the pixel electrodes 17a and 17b, and the storage capacitance wiring 18r extends in the row direction across the pixel electrodes 17a and 17b'.

According to such configuration, the respective pixel electrodes 17b, 17a, and 17b' are disposed as follows. A portion of the pixel electrode 17b is adjacent to the scan signal line 16x. A portion of the pixel electrode 17b' is adjacent to the scan signal line 16y. One end portion of the pixel electrode 17a is adjacent to the scan signal line 16x, and the other end portion is adjacent to the scan signal line 16y. In other words, at least portions of the respective pixel electrodes 17b and 17b' are located near the respective scan signal lines 16x and 16y. The pixel electrode 17a is disposed to extend in the column direction as if to bridge the scan signal lines 16x and 16y.

The capacitance electrodes 37b and 38b extend to form an angle of 225° with respect to the row direction of the storage capacitance wiring 18p. The respective lead-out wirings 47b and 48b traverse the pixel electrode 17a to cross the gap between the pixel electrodes 17a and 17b, as well as the gap between the pixel electrodes 17a and 17b', and to overlap with portions of the respective pixel electrodes 17b and 17b'.

Over the scan signal line 16x, the source electrode 8a and the drain electrode 9a of the transistor 12a are formed, and the source electrode 8a is connected to the data signal line 15x. The drain electrode 9a is connected to the drain lead-out wiring 27a, and the drain lead-out wiring 27a is connected to the pixel electrode 17a through the contact hole 11a. The capacitance electrode 37b is connected to the pixel electrode 17b through the contact hole 67b and to the pixel electrode 17b' through a contact hole 67b', and overlaps with the pixel electrode 17a through the gate insulating film and the interlayer insulating film. The coupling capacitance Cab1 (see FIG. 34) between the pixel electrodes 17a and 17b (17b') is formed at the location of the overlap. Similarly, the capacitance electrode 38b is connected to the pixel electrode 17b through the contact hole 68b and to the pixel electrode 17b' through a contact hole 68*b*', and overlaps with the pixel electrode 17*a* through the gate insulating film and the interlayer insulating film. The coupling capacitance Cab2 (see FIG. 34) between the pixel electrodes 17*a* and 17*b* (17*b*') is formed at the location of the overlap.

The storage capacitance electrode 39*a* is connected to the pixel electrode 17*a* through the contact hole 69*a*, and overlaps with the storage capacitance wiring 18*p* through the gate insulating film. The storage capacitance Cha1 (see FIG. 34) is mostly formed at the location of the overlap. The storage capacitance electrode 39*a*' is connected to the pixel electrode 17*a* through the contact hole 69*a*', and overlaps with the storage capacitance wiring 18*r* through the gate insulating film. The storage capacitance Cha2 (see FIG. 34) is mostly formed at the location of the overlap. The storage capacitance electrode 39*b* is connected to the pixel electrode 17*b* through the contact hole 69*b*, and overlaps with the storage capacitance wiring 18*p* through the gate insulating film. The storage capacitance Chb1 (see FIG. 34) is mostly formed at the location of the overlap. The storage capacitance electrode 39*b*' is connected to the pixel electrode 17*b*' through the contact hole 69*b*', and overlaps with the storage capacitance wiring 18*r* through the gate insulating film. The storage capacitance Chb2 (see FIG. 34) is mostly formed at the location of the overlap.

In the liquid crystal panel of FIG. 35, the sub-pixel that includes the pixel electrode 17*a* becomes "BR," and the sub-pixel that includes the pixel electrodes 17*b* and 17*b*' becomes "DA."

In the liquid crystal panel of FIG. 35, the pixel electrode 17*a* and the pixel electrodes 17*b* and 17*b*' are connected together (capacitively coupled) by the two coupling capacitances (Cab1 and Cab2) arranged side by side. Therefore, even if a short-circuit occurs (during the manufacturing process or the like) between the capacitance electrode 37*b* and the pixel electrode 17*a*, for example, the capacitance coupling between the pixel electrodes 17*a* and 17*b* (17*b*') can be maintained by performing a repair process by cutting the capacitance electrode 37*b* by laser between the contact holes 67*b* and 67*b*' and the short-circuit site. Further, even if the contact hole 67*b* is not formed properly in the manufacturing process or the like, the capacitance coupling between the pixel electrodes 17*a* and 17*b* (17*b*') can be maintained. If a short-circuit occurs between the capacitance electrode 38*b* and the pixel electrode 17*a*, the capacitance electrode 38*b* can be cut between the contact holes 68*b* and 68*b*' and the short-circuit site by laser.

When the aforementioned repair process is performed in the active matrix substrate stage, the capacitance electrode 37*b* (portion below the contact hole 67*b*) is cut by laser irradiation from the back side (glass substrate side) of the active matrix substrate. Alternatively, the lead-out wiring 47*b* of the capacitance electrode 37*b* is cut by laser irradiation from the front side (opposite side from the glass substrate) of the active matrix substrate through the gap between the pixel electrodes 17*a* and 17*b* and through the gap between the pixel electrode 17*a* and 17*b*'. When the aforementioned repair process is performed in the liquid crystal panel stage, the capacitance electrode 37*b* (portion below the contact hole 67*b*) is cut by laser irradiation from the back side (glass substrate side of the active matrix substrate) of the liquid crystal panel.

Alternatively, when a short-circuit occurs between the capacitance electrode 37*b* and the pixel electrode 17*a*, the capacitance coupling between the pixel electrodes 17*a* and 17*b* (17*b*') can be maintained by removing (trimming) a portion of the pixel electrode 17*b* inside the contact hole 67*b* by laser or the like to electrically disconnect the pixel electrode 17*b* from the capacitance electrode 37*b*, and by removing (trimming) a portion of the pixel electrode 17*b*' inside the contact hole 67*b*' by laser or the like to electrically disconnect the pixel electrode 17*b*' from the capacitance electrode 37*b*.

This way, according to the present embodiment, the production yield of liquid crystal panels and active matrix substrates to be used in the liquid crystal panels can be increased. Furthermore, two layers of insulating layers (gate insulating film and interlayer insulating film) are interposed between the capacitance electrodes (37*b* and 38*b*) and the pixel electrode (17*a*). Therefore, compared to a conventional configuration having only one layer (interlayer insulating film) interposed, the present embodiment can further suppress short-circuit formation between the capacitance electrodes and the pixel electrode.

In this embodiment, the capacitance electrodes (37*b* and 38*b*) are formed in the same layer as the scan signal line, and are covered by the gate insulating film. Typically, the gate insulating film is formed at a higher temperature than the interlayer insulating film covering transistors. Therefore, the gate insulating film tends to be a denser film than the interlayer insulating film. Therefore, according to the present embodiment, a greater advantage can be obtained in terms of preventing short-circuit formation between the capacitance electrodes and the pixel electrode.

Figure 36:
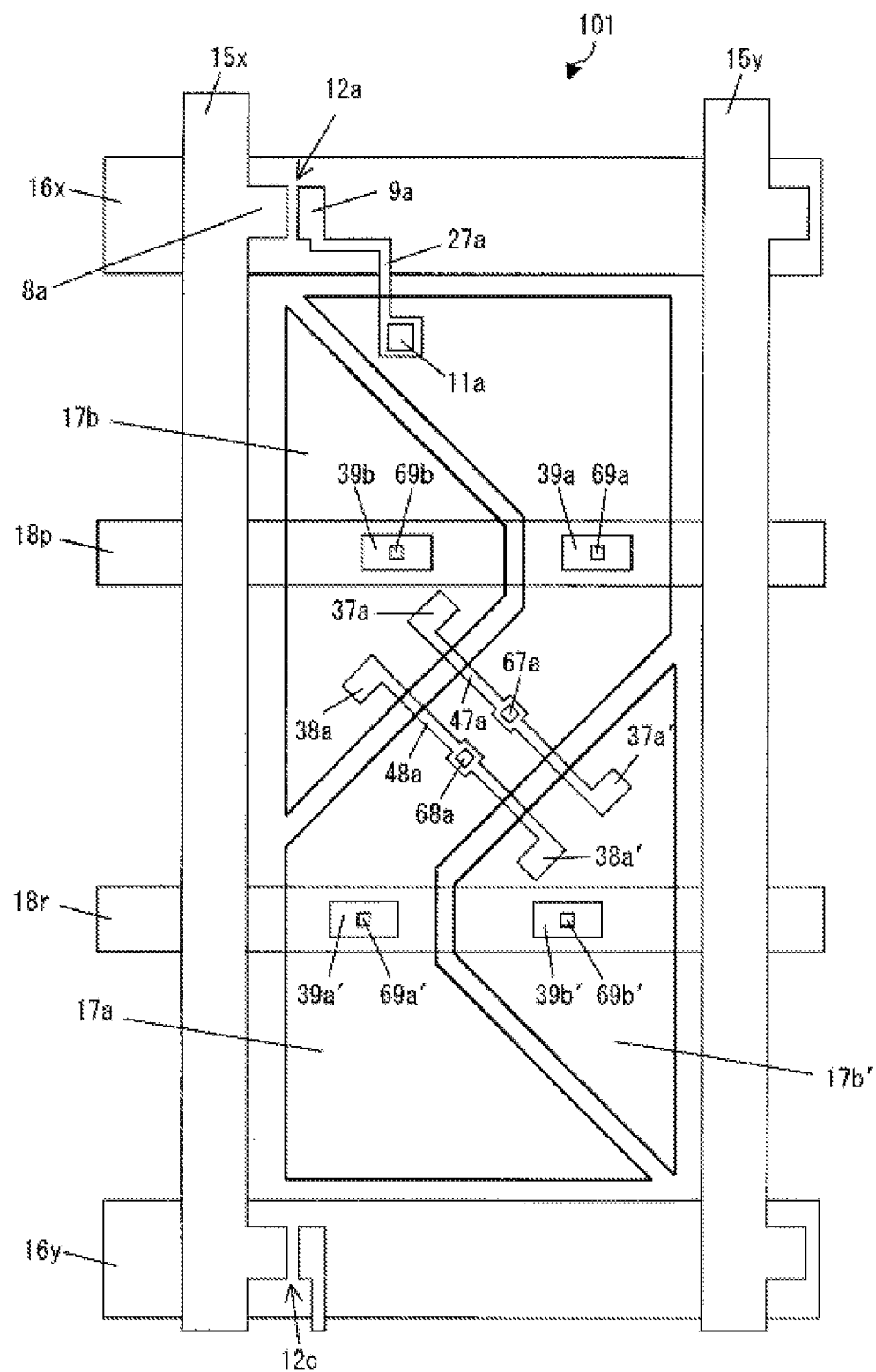
FIG. 36 is a plan view showing another specific example of the liquid crystal panel shown in FIG. 34.
Figure 37:
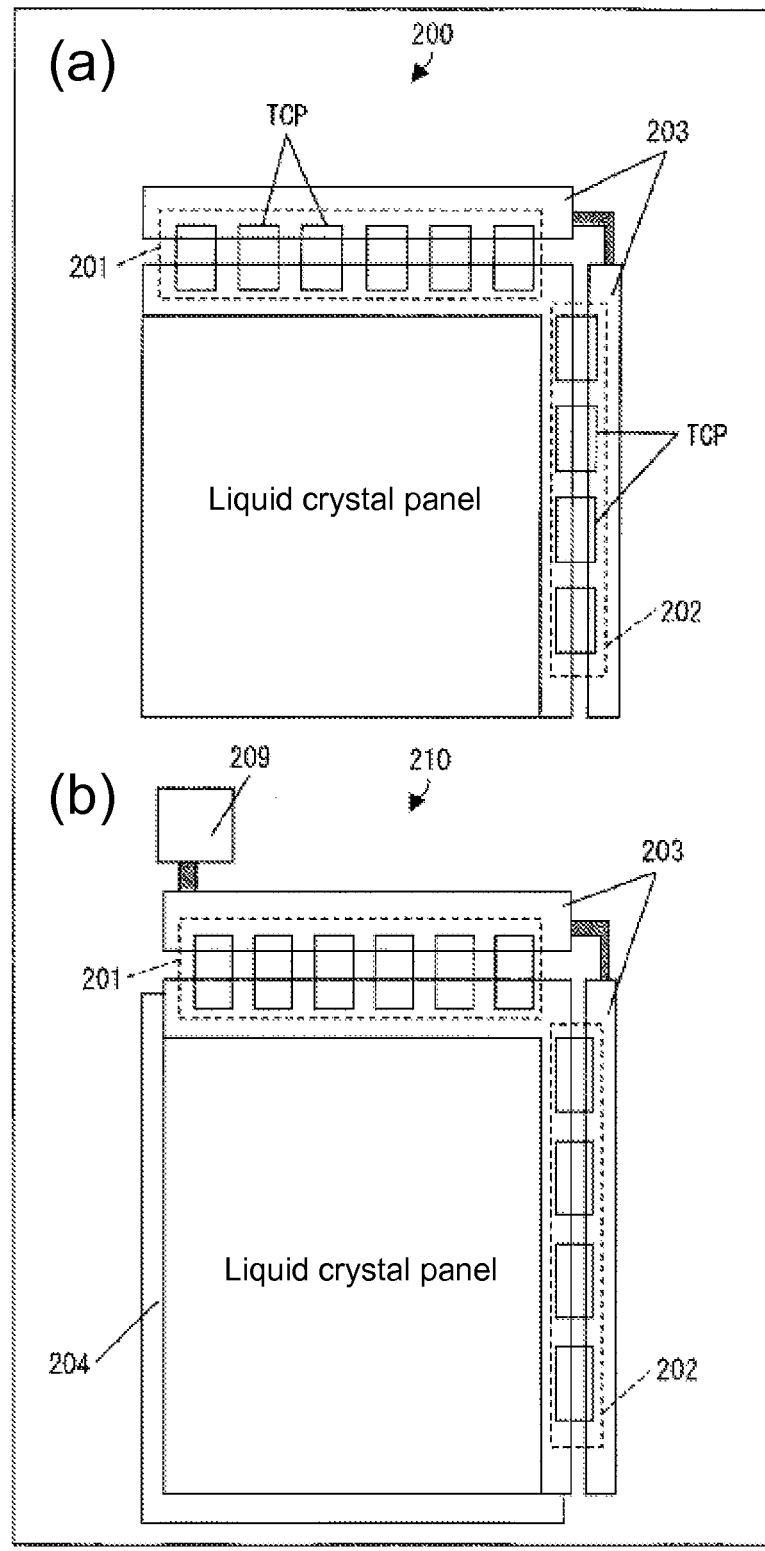
FIG. 37 is a schematic view showing configurations of a liquid crystal display unit and a liquid crystal display device according to the present invention.

The pixel 101 of FIG. 35 may be modified as shown in FIG. 36. The present liquid crystal panel of FIG. 36 has a configuration in which the capacitance electrodes are electrically connected to the pixel electrode corresponding to the sub-pixel that becomes the bright sub-pixel, and overlap with two pixel electrodes corresponding to the sub-pixel that becomes the dark sub-pixel. Specifically, in the present liquid crystal panel, the source electrode 8*a* and the drain electrode 9*a* of the transistor 12*a* are formed over the scan signal line 16*x*, and the source electrode 8*a* is connected to the data signal line 15*x*. The drain electrode 9*a* is connected to the drain lead-out wiring 27*a*, and the drain lead-out wiring 27*a* is connected to the pixel electrode 17*a* through the contact hole 11*a*. The respective capacitance electrodes 37*a* and 37*a*' are connected to the pixel electrode 17*a* through the contact hole 67*a*, and respectively overlap with the pixel electrodes 17*b* and 17*b*' through the gate insulating film and the interlayer insulating film. A portion of the coupling capacitance Cab1 (see FIG. 34) between the pixel electrodes 17*a* and 17*b* is formed at the location where the capacitance electrode 37*a* and the pixel electrode 17*b* overlap with each other. A portion of the coupling capacitance Cab1 (see FIG. 34) between the pixel electrodes 17*a* and 17*b*' is formed at the location where the capacitance electrode 37*a*' and the pixel electrode 17*b*' overlap with each other. The respective capacitance electrodes 38*a* and 38*a*' are connected to the pixel electrode 17*a* through the contact hole 68*a*, and respectively overlap with the pixel electrodes 17*b* and 17*b*' through the gate insulating film and the interlayer insulating film. A portion of the coupling capacitance Cab2 (see FIG. 34) between the pixel electrodes 17*a* and 17*b* is formed at the location where the capacitance electrode 38*a* and the pixel electrode 17*b* overlap with each other. A portion of the coupling capacitance Cab2 (see FIG. 34) between the pixel electrodes 17*a* and 17*b*' is formed at the location where the capacitance electrode 38*a*' and the pixel electrode 17*b*' overlap with each other.

The aforementioned advantages can be obtained in this configuration as well.

Lastly, configuration examples of a liquid crystal display unit and a liquid crystal display device according to the present invention are described. In embodiments discussed above, the present liquid crystal display unit and liquid crystal display device are configured as follows. That is, two polarizing plates A and B are attached on respective sides of the liquid crystal panel so that the polarizing axis of the polarizing plate A and the polarizing axis of the polarizing plate B cross each other at a right angle. For the polarizing plates, an optical compensation sheet or the like may be layered as necessary. Next, as shown in FIG. 37(a), drivers (gate driver 202 and source driver 201) are connected. Here, connection of a driver by TCP (Tape Career Package) system is described as an example. First, ACF (Anisotropic Conductive Film) is temporarily pressure-bonded to the terminal section of the liquid crystal panel. Next, TCP with a driver mounted thereon is punched out from a carrier tape, aligned to the panel terminal electrode, and heated for permanent pressure-bonding. Then, a circuit substrate 203 (PWB: Printed Wiring Board) for coupling the driver TCPs and TCP input terminals are connected together by ACF. The liquid crystal display unit 200 is thus complete. Subsequently, as shown in FIG. 37(b), a display control circuit 209 is connected to drivers (201 and 202) of the liquid crystal display unit through circuit substrates 203 for unification with an illumination device (backlight unit) 204 to complete a liquid crystal display device 210.

The "polarity of the potential" herein refers to either the reference potential (positive) or higher, or to the reference potential (negative) or lower. Here, the reference potential may be Vcom (common potential), which is the potential of the common electrode (opposite electrode), or any other potential.

Figure 38:
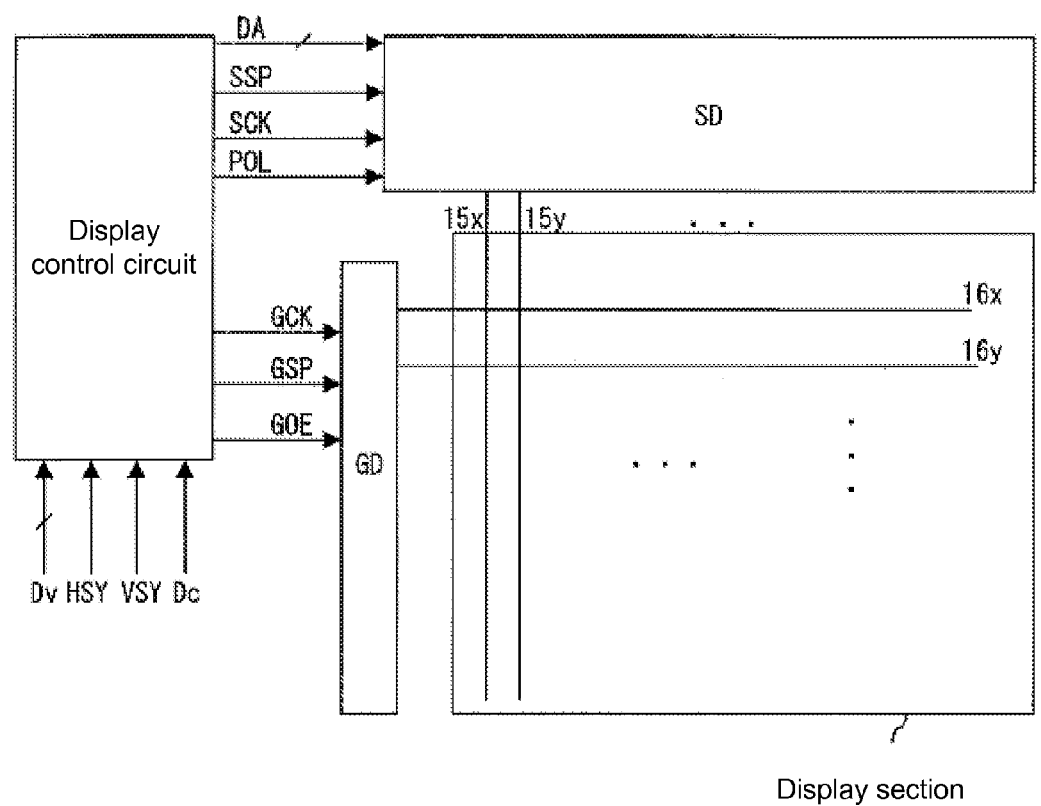
FIG. 38 is a block diagram explaining an entire configuration of a liquid crystal display device according to the present invention.

FIG. 38 is a block diagram showing the configuration of the present liquid crystal display device. As shown in the figure, the present liquid crystal display device includes a display section (liquid crystal panel), a source driver (SD), a gate driver (GD), and a display control circuit. The source driver drives the data signal lines, and the gate driver drives the scan signal lines. The display control circuit controls the source driver and the gate driver.

The display control circuit receives from an external signal source (a tuner, for example) a digital video signal Dv representing images to be displayed, a horizontal synchronization signal HSY and a vertical synchronization signal VSY for the digital video signal Dv, and a control signal Dc for controlling the display action. Based on the received signals Dv, HSY, VSY, and Dc, the display control circuit generates: a data start pulse signal SSP; a data clock signal SCK; a charge share signal sh; a digital image signal DA (the signal corresponding to the video signal Dv) representing the image to be displayed; a gate start pulse signal GSP; a gate clock signal GCK; and a gate driver output control signal (scan signal output control signal) GOE, as signals for displaying images represented by the digital video signal Dv on the display section, and outputs them.

In more detail, the video signal Dv is subjected to the timing adjustment and the like in the internal memory as necessary, and then is output from the display control circuit as a digital image signal DA. The display control circuit generates a data clock signal SCK, which is composed of pulses corresponding to the respective pixels of the images represented by the digital image signal DA; generates, based on the horizontal synchronization signal HSY, a data start pulse signal SSP, which shifts to a high level (H level) for a predetermined period of time for every horizontal scan period; generates, based on the vertical synchronization signal VSY, a gate start pulse signal GSP, which shifts to H level for a predetermined period of time for every frame period (one vertical scan period); generates a gate clock signal GCK based on the horizontal synchronization signal HSY; and generates the charge share signal sh and the gate driver output control signal GOE based on the horizontal synchronization signal HSY and the control signal Dc.

Among the signals generated by the display control circuit as described above, the digital image signal DA, the charge share signal sh, the signal POL for controlling the polarity of signal potentials (data signal potentials), the data start pulse signal SSP, and the data clock signal SCK are input to the source driver, and the gate start pulse signal GSP, the gate clock signal GCK, and the gate driver output control signal GOE are input to the gate driver.

The source driver sequentially generates analog potentials (signal potentials) corresponding to the pixel values of images represented by the digital image signal DA at respective scan signal lines for every horizontal scan period, based on the digital image signal DA, data clock signal SCK, charge share signal sh, data start pulse signal SSP, and polarity inversion signal POL, and outputs these data signals to the data signal lines (15x and 15X, for example).

The gate driver generates the gate-on pulse signals based on the gate start pulse signal GSP, the gate clock signal GCK, and the gate driver output control signal GOE, and outputs the signals to the scan signal lines to selectively drive the scan signal lines.

The data signal lines and the scan signal lines in the display section (liquid crystal panel) are driven by the source driver and the gate driver in the manner described above, and signal potentials are written from the data signal lines to the pixel electrodes through transistors (TFT) connected to the selected scan signal lines. Consequently, voltages are applied to the liquid crystal layer for respective sub-pixels, by which the amount of the light from the backlight that is transmitted is controlled, and images represented by the digital video signal Dv are displayed on respective sub-pixels.

Figure 39:
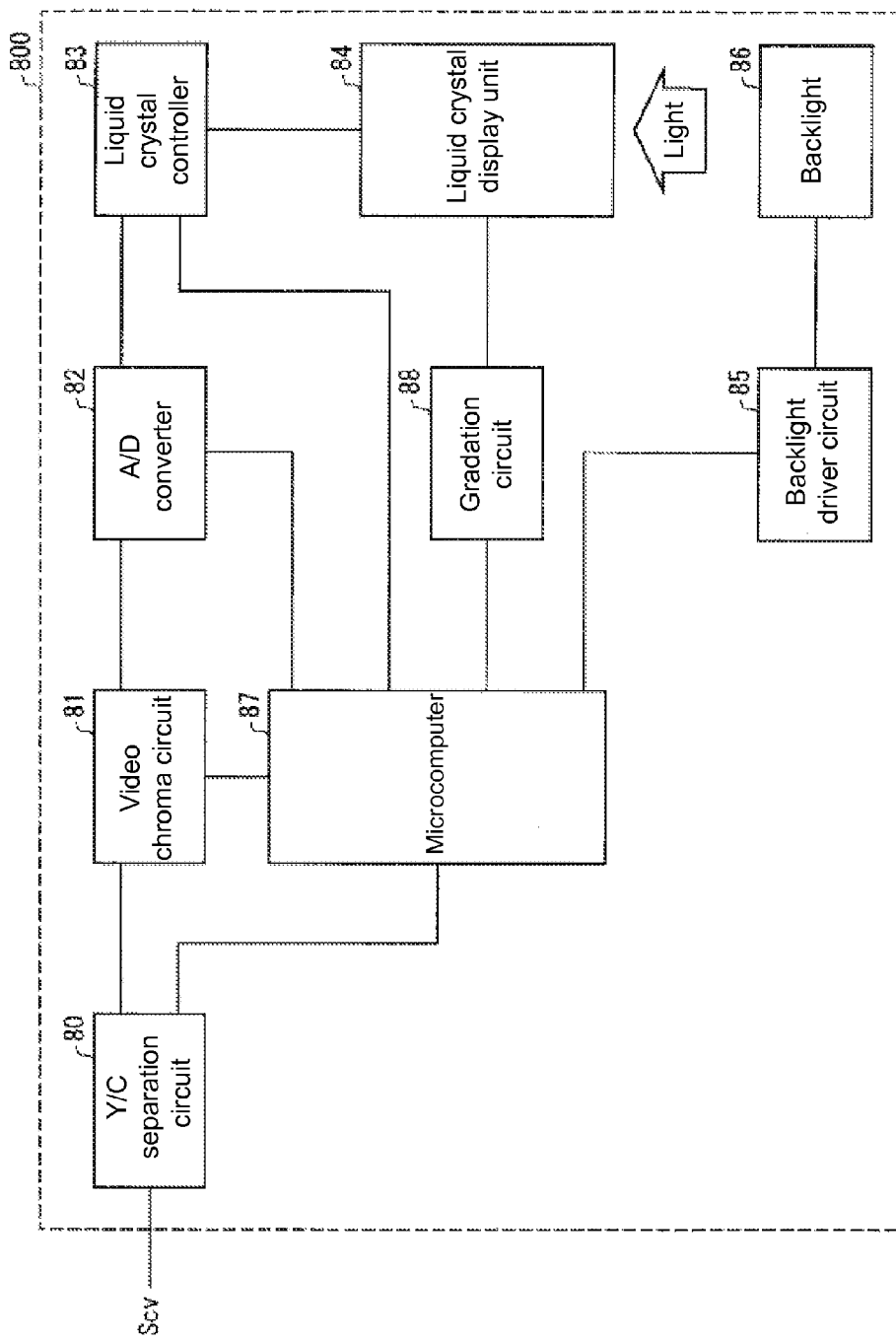
FIG. 39 is a block diagram explaining the functions of the present liquid crystal display device.

Next, a configuration example of the present liquid crystal display device as applied to a television receiver is described. FIG. 39 is a block diagram showing the configuration of a liquid crystal display device 800 for television receiver. The liquid crystal display device 800 includes a liquid crystal display unit 84, a Y/C separation circuit 80, a video chroma circuit 81, an A/D converter 82, a liquid crystal controller 83, a backlight driver circuit 85, a backlight 86, a microcomputer 87, and a gradation circuit 88. The liquid crystal display unit 84 is composed of a liquid crystal panel and a source driver and a gate driver for driving the liquid crystal panel.

In the liquid crystal display device 800 having a configuration described above, first, a composite color image signal Scv, which is a television signal, is input from outside to the Y/C separation circuit 80. There, the signal is separated into a luminance signal and a color signal. The luminance signal and the color signal are converted to analog RGB signal corresponding to three primary colors of light by the video chroma circuit 81. Further, this analog RGB signal is converted to a digital RGB signal by the A/D converter 82. The digital RGB signal is input to the liquid crystal controller 83. In the Y/C separation circuit 80, horizontal and vertical synchronization signals are also obtained from the composite color image signal Scv, which is input from outside. These synchronization signals are also input to the liquid crystal controller 83 through the microcomputer 87.

To the liquid crystal display unit 84, the digital RGB signal is input from the liquid crystal controller 83, together with the timing signal based on the aforementioned synchronization signals at a predetermined timing. Also, in the gradation circuit 88, gradation potentials of respective three primary colors R, G, and B for color display are generated, and the gradation potentials are also supplied to the liquid crystal display unit 84. In the liquid crystal display unit 84, signals for driving (data signals=signal potentials, scan signals, and the like) are generated by the internal source driver, the gate driver, and the like based on the RGB signals, the timing signals, and gradation potentials. Based on the signals for driving, color images are displayed on the internal liquid crystal panel. In order for the images to be displayed by the liquid crystal display unit 84, the light needs to be radiated from behind the liquid crystal panel in the liquid crystal display unit. In the liquid crystal display device 800, the backlight driver circuit 85 drives the backlight 86 under the control of the microcomputer 87, and irradiates the back side of the liquid crystal panel with the light. Overall system control, including the processes described above, is conducted by the microcomputer 87. Not only image signals based on television broadcasting, but signals of images captured by cameras and of other images supplied via internet connection can also be used as image signals input from outside (composite color image signals). Thus, in the liquid crystal display device 800, image display based on various image signals is possible.

Figure 40:
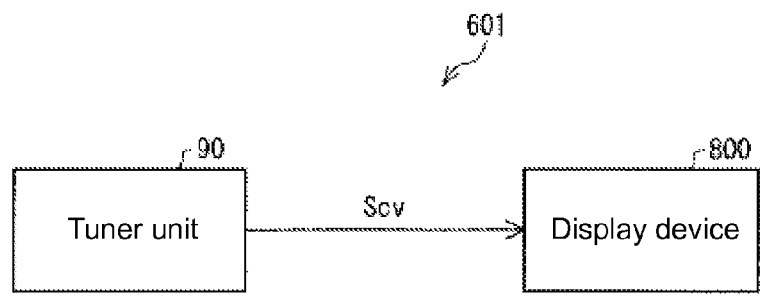
FIG. 40 is a block diagram explaining the functions of a television receiver according to the present invention.

When the liquid crystal display device 800 is used to display images of television broadcasting, as shown in FIG. 40, a tuner unit 90 is connected to the liquid crystal display device 800 to constitute a television receiver 601. The tuner unit 90 extracts signals of the channel to be received from the waves (high frequency signals) received through an antenna (not shown), and converts the extracted signals to an intermediate frequency signal. The tuner unit 90 then detects the intermediate frequency signal to retrieve composite color image signal Scv as a television signal. The composite color image signal Scv is input to the liquid crystal display device 800 as described above. Images based on the composite color image signal Scv are displayed by the liquid crystal display device 800.

Figure 41:
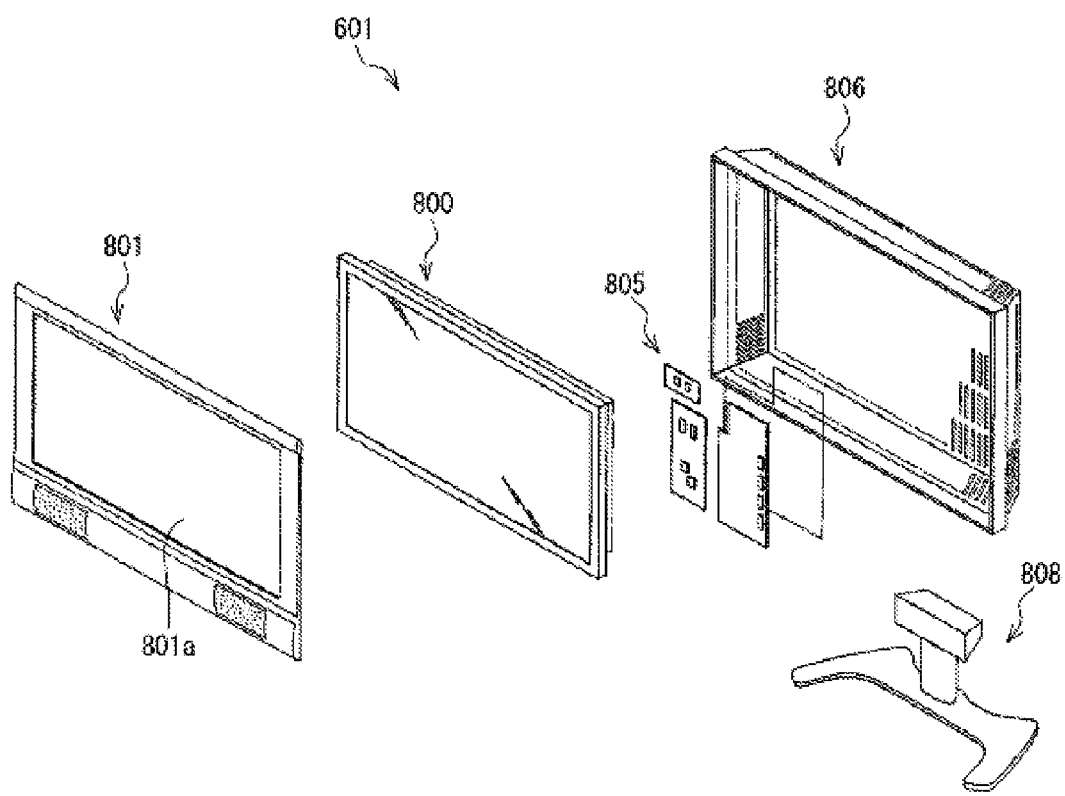
FIG. 41 is an exploded perspective view showing a configuration of the television receiver.
Figure 42:
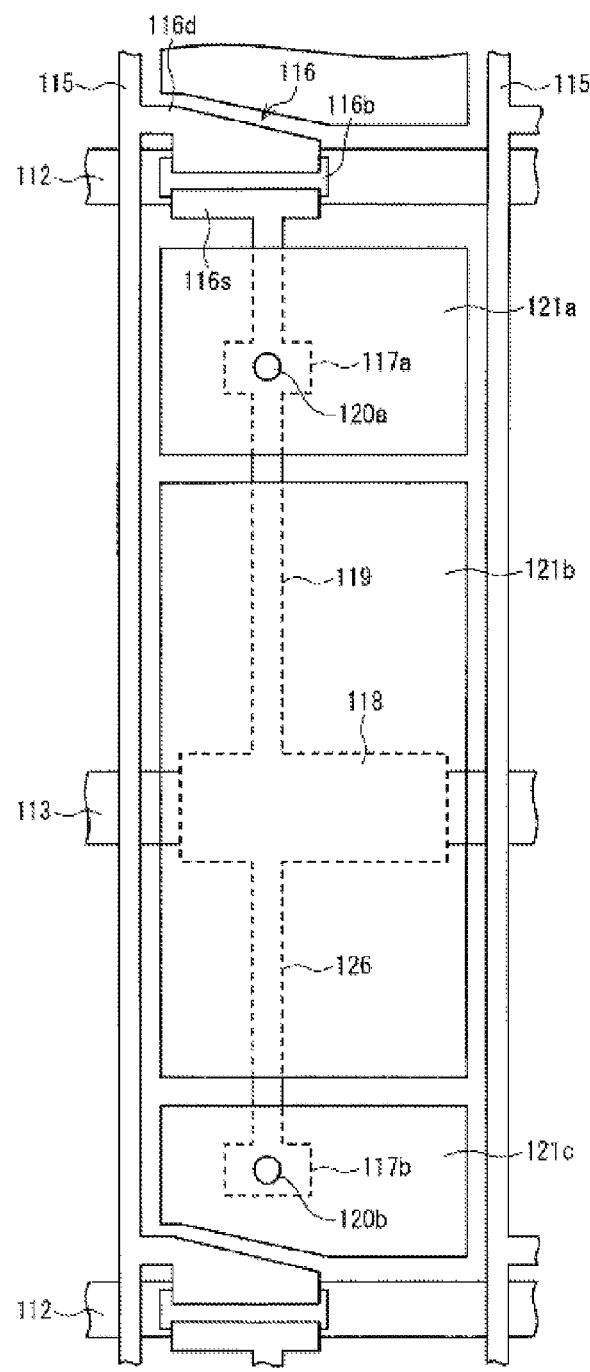
FIG. 42 is a plan view showing the configuration of a conventional liquid crystal panel.

FIG. 41 is an exploded perspective view showing a configuration example of the present television receiver. As shown in the figure, the television receiver 601 includes a first case 801 and a second case 806, in addition to the liquid crystal display device 800, as its constituting elements, and the liquid crystal display device 800 is held in the first case 801 and the second case 806. In the first case 801, there is an opening portion 801a that transmits the image to be displayed on the liquid crystal display device 800. The second case 806 covers the back side of the liquid crystal display device 800. An operation circuit 805 for operating the display device 800 is provided in the second case 806, and a supporting member 808 is attached at the bottom of the second case 806.

The present invention is not limited to the embodiments described above. Any appropriate modifications of the embodiments described above based on the common technical knowledge, and any combinations of them are also included in embodiments of the present invention.

The present active matrix substrate includes a scan signal line, a data signal line, a transistor connected to the scan signal line and the data signal line, first and second pixel electrodes provided in a single pixel region, the aforementioned first pixel electrode being connected to the data signal line through the transistor, and first and second capacitance electrodes formed in a same layer as the scan signal line. The first capacitance electrode is electrically connected to one of the first and second pixel electrodes, and forms a capacitance with the other of the first and second pixel electrodes. The second capacitance electrode is electrically connected to one of the first or second pixel electrodes, and forms a capacitance with the other of the first and second pixel electrodes.

The aforementioned configuration is a configuration of a capacitance coupling type pixel division system active matrix substrate in which the first and second pixel electrodes provided in a single pixel region are connected to each other through two capacitances (coupling capacitances). Consequently, even if one of the capacitances becomes defective in the manufacturing process or the like, the capacitance coupling of the first and second pixel electrodes can be maintained by the other capacitance. For example, in a configuration in which the first capacitance electrode and the second capacitance electrode are electrically connected to the first pixel electrode and a capacitance is formed between the first capacitance electrode and the second pixel electrode as well as between the second capacitance electrode and the second pixel electrode, even when a short-circuit occurs between the first capacitance electrode and the second pixel electrode, the capacitance coupling between the first and second pixel electrodes can be maintained by the capacitance (coupling capacitance) formed between the second capacitance electrode and the second pixel electrode by cutting the first capacitance electrode between the location connected to the first pixel electrode and the short-circuit site. Consequently, manufacturing yield of the present active matrix substrate and the liquid crystal panel equipped with the active matrix substrate can be improved.

Furthermore, in the aforementioned configuration, the first and second capacitance electrodes are formed in the same layer as the scan signal line. Therefore, the thickness of an insulating film interposed between the capacitance electrodes and pixel electrode can be made thicker than that of a conventional configuration. As a result, the aforementioned configuration can suppress short-circuit formation between capacitance electrodes and pixel electrode further.

The present active matrix substrate may have a configuration in which at least one portion of the first capacitance electrode overlaps with the aforementioned other of the first and second pixel electrodes through an interlayer insulating film covering the channel of the transistor and a gate insulating film covering the first capacitance electrode and the scan signal line, whereas at least one portion of the second capacitance electrode overlaps with the aforementioned other of the first and second pixel electrodes through the interlayer insulating film covering the channel of the transistor and the gate insulating film covering the second capacitance electrode and the scan signal line.

According to the aforementioned configuration, the first and second capacitance electrodes are covered by the gate insulating film, which is denser than the interlayer insulating film covering the transistor. Therefore, short-circuit formation between the capacitance electrodes and the pixel electrode can be effectively suppressed.

The present active matrix substrate may have a configuration in which the perimeters of the first and second pixel electrodes are constituted of a plurality of sides, and one side of the first pixel electrode and one side of the second pixel electrode are adjacent to each other, and the respective first and second capacitance electrodes are disposed such that they overlap with the gap between the two sides adjacent to each other, the first pixel electrode, and the second pixel electrode.

The present active matrix substrate may have a configuration in which the first capacitance electrode is connected to the first pixel electrode through a contact hole running through the interlayer insulating film and the gate insulating film and overlaps with the second pixel electrode through the interlayer insulating film and the gate insulating film, whereas the second capacitance electrode is connected to the first pixel electrode through a contact hole running through the interlayer insulating film and the gate insulating film and overlaps with the second pixel electrode through the interlayer insulating film and the gate insulating film.

Alternatively, the present active matrix substrate may have a configuration in which the first capacitance electrode is connected to the second pixel electrode through a contact hole running through the interlayer insulating film and the gate insulating film and overlaps with the first pixel electrode through the interlayer insulating film and the gate insulating film, whereas the second capacitance electrode is connected to the second pixel electrode through a contact hole running through the interlayer insulating film and the gate insulating film and overlaps with the first pixel electrode through the interlayer insulating film and the gate insulating film.

Alternatively, the present active matrix substrate may have a configuration in which the first capacitance electrode is connected to the first pixel electrode through a contact hole running through the interlayer insulating film and the gate insulating film and overlaps with the second pixel electrode through the interlayer insulating film and the gate insulating film, whereas the second capacitance electrode is connected to the second pixel electrode through a contact hole running through the interlayer insulating film and the gate insulating film and overlaps with the first pixel electrode through the interlayer insulating film and the gate insulating film.

Alternatively, the present active matrix substrate may have a configuration in which a drain lead-out electrode led out from one of the conductive electrodes of the transistor and the first pixel electrode are connected to each other through a first contact hole, and the first pixel electrode and the first capacitance electrode are connected to each other through a second contact hole, and the first pixel electrode and the second capacitance electrode are connected to each other through a third contact hole.

Alternatively, the present active matrix substrate may have a configuration in which the drain lead-out electrode led out from one of the conductive electrodes of the transistor and the first pixel electrode are connected to each other through a first contact hole, and the second pixel electrode and the first capacitance electrode are connected to each other through a second contact hole, and the second pixel electrode and the second capacitance electrode are connected to each other through a third contact hole.

Alternatively, the present active matrix substrate may have a configuration in which the drain lead-out electrode led out from one of the conductive electrodes of the transistor and the first pixel electrode are connected to each other through a first contact hole, and the first pixel electrode and the first capacitance electrode are connected to each other through a second contact hole, and the second pixel electrode and the second capacitance electrode are connected to each other through a third contact hole.

Alternatively, the present active matrix substrate may have a configuration in which the first capacitance electrode, the drain lead-out electrode led out from one of the conductive electrodes of the transistor, and the first pixel electrode are interconnected through the same contact hole running through the interlayer insulating film and the gate insulating film, and the first pixel electrode and the second capacitance electrode are connected to each other through a contact hole that is different from the aforementioned contact hole.

Assuming that the extending direction of the scan signal line is the row direction, the present active matrix substrate may have a configuration in which the first and second pixel electrodes are arranged in the column direction.

Alternatively, the present active matrix substrate may have a configuration in which, among the two pixel regions adjacent to each other in the row direction, the first pixel electrode in one of the pixel regions and the second pixel electrode in the other of the pixel regions are adjacent to each other in the row direction.

The present active matrix substrate may have a configuration in which the first pixel electrode surrounds the second pixel electrode.

Alternatively, the present active matrix substrate may have a configuration in which the second pixel electrode surrounds the first pixel electrode.

The present active matrix substrate may further include a storage capacitance wiring that forms a capacitance with the first pixel electrode or with a conductive body electrically connected to the first pixel electrode, and that forms a capacitance with the second the pixel electrode or with a conductive body electrically connected to the second pixel electrode.

The present active matrix substrate may have a configuration in which the storage capacitance wiring extends across the center of the pixel region in the same direction as the scan signal line.

In the present active matrix substrate, the interlayer insulating film may include an inorganic insulating film and an organic insulating film that is thicker than the inorganic insulating film. At least a portion of the portion of the organic insulating film that overlaps with the first capacitance electrode and at least a portion of the portion of the organic insulating film that overlaps with the second capacitance electrode may be removed.

Alternatively, the present active matrix substrate may have a configuration in which the interlayer insulating film has a thin film portion that is formed by removing the organic insulating film and that includes the region overlapping with a portion of the first capacitance electrode and a portion of the second capacitance electrode, and the first and second capacitance electrodes are disposed side by side in the extending direction of the scan signal line, and the first capacitance electrode crosses one side of the thin film portion, whereas the second capacitance electrode crosses a side opposite from the aforementioned one side.

The present active matrix substrate may have a configuration in which the thin film portion overlaps with either the first or second pixel electrode.

The present active matrix substrate may have a configuration in which the gap between the first pixel electrode and the second pixel electrode functions as an alignment control structure.

The present active matrix substrate may have a configuration in which, in addition to the first and second pixel electrodes, a third pixel electrode that is electrically connected to the first pixel electrode is further included in the single pixel region; the first capacitance electrode is connected to the first and third pixel electrodes through mutually different contact holes, and forms a capacitance with the second pixel electrode; and the second capacitance electrode is connected to the first and third pixel electrodes through mutually different contact holes, and forms a capacitance with the second pixel electrode.

Alternatively, the present active matrix substrate may have a configuration in which, in addition to the first and second pixel electrodes, a third pixel electrode that is electrically connected to the second pixel electrode is further included in the single pixel region; the first capacitance electrode is connected to the second and third pixel electrodes through mutually different contact holes, and forms a capacitance with the first pixel electrode; and the second capacitance electrode is connected to the second and third pixel electrodes through mutually different contact holes, and forms a capacitance with the first pixel electrode.

Alternatively, the present active matrix substrate may have a configuration in which, in addition to the first and second pixel electrodes, the third pixel electrode electrically connected to the second pixel electrode is further included in the single pixel region; the first capacitance electrode is connected to the first pixel electrode through a contact hole, and forms a capacitance with the second and third pixel electrodes; and the second capacitance electrode is connected to the first pixel electrode through a contact hole, and forms a capacitance with the second and third pixel electrodes.

The method for manufacturing the present active matrix substrate is a method for manufacturing an active matrix substrate provided with a scan signal line, a data signal line, a transistor connected to the scan signal line and the data signal line, and first and second pixel electrodes provided in a single pixel region, the aforementioned first pixel electrode being connected to the aforementioned data signal line through the aforementioned transistor, and includes the following steps: a step of forming a first capacitance electrode, which is electrically connected to one of the first and second pixel electrodes and forms a capacitance with the other of the first and second pixel electrodes, and a second capacitance electrode, which is electrically connected to one of the aforementioned first and second pixel electrodes and forms a capacitance with the other of the first and second pixel electrodes, in the same layer as the aforementioned scan signal line; a step of detecting at least one of the short-circuits between the aforementioned first capacitance electrode and the aforementioned other of the first and second pixel electrodes and between the aforementioned second capacitance electrode and the aforementioned other of the first and second pixel electrode; and when a short-circuit is detected between the aforementioned first capacitance electrode and the aforementioned other of the first and second pixel electrodes, a step of cutting the aforementioned first capacitance electrode between the location connected to the aforementioned one of the first and second pixel electrodes and the short-circuit site; and when a short-circuit is detected between the second capacitance electrode and the aforementioned other of the first and second pixel electrodes, a step of cutting the aforementioned second capacitance electrode between the location connected to the aforementioned one of the first and second pixel electrodes and the short-circuit site.

The method for manufacturing the present liquid crystal panel is a method for manufacturing a liquid crystal panel provided with a scan signal line, a data signal line, a transistor connected to the scan signal line and the data signal line, and first and second pixel electrodes provided in a single pixel region, the aforementioned first pixel electrode being connected to the aforementioned data signal line through the aforementioned transistor, and includes the following steps: a step of forming a first capacitance electrode, which is electrically connected to one of the first and second pixel electrodes and forms a capacitance with the other of the first and second pixel electrodes, and a second capacitance electrode, which is electrically connected to one of the aforementioned first and second pixel electrodes and forms a capacitance with the other of the first and second pixel electrodes, in the same layer as the aforementioned scan signal line; a step of detecting at least one of the short-circuits between the aforementioned first capacitance electrode and the aforementioned other of the first and second pixel electrodes and between the aforementioned second capacitance electrode and the aforementioned other of the first and second pixel electrode; and when a short-circuit is detected between the aforementioned first capacitance electrode and the aforementioned other of the first and second pixel electrodes, a step of cutting the aforementioned first capacitance electrode between the location connected to the aforementioned one of the first and second pixel electrodes and the short-circuit site; and when a short-circuit is detected between the second capacitance electrode and the aforementioned other of the first and second pixel electrodes, a step of cutting the aforementioned second capacitance electrode between the location connected to the aforementioned one of the first and second pixel electrodes and the short-circuit site.

A liquid crystal panel according to the present invention is characterized in that it is equipped with the aforementioned active matrix substrate. Also, a liquid crystal display unit according to the present invention is characterized in that it is equipped with the aforementioned liquid crystal panel and drivers. Additionally, a liquid crystal display device according to the present invention is characterized in that it includes the aforementioned liquid crystal display unit and a light source device. Also, a television receiver according to the present invention is characterized in that it includes the aforementioned liquid crystal display device and a tuner unit that receives the television broadcasting.

INDUSTRIAL APPLICABILITY

An active matrix substrate of the present invention and a liquid crystal panel equipped with the active matrix substrate are suitable for a liquid crystal television, for example.

DESCRIPTION OF REFERENCE CHARACTERS

101 to 104 pixel
12*a*, 12*c*, 12A, 12C transistor
15*x*, 15*y*, 15*z* data signal line
16*x*, 16*y* scan signal line
17*a*, 17*b*, 17*c*, 17*d* pixel electrode
17A, 17B, 17C, 17D pixel electrode
17*a*', 17*b*', 17*c*', 17*d*' pixel electrode
17A', 17B', 17C', 17D' pixel electrode
18*p*, 18*q*, 18*r*, 18*s* storage capacitance wiring
21 organic gate insulating film
22 inorganic gate insulating film
24 semiconductor layer
25 inorganic interlayer insulating film
26 organic interlayer insulating film
27*a* drain lead-out wiring
37*a*, 37*b*, 38*a*, 38*b* capacitance electrode
39*b*, 39*b*' storage capacitance electrode (conductive body)
51*a* thin film portion
57*b*, 58*b* capacitance upper electrode (conductive body)
67*a*, 67*b*, 68*a*, 68*b* contact hole
84 liquid crystal display unit
601 television receiver
800 liquid crystal display device

The invention claimed is:
1. An active matrix substrate, comprising:
a scan signal line;
a data signal line;
a transistor connected to the scan signal line and to the data signal line;
first and second pixel electrodes provided in a single pixel region, said first pixel electrode being connected to said data signal line through said transistor; and
first and second capacitance electrodes formed in a same layer as said scan signal line, wherein said first capacitance electrode is electrically connected to one of said first and second pixel electrodes, and forms a capacitance with the other of said first and second pixel electrodes, wherein said second capacitance electrode is electrically connected to one of said first and second pixel electrodes, and forms a capacitance with the other of said first and second pixel electrodes, wherein at least a portion of said first capacitance electrode overlaps with said other of the first and second pixel electrodes through an interlayer insulating film covering a channel of said transistor and a gate insulating film covering said first capacitance electrode and said scan signal line, wherein at least a portion of said second capacitance electrode overlaps with said other of the first and second pixel electrodes through the interlayer insulating film covering the channel of said transistor and the gate insulating film covering said second capacitance electrode and said scan signal line, wherein said first capacitance electrode is connected to said first pixel electrode through a first contact hole running through said interlayer insulating film and said gate insulating film, and overlaps with said second pixel electrode through said interlayer insulating film and said gate insulating film, and wherein said second capacitance electrode is connected to said first pixel electrode through a second contact hole running through said interlayer insulating film and said gate insulating film, and overlaps with said second pixel electrode through said interlayer insulating film and said gate insulating film.

2. The active matrix substrate according to claim 1, wherein perimeters of said first and second pixel electrodes comprise a plurality of sides, a side of said first pixel electrode and a side of said second pixel electrode are adjacent to each other, and said first and second capacitance electrodes are respectively arranged to overlap with a gap between the two sides adjacent to each other, said first pixel electrode, and said second pixel electrode.

3. The active matrix substrate according to claim 1, wherein a drain lead-out electrode led out from one of conductive electrodes of said transistor and said first pixel electrode are connected to each other through a third contact hole.

4. The active matrix substrate according to claim 1, wherein said first capacitance electrode, a drain lead-out electrode led out from one of conductive electrodes of said transistor, and said first pixel electrode are interconnected through a third contact hole running through said interlayer insulating film and said gate insulating film.

5. The active matrix substrate according to claim 1, wherein said first and second pixel electrodes are arranged in a column direction, while the scan signal line extends in a row direction.

6. The active matrix substrate according to claim 5, wherein, among two pixel regions adjacent to each other in the row direction, said first pixel electrode in one of the pixel regions and said second pixel electrode in the other of the pixel regions are adjacent to each other in the row direction.

7. The active matrix substrate according to claim 1, further comprising a storage capacitance wiring that forms a capacitance with said first pixel electrode or a conductive body electrically connected to said first pixel electrode and that forms a capacitance with said second pixel electrode or a conductive body electrically connected to said second pixel electrode.

8. The active matrix substrate according to claim 7, wherein said storage capacitance wiring extends in a same direction as said scan signal line to cross a center of said pixel region.

9. A liquid crystal panel comprising the active matrix substrate set forth in claim 1.

10. A liquid crystal display unit comprising the liquid crystal panel set forth in claim 9 and a driver.

11. A liquid crystal display device comprising the liquid crystal display unit set forth in claim 10 and a light source device.

12. A television receiver comprising the liquid crystal display device set forth in claim 11 and a tuner unit that receives television broadcasting.

\* \* \* \* \*